(12) United States Patent
Lee et al.

(10) Patent No.: US 9,544,351 B1
(45) Date of Patent: Jan. 10, 2017

(54) MEDIA SHARING AND CONSUMPTION

(71) Applicants: Steven Sanghoon Lee, Sunnyvale, CA (US); Kevin Jerome Quirk, Los Altos, CA (US); Ferze Daligues Patawaran, Fontana, CA (US)

(72) Inventors: Steven Sanghoon Lee, Sunnyvale, CA (US); Kevin Jerome Quirk, Los Altos, CA (US); Ferze Daligues Patawaran, Fontana, CA (US)

( * ) Notice: Subject to any disclaimer, the term of this patent is extended or adjusted under 35 U.S.C. 154(b) by 228 days.

(21) Appl. No.: 14/214,670

(22) Filed: Mar. 15, 2014

Related U.S. Application Data

(60) Provisional application No. 61/786,657, filed on Mar. 15, 2013.

(51) Int. Cl.
  *G06F 15/167* (2006.01)
  *H04L 29/06* (2006.01)
  *H04L 29/08* (2006.01)

(52) U.S. Cl.
  CPC ......... *H04L 65/608* (2013.01); *H04L 67/2857* (2013.01)

(58) Field of Classification Search
  None
  See application file for complete search history.

(56) References Cited

U.S. PATENT DOCUMENTS

| | | | | |
|---|---|---|---|---|
| 5,995,945 A * | 11/1999 | Notani | ................... | G06Q 10/06 705/28 |
| 7,593,943 B2 * | 9/2009 | Clarke | ................... | G06Q 10/10 |
| 8,412,772 B1 * | 4/2013 | Nguyen | ........... | H04N 21/23103 709/204 |
| 9,088,634 B1 * | 7/2015 | Corley | ................... | H04L 65/605 |
| 2006/0203718 A1 * | 9/2006 | Benhase | ............. | G06F 11/2058 370/220 |
| 2007/0256113 A1 * | 11/2007 | Esteban | ................... | H04N 7/18 725/139 |
| 2009/0119710 A1 * | 5/2009 | Lo | ........................ | H04L 12/1859 725/39 |
| 2011/0071841 A1 * | 3/2011 | Fomenko | .......... | G06F 17/30206 705/1.1 |
| 2013/0139091 A1 * | 5/2013 | Raciborski | .............. | H04L 67/06 715/772 |
| 2013/0318574 A1 * | 11/2013 | Brink | ...................... | H04L 63/10 726/4 |
| 2014/0372810 A1 * | 12/2014 | Na | ....................... | G06F 11/3433 714/47.1 |

FOREIGN PATENT DOCUMENTS

GB WO 0127766 A2 * 4/2001 ............. H04L 29/06

\* cited by examiner

*Primary Examiner* — Kenny Lin
(74) *Attorney, Agent, or Firm* — Andy T. Pho; Shant Tchakerian

(57) ABSTRACT

Multi-directional service decoupling and/or caching is provided. A storage medium is used to store a plurality of data file types, each file type configured for one or more of the user devices. A transaction manager is used for selectively managing the first transaction for the first user device thereby decoupling a service required by the first transaction from the first user device.

20 Claims, 30 Drawing Sheets

Content Table 201

| Protocol | Destination IP Address | Destination Port | Source IP Address | Source Port | Redirection |
|---|---|---|---|---|---|
| TCP | 173.194.46.66 | 80 | 76.244.36.50 | 49154 | YouTube Agent (PID 2582) |
| TCP | 69.53.236.17 | 80 | 76.244.36.50 | 49152 | Netflix Agent (PID 2436) |
| TCP | 108.160.165.62 | 80 | 76.244.36.50 | 49153 | Dropbox Agent (PID 2470) |
| TCP | 173.252.110.27 | 80 | 76.244.36.50 | 49156 | Facebook Agent (PID 2637) |
| TCP | 173.194.46.66 | 80 | 76.244.36.50 | 49158 | YouTube Agent (PID 3196) |
| TCP | 173.252.110.27 | 80 | 76.244.36.50 | 49155 | Facebook Agent (PID 2705) |
| UDP | 64.233.160.0 | 19302 | 76.244.36.50 | 49157 | Google Hangouts Agent (PID 2842) |
| TCP | 173.194.46.66 | 80 | * | * | YouTube Agent (PID 2037) |
| TCP | 69.53.236.17 | 80 | * | * | Netflix Agent (PID 2334) |
| TCP | 17.149.160.79 | 80 | * | * | iTunes Agent (PID 2143) |
| TCP | 17.172.192.55 | 80 | * | * | iCloud Agent (PID 2130) |
| TCP | 108.160.165.62 | 80 | * | * | Dropbox Agent (PID 2297) |
| TCP | 66.159.106.136 | 80 | * | * | Backup Agent (PID 2041) |
| TCP | 176.32.98.166 | 80 | * | * | Amazon Agent (PID 2215) |
| TCP | 66.150.171.162 | 80 | * | * | Peer-to-peer Social Network Agent (PID 2387) |
| TCP | 173.252.110.27 | 80 | * | * | Facebook Agent (PID 2084) |
| UDP | 64.233.160.0 | 19302 | * | * | Google Hangouts Agent (PID 2242) |

FIGURE 5

API call 1001

```
POST /feeds/api/users/default/uploads HTTP/1.1
Host: uploads.gdata.youtube.com
Authorization: Bearer ya29.AHES6ZTtm7SuokEB-RGtbBty9IIINiP9-
eNMMQKtXdMP3sfjL1Fc
GData-Version: 2
X-GData-Key: key=adf15ee97731bca89da876c...a8dc
Slug: summer_vacation.mp4
Content-Type: multipart/related; boundary="f93dcbA3"
Content-Length: 1941255
Connection: close --f93dcbA3
Content-Type: application/atom+xml; charset=UTF-8

<?xml version="1.0"?>
<entry xmlns="http://www.w3.org/2005/Atom"
  xmlns:media="http://search.yahoo.com/mrss/"
  xmlns:yt="http://gdata.youtube.com/schemas/2007">
  <media:group>
    <yt:incomplete/>
    <media:category
      scheme="http://gdata.youtube.com/schemas/2007/categories.cat">Travel
    </media:category>
  </media:group>
</entry>
--f93dcbA3
Content-Type: video/mp4
Content-Transfer-Encoding: binary <Binary File Data>
--f93dcbA3--
```

FIGURE 10

API call 1301

GET / videoplayback?clen=37130914&cpn=JvW6ba8Rkzh9R7k7&dur=150.192&expire=1394754902&fexp=94128 1%2C940613%2C937417%2C913434%2C936910%2C936913%2C902907%2C934022&gir=yes&id=o- AMSChE2FjiJy0EcRh8eVW1zSdoxzGBhR0JovFXr5OVD&ip=70.197.75.66&ipbits=0&itag=137&keepalive= yes&key=yt5&lmt=1390023469609843&range=14082048- 21123071&ratebypass=yes&requiressl=yes&signature=16C48B41AF98D5F500642F379620F6EC2247DAA 4.01AA4E73C8A145F1443F7E7C0DAE949736E75D78&source=youtube&sparams=clen%2Cdur%2Cgir%2 Cid%2Cip%2Cipbits%2Citag%2Clmt%2Crequiressl%2Csource%2Cupn%2Cexpire&sver=3&upn=jvpy0hjtl- 4&redirect_counter=1&cms_redirect=yes&ms=nxu&mt=1394730146&mv=m HTTP/1.1
Host: r5---sn-a5m7lnez.googlevideo.com
User-Agent: Mozilla/5.0 (Windows NT 6.1; WOW64; rv:27.0) Gecko/20100101 Firefox/27.0
Accept: text/html,application/xhtml+xml,application/xml;q=0.9,*/*;q=0.8
Accept-Language: en-US,en;q=0.5
Accept-Encoding: gzip, deflate
Referer: https://s.ytimg.com/yts/swfbin/player-

FIGURE 13

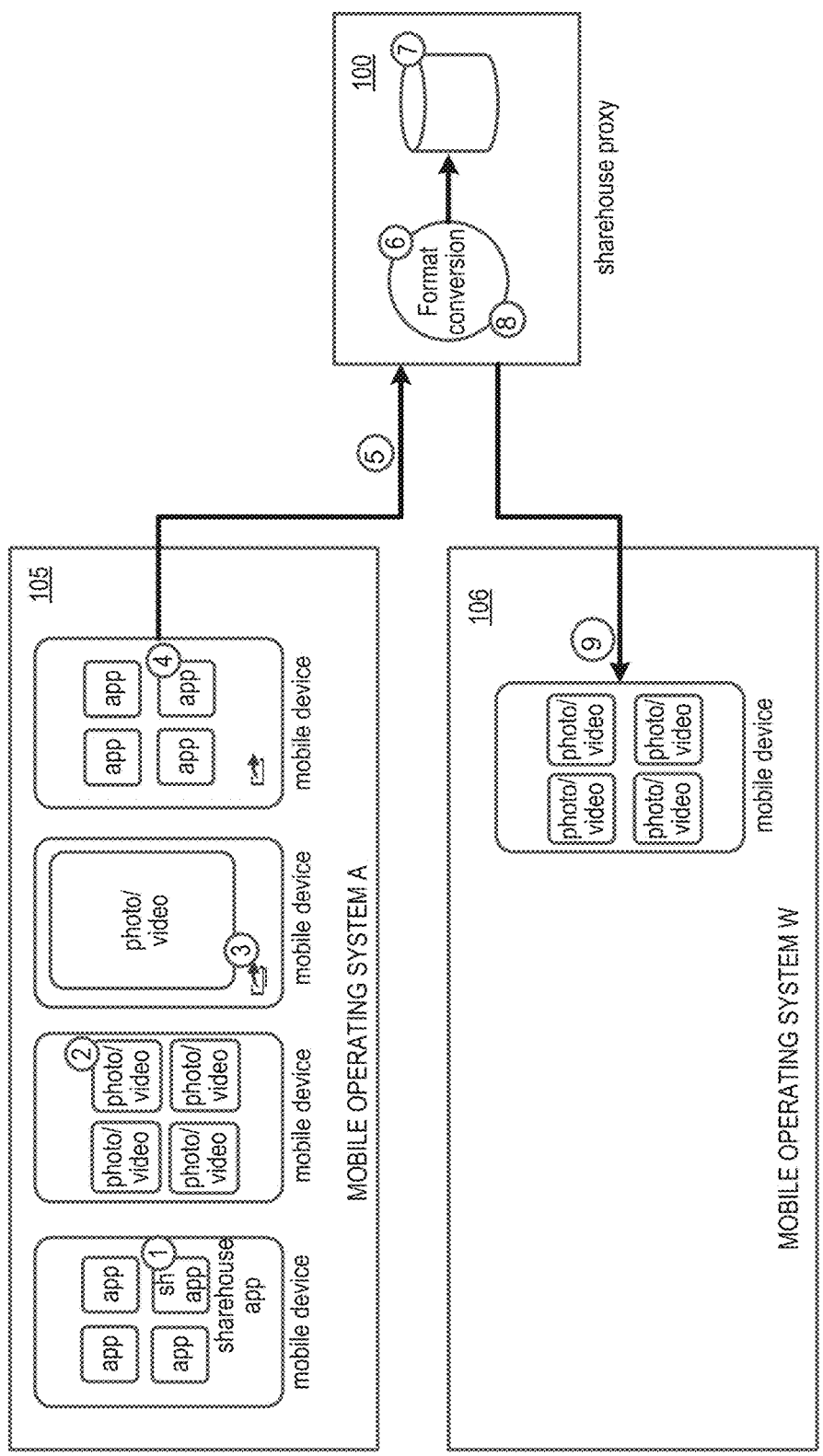

```
HTTP/1.1 201 Created
X-GData-User-Country: US
Content-Type: application/atom+xml; charset=UTF-8; type=entry
Expires: Tue, 18 Feb 2014 05:47:00 GMT
Date: Tue, 18 Feb 2014 05:47:00 GMT
Cache-Control: private, max-age=0, must-revalidate, no-transform
Vary: Accept, X-GData-Authorization, GData-Version
GData-Version: 2.1
ETag: W/\"CEMGQX47eCp7I2A9Wh9RF00.\"
Location: http://gdata.youtube.com/feeds/api/users/qltuser/uploads/
KfeZOuHqn7g?client=ytapi-apple-ipad
Content-Location: http://gdata.youtube.com/feeds/api/users/qltuser/uploads/
KfeZOuHqn7g?client=ytapi-apple-ipad
X-GUploader-UploadID:
AEnB2UpP1yxW4i6m6WqIB7DnrljKUbU6jHVjA9KGn4X9Sx8H22CMCO50IkJr
SgHmSum-tOR_2W6kr3Hb1RmcRHJ2OHBnPB0WmA
Content-Length: LENGTH
Server: HTTP Upload Server Built on Feb 10 2014 12:58:16 (1392065896)
Alternate-Protocol: 80:quic <?xml version='1.0' encoding='UTF-8'?>
  <entry xmlns='http://www.w3.org/2005/Atom' xmlns:app='http://www.w3.org/
2007/app' xmlns:media='http://search.yahoo.com/mrss/' xmlns:gd='http://
schemas.google.com/g/2005' xmlns:yt='http://gdata.youtube.com/schemas/
2007' gd:etag='W/"CEMGQX47eCp7I2A9Wh9RF00."'>
    <id>tag:youtube.com,2008:video:KfeZOuHqn7g</id>
    <published>2014-02-18T05:47:00.000Z</published>
    <updated>2014-02-18T05:47:00.000Z</updated>
    <app:edited>2014-02-18T05:47:00.000Z</app:edited>
    <app:control><app:draft>yes</app:draft>
    <yt:state name='processing'/></app:control>
    <category scheme='http://schemas.google.com/g/2005#kind' term='http://
gdata.youtube.com/schemas/2007#video'/>
    <category scheme='http://gdata.youtube.com/schemas/2007/categories.cat'
term='Travel' label='Travel'/>
</entry>"
```

FIGURE 30

MEDIA SHARING AND CONSUMPTION

CROSS REFERENCE TO RELATED APPLICATIONS

This application claims the benefit of U.S. Provisional Patent Application No. 61/786,657, entitled "Sharehouse," filed Mar. 15, 2013, the disclosure of which is incorporated by reference herein in its entirety.

FIELD

The present disclosure relates to media sharing and consumption.

BACKGROUND

Users are consuming, creating, and sharing content at a growing rate, driven, in part, by the growth of social networking applications, cloud-based storage, and the increased availability of devices that are capable of consuming, creating, and sharing content. Much of this sharing and consumption of content is performed by devices while they are connected to the Internet via a home network.

SUMMARY

Media sharing and consumption are provided.

In an example embodiment, a first interface for coupling to one or more user devices, is used for bi- and/or multi-directional caching of a first transaction and data for a first user device. A storage medium is used for storing a plurality of data file types, each file type is configured for one or more of the user devices. A transaction manager is used for selectively managing the first transaction for the first user device. The first transaction comprises one or more requests, and data corresponding to the one or more requests. By caching, storing and/or queuing the requests and/or data of each transaction, the transactions are advantageously decoupled from services that are required by the transactions.

According to an aspect, the first transaction and the data are cached for a second user device, such that when the second user device makes a request related to the first transaction, a response is provided for the second user device by using the caching of the first transaction and the data.

According to an aspect, the transaction manager is configured to receive the first transaction and divide the first transaction into a plurality of sub-transactions, wherein the sub-transactions appear as a single transaction to a service provider or one or more user devices. When the first transaction comprises a download/update to the first user device from a remote source, then a first sub-transaction is provided to receive the download/update from the remote source, and a second sub-transaction is provided to provide the download/update to the first user device. When the first transaction comprises an upload from the first user device to a remote destination, then a first sub-transaction is provided to receive the upload from the first user device, and a second sub-transaction is provided to deliver the upload to the remote destination.

According to an aspect, a plurality of agents are provided, including one or more of: a social media agent, a streaming agent, a streaming audio agent, a streaming video agent, a remote storage agent, an application specific agent, an online service agent, a Facebook agent, an iTunes agent, an iCloud agent, a Netflix agent, an Amazon agent, a Google agent, and a service provider agent. One of ordinary skill recognizes that other agents may advantageously be provided. In some embodiments, the first user device is coupled to a media sharing system and streaming content from a source external to the media sharing system is provided to the first device. In these embodiments, the streaming content is buffered such that the first user device can optionally de-couple and re-couple to the first interface and resume the streaming content with minimal interruption to a link between the media sharing system and the external source.

According to an aspect, the transaction comprises an upload or a download, and the transaction manager is for: offloading the upload for the first user device, and offloading the download for the first user device. The offloading often comprises receiving a request to download, performing the download on behalf of the first user device, and providing a notification of completion of the download.

According to an aspect, the transaction manager comprises a first download agent, and when a download request is received from the first user device, the first download agent offloads from the first user device processing required by the download request such that the download completes to a storage medium regardless of the status of the first user device.

According to an aspect, the transaction manager comprises a first upload agent, and when an upload request is received from the first user device, the first upload agent offloads from the first user device processing required by the upload request such that the upload completes to a storage medium regardless of the status of the first user device.

According to an aspect, a priority manager is provided for managing a priority of one or more operations including one or more of an upload, a download, and a streaming, the managing by using one or more predetermine algorithms including one or more of: network availability, off-peak usage, peak usage, and idle time.

According to an aspect, a second interface is used for coupling to a service provider, the first interface being coupled to a user LAN.

According to an aspect, an organizer module is used for aggregating the plurality of file types by using the storage medium, and a transcoding module is used for transcoding of a first file format to a second file format. The user devices include one or more of: a tablet, a phone, a computer, a mobile device, an ipod, an ipad, an iphone, an iOS device, a Blackberry OS device, a Microsoft-type OS, and an Android OS device. The first file format is for at least one of the iOS device, the Blackberry OS, the Microsoft-type OS, and the Android OS, and the second file format is for a different OS than the first OS. The transcoding is for translating the first file format from a format that is usable on a first user device to the second format that is usable on a second user device.

According to an aspect, the first user device comprises an application module for coupling the first user device to the first interface.

According to an aspect, one or more modules are provided for: peer-to-peer coupling to a remote apparatus; and side-channel information-based caching/prefetching for, based on predetermined information relevant to a user, updating content to one or more of a local apparatus, a remote apparatus, and a server. Local content stored within the local storage medium is updated by using remote content stored on the remote apparatus. The local updating is performed by a first predetermined algorithm. The remote content on the remote apparatus is updated by using the local content stored within the local storage medium. Remote updating is performed by a second predetermined algorithm.

According to an aspect, multi-home social caching is provided for selectively updating content to one or more social networks relevant to a user.

According to an aspect, coupling to a server is performed, and the following are optionally performed: server-based multi-apparatus sharing of content with a remote apparatus through the server; backup to the server of content stored within the storage medium, the backup providing a duplicate copy of the content; archiving to the server of content previously stored by using the storage medium, the archiving allowing retrieval of the content while relieving the need to store a duplicate copy within the storage medium; receiving an out-of-band broadcast or multicast of content from the server. In-band communications are often bi-directional. Out-of-band communications are typically one-way.

According to an aspect, the storage medium comprises one or more of a hard disk, SSD, and flash memory.

According to an aspect, the file types comprise one or more of images, video, audio, and text.

According to an aspect, the file types comprise at least one of commercial content and user generated content.

In an example embodiment, a first interface for coupling to one or more user devices is used, a bi-directional cache is used, and a cache switch is used. The bi-directional cache includes a storage controller for controlling input/output operations to the storage, a storage for receiving input/output operations and storing data, and a processing engine for selective storage and retrieval of data by using the storage. The cache switch is coupled to the processing engine. The cache switch comprises a content table including information to identify packets that are useable by the bi-directional cache, a first packet switch coupled to a LAN, a MAC (media access control) table, and a second packet switch coupled to a WAN. The first packet switch is for selectively providing packets to the bi-directional cache based on information in the content table. The second packet switch is for selectively providing packets to the bi-directional cache based on information in the MAC table.

According to an aspect, the content table is used for matching to identifying information within a packet from the LAN, the MAC table is used for matching to identifying information within a packet from the WAN, the identifying information comprises one or more of information relating to: source, destination, type of payload, type of service, content, social media, streaming, a service provider, an application, and a content provider.

According to an aspect, the first interface is used for coupling to a first network, a second interface is used for coupling to a second network, and a protocol module is used for separating packet headers from packet payload.

According to an aspect, an encryption module is used for controlling specific user access by encrypting particular data stored within the bidirectional cache.

According to an aspect, the first interface comprises one or more of: Ethernet, WiFi, USB, BlueTooth, RF, near-field-communications, and multimedia over co-axial.

According to an aspect, a first agent is provided for receiving a request from a first user device, and offloading from the first user device an operation required by the request.

According to an aspect, a connection manager is used to track present status of external devices coupled to the system, including optionally the one or more user devices, the LAN, the WAN, and one or more service providers and ISPs. An agent scheduler is used for managing activities of one or more agents including a LAN agent, a WAN agent, a storage agent, a social media agent, a download agent, an upload agent, a streaming agent, and an application agent.

This brief summary has been provided so that the nature of this disclosure may be understood quickly. A more complete understanding can be obtained by reference to the following detailed description and to the attached drawings.

BRIEF DESCRIPTION OF THE DRAWINGS

The following is a brief description of the drawings, in which like reference numbers may indicate similar elements.

FIG. 5 depicts exemplary data included in a content table, according to an example embodiment.

FIG. 10 is a diagram depicting an exemplary YouTube upload API call.

FIG. 13 depicts an exemplary YouTube download API call.

FIG. 29 is a diagram depicting automatic media file conversion, according to an example embodiment.

FIG. 30 is a diagram depicting an exemplary message indicating completion of a YouTube upload API call.

DETAILED DESCRIPTION

Overview

The present disclosure provides apparatuses, methods, non-transitory machine-readable storage mediums, and systems, that provide media sharing and consumption.

More specifically, embodiments disclosed herein provide multi-directional service decoupling proxy and/or caching, opportunistic pre-fetch caching, social-network based predictive caching, user behavior predictive caching, decoupled media streaming proxy, direct system-to-system ("cache-to-cache") content transfer, system-to-system ("cache-to-cache") backup, distributed media file conversion, distributed peer-to-peer content transfer, caching and replaying of streaming media, out-of-band broadcast pre-fetch caching, private distributed social networking, and opportunistic cloud-based backup.

In a service decoupling proxy, messages between, for example, a LAN client and a remote WAN Server are not necessarily passed between the connections coupling those devices to the proxy in a first come, first serve fashion. Instead the proxy can decouple the transaction by emulating the WAN Server to the LAN client, and by operating as a client to the WAN Server.

Opportunistic pre-fetch caching can be performed by pre-fetching content in anticipation of use by a network client device in an opportunistic manner by using unused portions of the network throughput allocation. This can be done by monitoring the amount of network traffic on a specific link, and then scheduling any necessary data transfers during times of low network traffic.

Social network predictive caching can involve pre-fetching content that the members of a user's social network have explicitly 'shared' or 'liked', or content that these members have recently 'viewed' or created, so that this content is available in the user's cache in anticipation of the user's request for this content.

User behavior predictive caching can involve pre-fetching content for a user based on the user's behavior (e.g., subscriptions, things they viewed in the past, associated topics, and the like).

Private distributed social networking can involve the storing of user-generated content (as well as personal information) that is provided by a social networking service on one or more media sharing systems that are controlled by respective users. For example, the content provided by the social networking service can be served in two portions. The first portion can be an initial portion that includes non-user specific content, and which may be stored on a server of the social networking service. The second portion can be the user-generated content (as well as personal information) that is stored on the one or more media sharing systems of the respective users.

System Architecture

The architecture of some implementations is further described below with reference to FIGS. 1 through 5.

Figure 1:
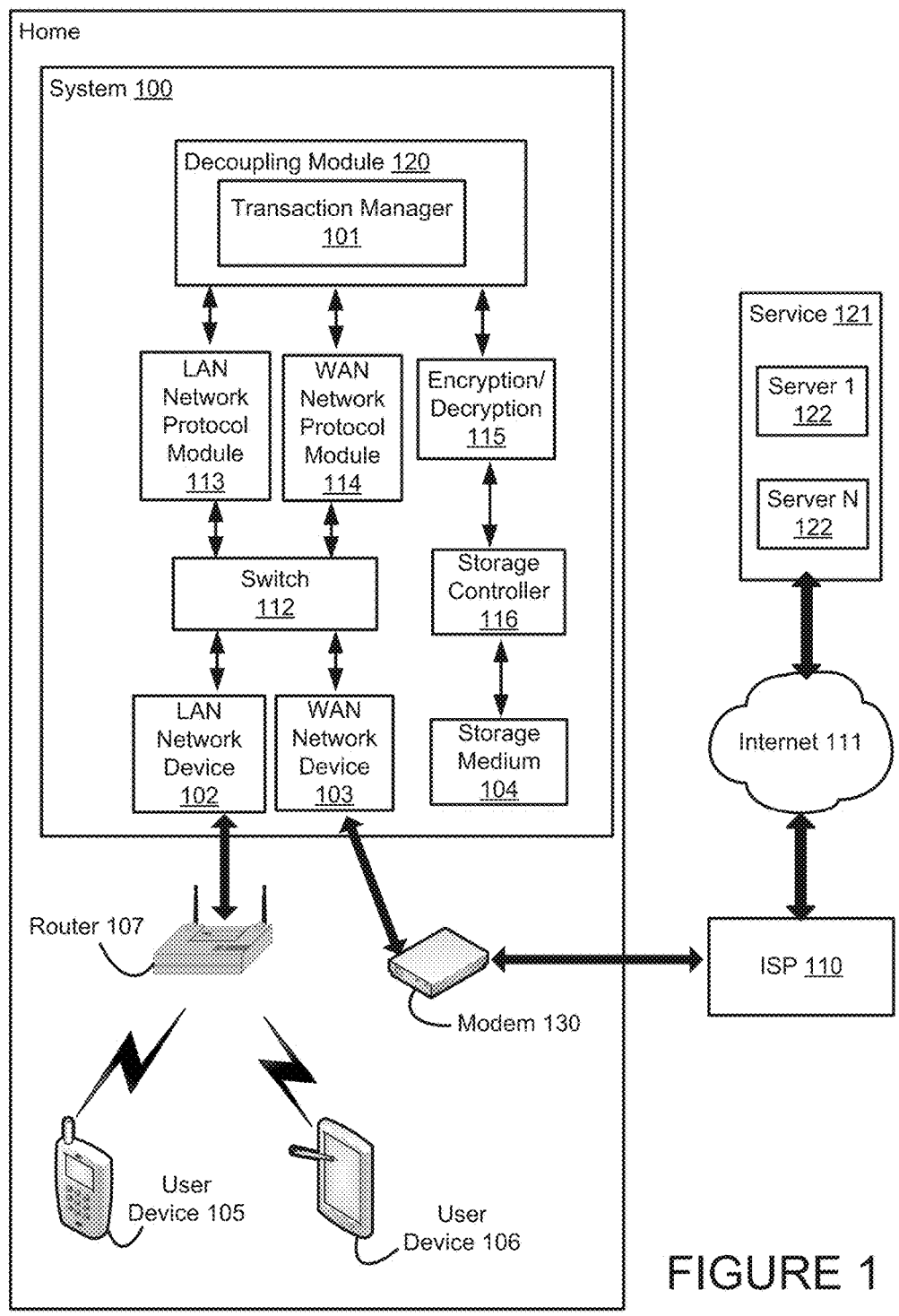
FIG. 1 is a diagram depicting a media sharing system, according to an example embodiment.

FIG. 1 is a diagram depicting a media and/or data sharing system 100 according to an example embodiment. As shown in FIG. 1, the system 100 can be advantageously located within a home of one or more users. The system 100 includes, among other components, a decoupling module 120 and a switch 112. The decoupling module 120 and/or the switch 112 may be implemented in hardware, software, and/or a combination thereof, for the system 100. Further, the system 100 and the other components described herein may be implemented in hardware, software, and/or any combination of software and/or hardware.

Also shown in FIG. 1, the system 100 further includes a LAN network device 102, a WAN network device 103, network protocol modules 113 and 114, an optional encryption/decryption module 115, a storage controller 116, and a storage medium 104. The network protocol module 113 is constructed to separate packet headers from packet payload content in accordance with a LAN network protocol. The network protocol module 114 is constructed to separate packet headers from packet payload content in accordance with a WAN network protocol.

The system 100 is communicatively coupled to one or more user devices e.g., a phone 105 and/or a tablet 106, via the LAN network device 102 and/or a router 107. In some embodiments, the router 107 includes a wireless and/or wired type of router. The system 100 of some embodiments also includes wireless and/or wired capability for operative communications with external devices by using protocols and/or components apparent to one of ordinary skill. Accordingly, protocols and capabilities such as wireless and/or wired communication may be implemented internally and/or externally and used by different devices and/or components described herein such as for example, the system 100, the router 107 and/or the modem 130.

The system 100 is also communicatively coupled to the Internet 111, via the WAN network device 103, a modem 130, and an Internet Service Provider (ISP) 110. As shown in FIG. 1, the ISP 110 and the Internet 111 are not usually located within the home. The system 100 accesses (or is accessed by) a service 121 via the Internet 111. The service 121 includes one or more WAN servers 122, and the functions of the service 121 are provided by the one or more WAN servers 122.

One of ordinary skill recognizes that the exemplary user devices 105 and/or 106 may include any number of user devices, consumer electronics, and the like, such as for example, a tablet, a phone, a computer, a mobile device, an ipod, an ipad, an iphone, an iOS device, a Blackberry OS device, a Microsoft-type OS, and/or an Android OS device among others. The user devices 105 and/or 106 may interact with and/or couple to the system 100 at various times, for example, when a user is using the user devices 105 and/or 106 within his or her home, or when a user is visiting another user's home or a location where the system 100 is temporarily or permanently located, Implementations of the system 100 facilitate media sharing among users, user devices, homes, locations, servers, ISPs, and/or content delivery services, for example.

The decoupling module 120 is capable of performing bi- and/or multi-directional service decoupling, and/or caching operations for users and devices interacting with the system 100. In an example embodiment, the decoupling module 120 includes a transaction manager 101. In some embodiments, the decoupling module 120 includes further modules, such as, for example, one or more of a service manager module, network protocol modules, an encryption/decryption module, a storage controller, a non-transitory computer-readable storage medium, a switch, and the like, and the decoupling module performs other functionality.

Switch

Figure 2:
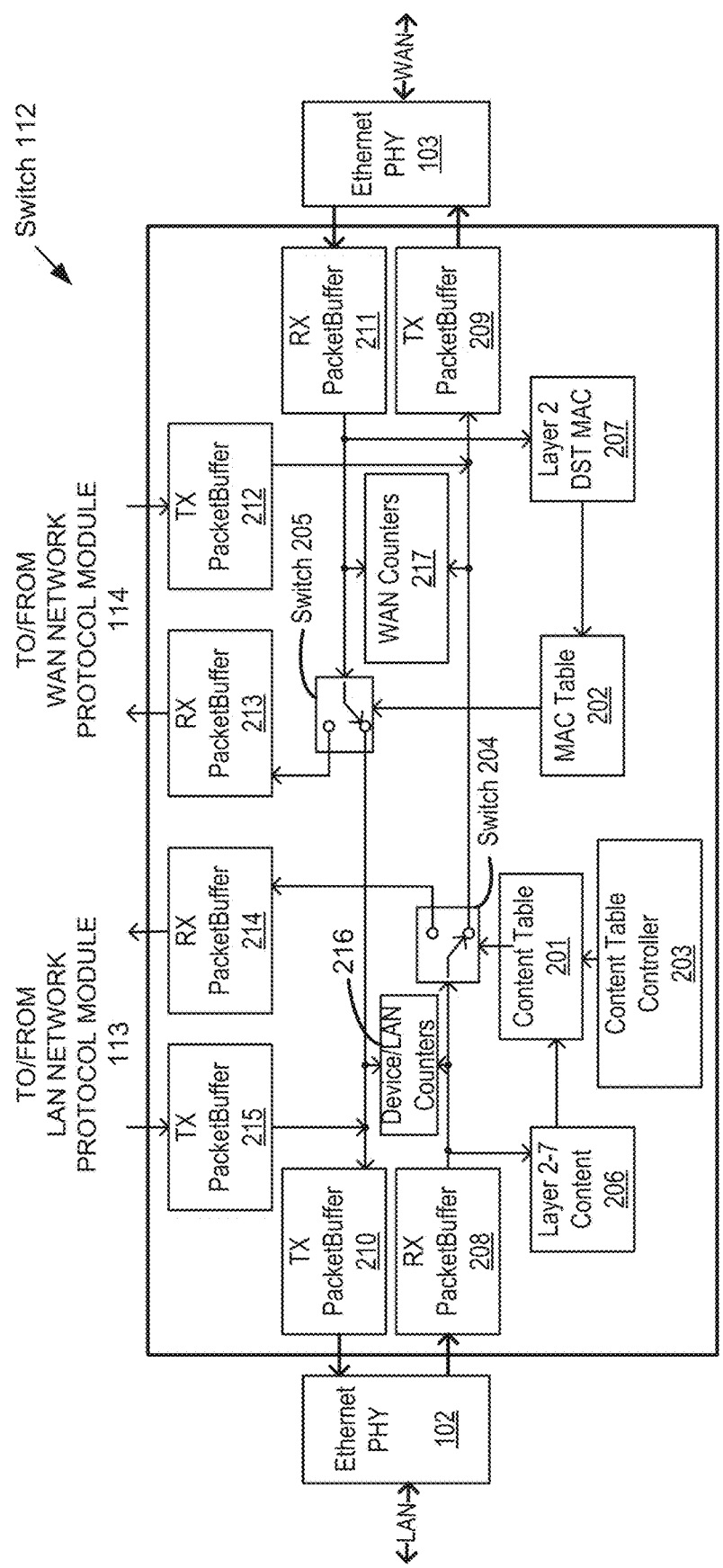
FIG. 2 is an architecture diagram of a switch, according to an example embodiment.

FIG. 2 is an architecture diagram of the switch 112. As shown in FIG. 2, the switch 112 includes a LAN transmission packet buffer 210 and a LAN reception packet buffer 208 that are each communicatively coupled with the LAN network device 102. A WAN transmission packet buffer 209 and a WAN reception packet buffer 211 are each communicatively coupled with the WAN network device 103.

Additionally, the switch 112 includes a LAN decoupling module reception packet buffer 214 and a LAN decoupling module transmission packet buffer 215 that are each communicatively coupled to the LAN network protocol module 113; and a WAN decoupling module reception packet buffer 213 and a WAN decoupling module transmission packet buffer 212 that are each communicatively coupled to the WAN network protocol module 114. The LAN decoupling module transmission packet buffer 215 is communicatively coupled to the LAN transmission packet buffer 210, and the LAN decoupling module reception packet buffer 214 is communicatively coupled to a switch 204. The WAN decoupling module transmission packet buffer 212 is communicatively coupled to the WAN transmission packet buffer 209, and the WAN decoupling module reception packet buffer 213 is communicatively coupled to a switch 205.

The LAN reception packet buffer 208 and the WAN transmission packet buffer 209 are communicatively coupled via the switch 204. The WAN reception packet buffer 211 and the LAN transmission packet buffer 210 are communicatively coupled via the switch 205. Device/LAN counters 216 relate to packets sent or received via the LAN network device 102, and WAN counters 217 relate to packets sent or received via the WAN network device 103.

The switch 204 is controlled by using a content table 201. The switch 205 is controlled by using a MAC (Media Access Control) table 202.

Switch: Selectively Providing Packets by Using the Content Table

The switch 204 is constructed to selectively provide packets received via the LAN network device 102 to the LAN network protocol module 113 via the LAN decoupling module reception packet buffer 214. The decoupling module 120 receives these packets via the LAN network protocol module 113. The switch 204 provides such packets to the LAN decoupling module reception packet buffer 214 based on information provided by the content table 201. More specifically, the switch 204 is constructed to match identifying information (e.g., Layer 2-7 content 206 of FIG. 2), included in a packet from the LAN, with information included in the content table 201. In example embodiments, the identifying information includes a protocol (e.g., TCP or UDP), a destination IP address, a destination port, a source IP address, and a source port. In implementation, the identifying information can include any piece of network Layer 2 to Layer 7 header information, such as, for example, information relating to one or more of source, destination, type of payload, type of service, content, social media, streaming, a service provider, an application, a content provider, and the like.

Exemplary data provided by the content table 201 is illustrated in FIG. 5. As shown in FIG. 5, each row of the content table 201 includes a protocol (e.g., TCP or UDP), a destination IP address, a destination port, a source IP address, a source port, and an agent port identifier (PID). The destination IP address and the destination port are used to identify a particular service. In some embodiments, the protocol of the service is also used to identify the service. Services can include, for example YouTube, Netflix, iTunes, iCloud, DropBox, Evernote, Amazon, Google, a backup service, Pandora, Spotify, a peer-to-peer social network service, Facebook, Shutterfly, and the like.

Each content table entry (e.g., row) in the content table 201 is managed by the content table controller 203. The content table controller 203 is constructed to add content table entries. The content table controller 203 is further constructed to remove content table entries. The content table controller 203 is also constructed to update content table entries. The content table controller 203 performs these operations (e.g., add, remove, update) in response to instructions received via an agent controller module 325 further described in relation to FIG. 3, and/or in response to instructions received via an agent (317 further described in relation to FIG. 3).

Reverting to FIG. 2, the switch 204 provides packets to the LAN network protocol module 113 based the result of a match between the identifying information 206 and information included in the content table 201. In an example embodiment, the switch 204 compares the protocol, the destination IP address, the destination port, the source IP address, and the source port of the identifying information 206 with the protocol, the destination IP address, the destination port, the source IP address, and the source port provided by each row of the content table 201.

As shown in FIG. 5, there are a number of entries within the content table 201 that have a wildcard value ("*") in the source IP address and source port fields. If a packet fails to match any of the entries that have valid source IP address and source port fields, but does match one of the entries with a wildcard value it is determined to match the wildcard entry.

Figure 8:
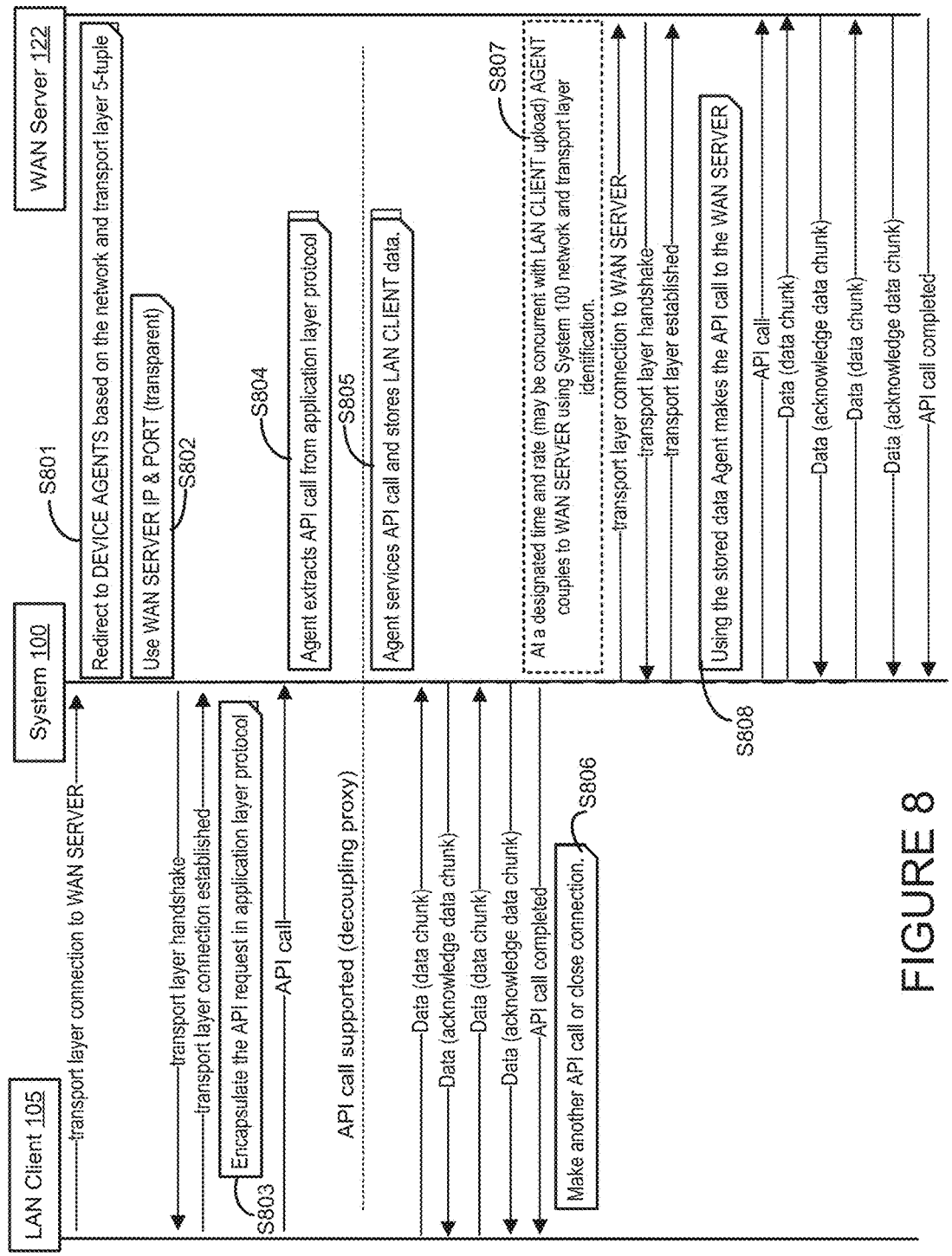
FIG. 8 is a sequence diagram depicting an exemplary decoupling transparent proxy operation, according to an example embodiment.

If there is a match, then the switch 204 forwards the packet to the LAN decoupling module reception packet buffer 214 (and the system 100 may provide a Decoupling Proxy Mode as further described herein in relation to FIG. 8, for example). If there is not a match, then the switch 204 forwards the packet to the WAN transmission packet buffer 209 (and the system 100 may provide a Non-Decoupling Proxy Mode, further described below).

In FIG. 2, the switch 204 is depicted in the Non-Decoupling Proxy Mode.

Switch: Selectively Providing Packets by Using the MAC Table

As described above, the switch 205 is controlled by using the MAC (Media Access Control) table 202. More specifically, the switch 205 is constructed to selectively provide packets received via the WAN network device 103 to the WAN network protocol module 114 via the WAN decoupling module reception packet buffer 213. The decoupling module 120 receives the packets via the WAN network protocol module 114. The switch 205 provides the packets to the WAN decoupling module reception packet buffer 213 based on information in the MAC table 202. In more detail, the switch 205 is constructed to match identifying information (e.g., Layer 2 DST MAC information 207 of FIG. 2), included in a packet from the WAN, with information included in the MAC table 202. In the example embodiment, the identifying information includes a destination MAC address of the packet. In some embodiments, the identifying information can include any piece of network Layer 2 to Layer 7 header information, such as, for example, information relating to one or more of source, destination, type of payload, type of service, content, social media, streaming, a service provider, an application, a content provider, and the like.

The switch 205 provides packets to the WAN network protocol module 114 based on the result of a match between the identifying information 207 and information included in the MAC table 202. In an example embodiment, the switch 205 compares the destination MAC address (e.g., information 207) with the MAC addresses included in the MAC table 202. If there is a match, then the switch 205 forwards the packet to the WAN decoupling module reception packet buffer 213 (and the system 100 may provide a Decoupling Proxy Mode, which is further described in relation to FIG. 8, for example). If there is not a match, then the switch 205 forwards the packet to the LAN transmission packet buffer 210.

In FIG. 2, the switch 205 is depicted in a mode in which it forwards packets to the LAN transmission packet buffer 210.

Before describing the operation of the decoupling module 120 upon receiving a packet from the switch 112 via either of the LAN network protocol module 113 or the WAN network protocol module 114, the architecture of the system 100 and components of the system 100 are further described below.

System Architecture: Decoupling Module and Agents

Figure 3:
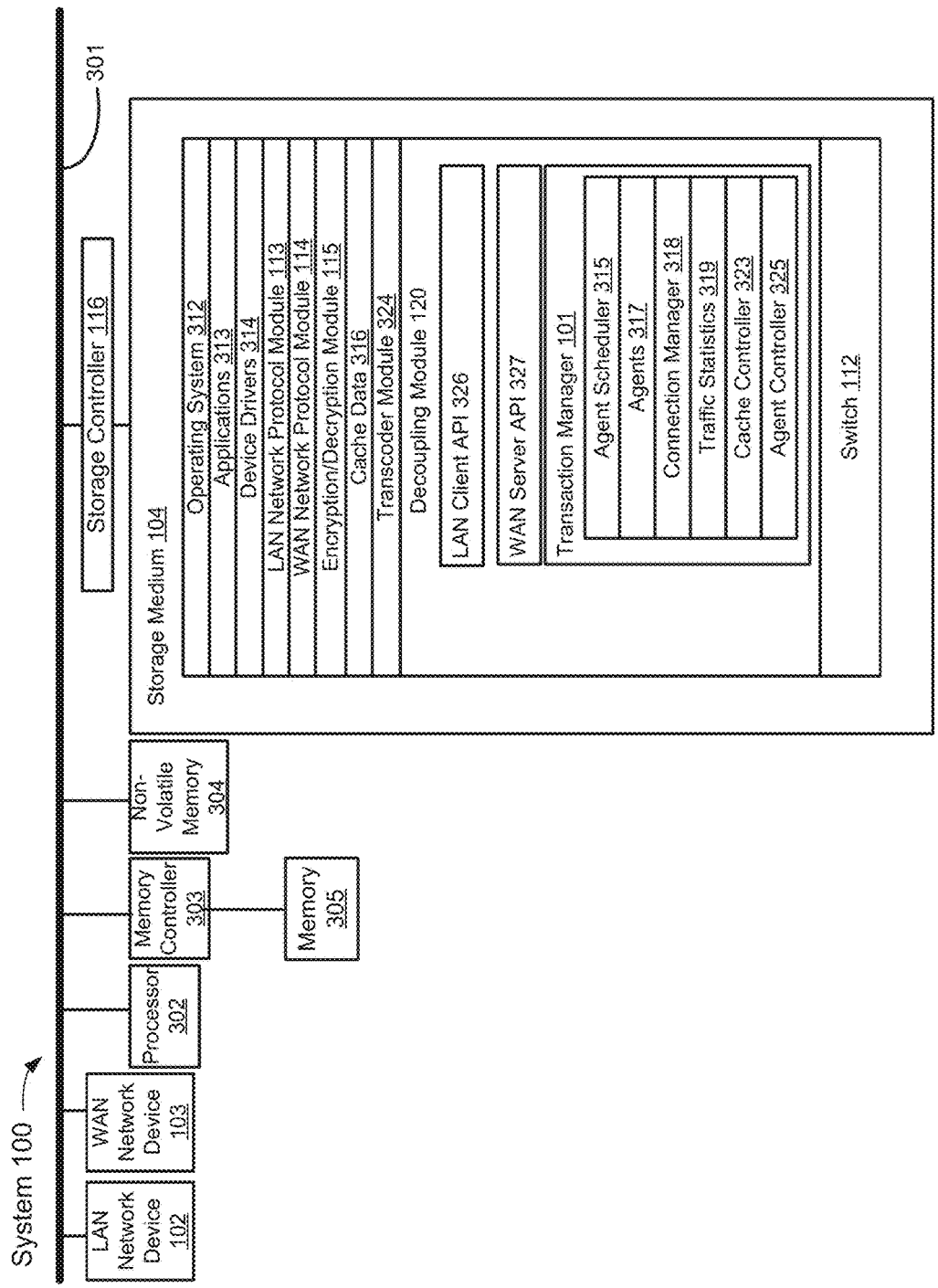
FIG. 3 is a detailed block diagram depicting architecture of a system, according to an example embodiment.

FIG. 3 is a detailed block diagram depicting the architecture of the system 100 of FIG. 1, according to an example embodiment.

As shown in FIG. 3, a bus 301 interfaces with a processor 302, a memory controller 303 for controlling memory of various types such as volatile and/or random access type memory (RAM) and the like, a non-volatile memory 304, a storage controller 116, the LAN network device 102 and the WAN network device 103.

The processor 302 may take many forms, such as, for example, a central processing unit (processor), a multi-processor unit (MPU), an ARM processor, and the like.

The non-volatile memory 304 may take many forms, such as, for example, a read only memory (ROM), erasable programmable read only memory (EPROM), a non-volatile flash memory, and the like.

The LAN network device 102 provides one or more wired and/or wireless type interfaces for exchanging data and commands between the system 100 and the router 107. The WAN network device 103 provides one or more wired and/or wireless interfaces for exchanging data and commands between the system 100 and the modem 130. Such wired and/or wireless interfaces include without limitation, for example, a Universal Serial Bus (USB) interface, Bluetooth interface, Wi-Fi interface, Ethernet interface, Near Field Communication (NFC) interface, Radio Frequency interface, multimedia over co-axial (MoCA) interface, and the like.

Machine-executable instructions in software programs (such as an operating system 312, application programs 313, and device drivers 314) are loaded into the memory 305 (via the memory controller 303) from the storage medium 104 (via the storage controller 116), the non-volatile memory 304 or another storage location. During execution of software programs, the respective machine-executable instructions are accessed by the processor 302 via the bus 301, and then executed by the processor 302. Data used by the software programs are also stored in the memory 305, and such data is accessed by the processor 302 during execution of the machine-executable instructions of the software programs.

The storage medium 104 is typically a non-transitory computer-readable storage medium, such as, for example, a hard drive, a flash drive, a DVD, a CD, a flash storage, a solid state drive, a RAID (Redundant Array of Inexpensive Disks), JBOD (Just A Bunch of Disks), and the like. In implementations, the storage medium 104 comprises distributed storage that may involve multiple storage devices and/or multiple storage locations. The storage medium 104 includes an operating system 312, software programs 313, device drivers 314, the LAN network protocol module 113, the WAN network protocol module 114, the encryption/decryption module 115, cache data 316, an optional transcoder module 324, the decoupling module 120, the switch 112, and the transaction manager 101. In some implementations, one or both of the encryption/decryption module 115 and the transcoder module 324 is not included in the system 100.

In an example embodiment, the system 100 uses a portion of the storage medium 104 for more rapid and/or redundant retrieval of data. This is referred to herein as the cache data 316. The use of "cache" in this example is general, and is not intended to imply that a specific hardware or software caching structure is required. The "caching" as used herein may be implemented by, for example, a buffer, latch, or temporary (volatile) storage and/or memory that may store data for hours, minutes, seconds and sub-seconds, or may include persistent (non-volatile) storage that stores data for days, weeks, months and/or years, such that the data may be accessed at a variety of times and/or locations by a variety of devices via various requests, transactions, and/or operations (e.g., push, pull, poll, update, etc.).

The cache data 316 includes data of a plurality of file types. Each such file type is configured for one or more of the user devices 105 and 106. In an example embodiment, the file types include image, video, audio, and/or text types of files. In some embodiments, the file types include at least one of commercial content and file types of user-generated content. In some embodiments, the operating system 312 includes an organizer module (not shown) that is constructed to aggregate the plurality of file types by using the storage medium 104. The transcoder module 324 of an implementation is a software module that includes machine-executable instructions that when executed by the processor 302, control the decoupling module 120 to transcode (convert) a first file format to a second file format.

In an example embodiment, the switch 112 is a software module that includes machine-executable instructions that when executed by the processor 302, control the system 100 to perform the functionality of the switch 112 as described above.

In example embodiments, the decoupling module 120 includes a LAN Client API 326, a WAN Server API 327, and the transaction manger 101. The LAN Client API 326 includes machine-executable instructions that when executed by the processor 302, control the system 100 to communicate with a client-system application (e.g., the client-system application 613 of FIG. 6) running on a user device 105 and/or 106. The WAN Server API 327 includes machine-executable instructions that when executed by the processor 302, control the system 100 to communicate with a server 122 that provides a service 121 that involves use of the system 100 (e.g., a backup service, a private distributed social network service, a private sharing service, and the like). As further described herein, the system 100 of an implementation further provides a set of operations to a user such as for example, a "caching" or pre-fetch operation, a direct system-to-system ("cache-to-cache") transfer operation, a service decoupling operation, and other operations that may or may not require a remote service 121 and/or server 122.

For instance, in an implementation, the transaction manager 101 is a software module that includes machine-executable instructions that when executed by the processor 302, control the system 100 to perform bi- and/or multi-directional service decoupling proxy and/or caching.

The transaction manager 101 of particular embodiments employs hardware and/or software components that may each invoke machine-executable instructions that when executed by the processor 302, perform specific processes. These components may include, for example, an agent scheduler 315, agents 317, a connection manager 318, a cache controller 323 and an agent controller 325. The transaction manager 101 also includes traffic statistics 319, which include both LAN traffic statistics and WAN traffic statistics. In an example embodiment, the traffic statistics 319 include, network availability statistics, off-peak usage statistics, peak usage statistics, and idle time statistics.

Decoupling Module

Figure 4:
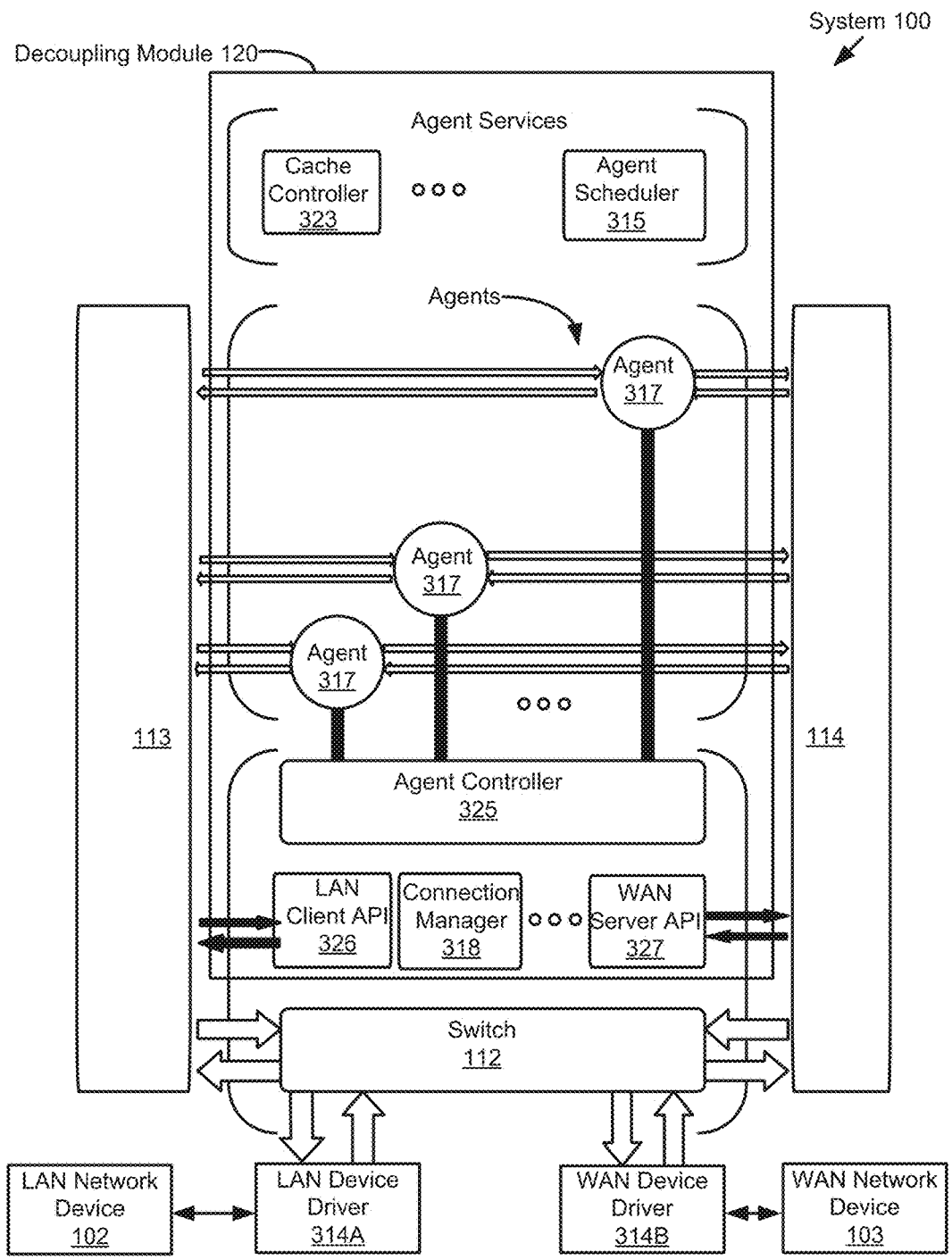
FIG. 4 is a diagram showing software components included in a system, according to an example embodiment.

FIG. 4 illustrates functions of an exemplary decoupling module 120 in further detail. In the example illustrated by FIG. 4, LAN device driver 314A is a device driver for the LAN network device 102 of FIG. 1, and WAN device driver 314B is a device driver for the WAN network device 103 of FIG. 1. Device drivers 314 for the system 100 are generally illustrated and described above in relation to FIG. 3.

The decoupling module 120 of some embodiments receives requests such as from a user device 105 and/or 106, a service 121, and/or another system (e.g., system 700 of FIG. 7) that is interacting (e.g., sharing/requesting content) with the system 100. Advantageously, the decoupling module 120 may organize and/or sort the requests into sets of transactions, and/or sub-transactions such that the transactions and/or sub-transactions may be "decoupled" and/or be executed without particular temporal and/or spatial constraints. For instance, a user device 105 may request a first transaction such as to upload a video to a remote service 121 and/or another user device 106. In these cases, the user device 105 couples with the system 100, which receives the video (in a first sub-transaction for the transaction), and the user device 105 decouples from the system 100. The user device 105 may then leave the vicinity regardless of the availability, capabilities and/or bandwidth of the service 121 and/or other user devices 106, and/or remote sharing systems 700 (of FIG. 7). The system 100 may interact at a different or same time with the service 121, user device 106, and/or remote sharing system 700 (FIG. 7) by using a second sub-transaction for the first transaction, at a given rate which may be periodically updated. In this document, the foregoing may be referred to as service, operation, and/or transaction decoupling.

In an example illustrated in FIG. 4, operations of the system 100 are supported by one or more agents 317. As shown in FIG. 4, the agents 317 communicate with the agent scheduler 315 to resume a next sub-transaction in a decoupled transaction at an opportunistic time, and at a given rate which may be periodically updated. More specifically, before proceeding with performance of a next sub-transaction of a decoupled transaction, the agent 317 communicates with the agent scheduler 315 to schedule the performance of the next sub-transaction. After scheduling the transaction with the agent scheduler 315, the agent 317 waits for a notification from the agent scheduler 315 before proceeding with the next sub-transaction. In some embodiments, the agent scheduler 315 (in conjunction with the connection manager 318) determines an opportunistic time (and a given rate which may be periodically updated) for the agent 317 to resume the transaction (e.g., a time that minimizes blocking on the shared WAN link or blocking on the LAN link), based on network availability, off-peak usage, peak usage, idle time, and the like, of the LAN and/or the WAN networks, or the peak performance and/or availability of one or more devices located inside or outside the home. When the agent scheduler 315 determines that it is an opportunistic time to resume the transaction, the agent scheduler 315 sends a notification to the agent 317 to notify the agent to resume the transaction by proceeding with the next sub-transaction.

In an example embodiment, the agent scheduler 315 is constructed to manage activities of one or more agents 317 including a storage agent, a social media agent, a download agent, an upload agent, a streaming agent, and an application agent. Other agents 317 (e.g., a LAN agent, a WAN agent, any other network agent) may be included in the decoupling module 120 for advantageously facilitating various tasks, transactions and/or sub-transactions.

In an example embodiment, the agent scheduler 315 is constructed to manage a priority of one or more operations of one or more of the agents 317 described above, or another agent 317. The managing of the priority is performed by using one or more predetermined algorithms including one or more of network availability, off-peak usage, peak usage, idle time, and the like, of the LAN and the WAN networks.

The agent controller 325 includes machine-executable instructions that, when executed by the processor 302, cause the decoupling module 120 to send instructions to the content table controller 203 (of FIG. 2) for the switch 112 to add, remove or update entries in the content table 201 (of FIG. 2) for the switch 112. The agent controller 325 may include machine-executable instructions that, when executed by the processor 302, cause the system 100 to effect installation, removal, configuration, shut down, startup and/or bring up of an agent 317.

In some embodiments, agents 317 include machine-executable instructions that, when executed by the processor 302, cause the decoupling module 120 to send instructions to the content table controller 203 (of FIG. 2) for the switch 112 to add, remove or update entries in the content table 201 (of FIG. 2) for the switch 112. The agent 317 may include machine-executable instructions that, when executed by the processor 302, cause the system 100 to effect installation, removal, configuration, shut down, startup and/or bring up of an agent 317.

In an example embodiment, the agent controller 325 installs, removes, brings up, shuts down, and configures agents 317 in response to instructions received by the system 100, and in response to instructions received from a client-system application (e.g., the client-system application 613 of FIG. 6) running on a user device (e.g., user device 105 or 106). In some embodiments, the agent controller 325 performs health monitoring for the agents 317, and shuts down, brings up, and restarts agents 317 based on the monitored health of the agents 317. In some embodiments, the agent controller 325 installs, removes, brings up, shuts down, and configures agents 317 in response to instructions received by the system 100 from one or more of a WAN server 122 of a service 121 and a cache service server (e.g., server 1500 of FIG. 15) of a cache service. In an embodiment, a WAN server 122 of a service 122 sends the system 100 one or more of instructions to install, remove, bring up, shut down, and configure an agent 317 in connection with a push update operation.

The cache controller 323 includes machine-executable instructions that when executed by the processor 302, control the decoupling module 120 to write data to, or read data from, the storage medium 104 by using the storage controller 116. More specifically, the cache controller 323 is constructed to read the "cached" (e.g., temporarily and/or persistently stored for rapid retrieval without particular temporal and or spatial constraints) data 316 stored in the storage medium 104, or to write "cached" data 316 to the storage medium 104. The temporal constraints may include physical performance limitations such as latency, for example, while spatial and other constraints may include lack of proximity to couple, and/or lack of availability of a particular network, service 121, device 106, and/or system 100, for example.

Connection Manager

The connection manager 318 includes machine-executable instructions that when executed by the processor 302, control the system 100 to track status of external devices coupled to the system 100, including the one or more user devices 105 and 106, the LAN network device 102, the WAN network device 103, one or more services 121 and/or ISPs 110.

More generally, in an embodiment, the connection manager 318 (in conjunction with the agent scheduler 315) is constructed to: monitor and track one or more client devices (e.g., the user devices 105 and/or 106) as they couple to, and/or decouple from, the LAN, archive historical network connection and disconnection information for client devices, monitor the amount and type of traffic on the LAN and the WAN, monitor the amount and type of network traffic going to and from each client device to the WAN, maintain a database of pending data transfer transactions both to and from client devices that are being executed or need to be executed in the future, as well as any specific time scheduling information associated with pending transactions, use various combinations of the above-listed data sets to decide the order in which pending and/or paused transactions and/or sub-transactions can be executed, which can be paused or delayed, and for how long they can be delayed, and which specific time slot, if any, can be associated with a future transaction and/or sub-transaction.

For example, in an embodiment, the connection manager 318 generates a prediction model by using archived historical network connection and disconnection information for client devices to determine an opportunistic time to schedule the agents 317 to perform operations at opportunistic times. In some embodiments, the connection manager 318 generates the prediction model by using a prediction modeling service (e.g., service 702 of FIG. 7).

In a particular implementation, each agent 317 is an application-aware network proxy agent that is constructed to process transactions and/or sub-transactions related to the service 121 that is identified by a corresponding destination IP address and destination port. In some embodiments, the system 100 also uses the protocol of the service 121 to identify the service 121. Generally, each agent 317 can be implemented as a software module that includes machine-executable instructions that when executed by the processor 302, control the system 100 to process transactions and/or sub-transactions related to the corresponding service. Generally in this document, references to "transactions" is understood to encompass relevant sub-transactions.

When an agent 317 wishes to receive packets from the LAN network protocol module 113, it sends a request to the agent controller 325 to update the content table controller 203 (of FIG. 2) for the switch 112 to add an entry in the content table 201 for the switch 112 that includes the following: a protocol for the operation provided by the agent 317 (e.g., TCP or UDP); an IP address of the service 121 as the destination IP address; a port of the service 121 as the destination port; a wildcard (e.g., "*") for each of the source IP address and the source port; and the port ID (PID) of the agent 317. The agent 317 also registers itself with the LAN network protocol module 113 so that the agent 317 receives packets matching the protocol, IP address and port of the service provided by the agent 317. After the agent 317 has registered with the LAN network protocol module 113, the LAN network protocol module 113 forwards any packets it receives from the switch 112 that match the protocol, IP address and port of the service 121 provided by the agent 317. Some operations provided by the system 100 involve interaction with sources and/or destinations other than a service 121, such as for example, local and/or remote user devices, sharing systems, and/or other devices in communication with the system 100.

When a LAN client (e.g., user device 105 or 106), establishes a transport layer connection with the agent 317, the agent 317 spawns a copy of itself with a new unique agent port ID (PID), and then sends a request to the agent controller 325 to add an entry in the content table 201 that includes the following: the protocol of the service provided by the agent 317 (e.g., TCP or UDP); the IP address of the service as the destination IP address; the port of the service as the destination port; an IP address of the LAN client as the source IP address; a port of the LAN client as the source port; and the new PID as the PID of the agent 317. After the transport layer connection is established, subsequent packets from the LAN client are forwarded to the agent 317 having the new PID, based on the newly added entry in the content table 201.

When an agent 317 wishes to stop receiving packets from the LAN network protocol module 113, it sends a request to the agent controller 325 to update the content table controller 203 (of FIG. 2) for the switch 112 to remove the agent's entry in the content table 201 for the switch 122.

When an agent 317 wishes to update its content table 201 entry, it sends a request to the agent controller 325 to update the content table controller 203 (of FIG. 2) for the switch 112 to update the agent's entry in the content table 201 with an updated entry.

When an agent 317 wishes to receive packets from the WAN network protocol module 114, it registers itself with the WAN network protocol module 114 so that the agent 317 receives packets matching the protocol, IP address and port of the transaction initiated by the agent 317. After the agent 317 has registered with the WAN network protocol module 114, the WAN network protocol module 114 forwards packets it receives from the switch 112 that match the protocol, IP address and port of the transaction initiated by the agent 317.

Having described the architecture and particular components of the system 100, an example architecture of a user device is described below.

User Device Architecture

Figure 6:
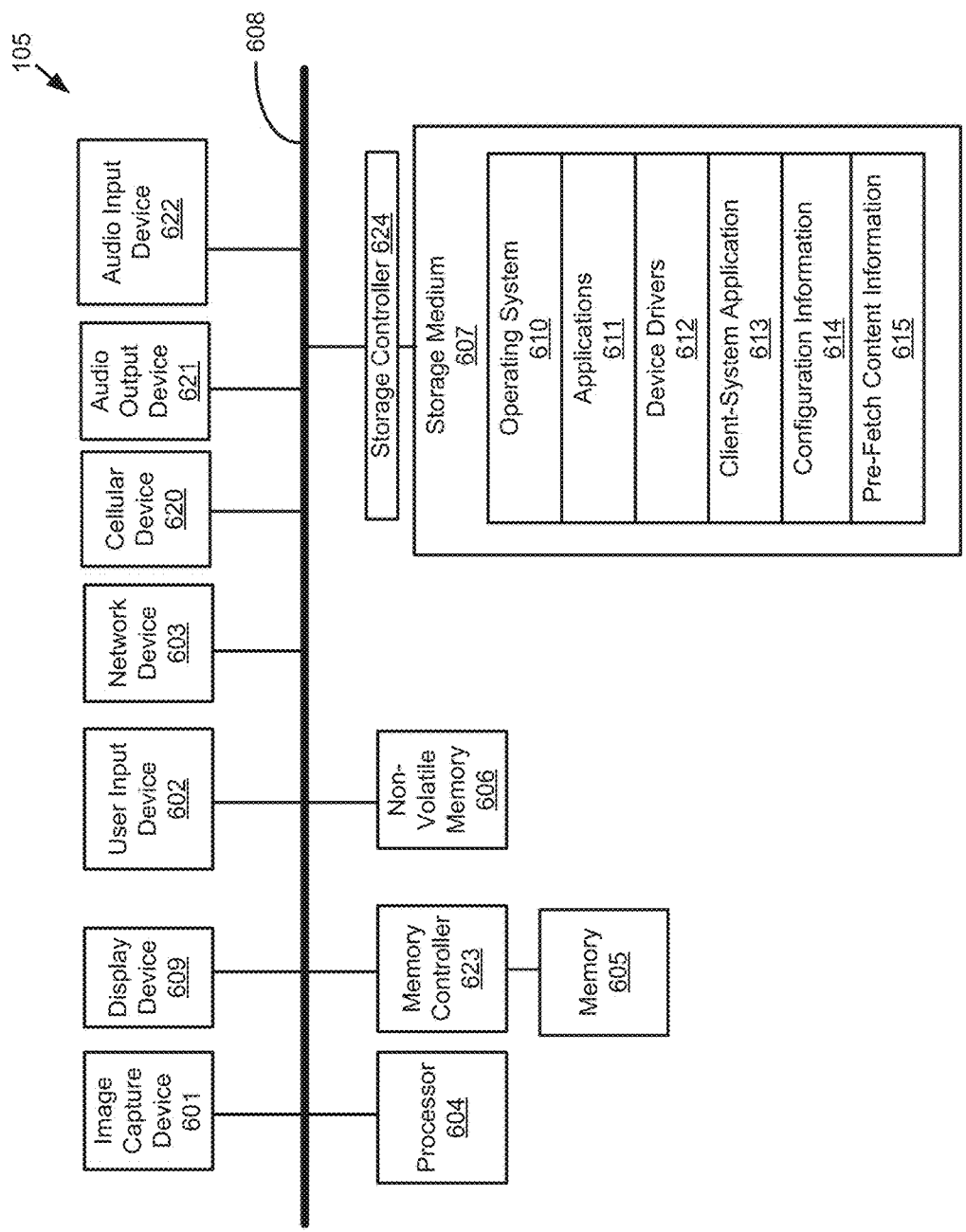
FIG. 6 is a detailed block diagram depicting architecture of a user device, according to an example embodiment.

FIG. 6 is a detailed block diagram of the exemplary user device 105 of FIG. 1. One of ordinary skill recognizes that the user devices illustrated in the figures and described herein, are merely examples, and that there are many types of user devices that are contemplated for interaction with the system 100 of various embodiments.

As shown in FIG. 6, the user device 105 includes a bus 608 that interfaces with a processor 604, volatile memory controller 623 such as for controlling random access memory (RAM) for example, a non-volatile memory 606, a storage controller 624, a network device 603, an image capture device 601, a display device 609, a user input device 602, a cellular device 620 (e.g., a GSM or a CDMA radio), an audio output device 621 (e.g., a speaker), and an audio input device 622 (e.g., a microphone).

The processor 604 may take many forms, such as, for example, a central processing unit (processor), a multiprocessor unit (MPU), an ARM processor, and the like.

The non-volatile memory 606 may take many forms, such as, for example, a read only memory (ROM), erasable programmable read only memory (EPROM), a non-volatile flash memory, and the like.

The network device 603 provides one or more wired and/or wireless interfaces for exchanging data and commands between the system 100 via the router 107. Such wired and/or wireless interfaces include, for example, a Universal Serial Bus (USB) interface, Bluetooth interface, Wi-Fi interface, Ethernet interface, Near Field Communication (NFC) interface, Radio Frequency interface, multimedia over co-axial (MoCA) interface, and the like.

Machine-executable instructions in software programs (such as an operating system 610, application programs 611, and device drivers 612) are loaded into the memory 605 (via the memory controller 623) from the storage medium 607 (via the storage controller 624), the non-volatile memory 606 or another storage location. During execution of software programs, the respective machine-executable instructions are accessed by the processor 604 via the bus 608, and then executed by the processor 604. Data used by software programs are also stored in the memory 605, and such data is accessed by the processor 604 during execution of the machine-executable instructions of the software programs.

The storage medium 607 is typically a non-transitory computer-readable storage medium, such as, for example, a hard drive, a flash drive, a DVD, a CD, a flash storage, a solid state drive, a RAID array (Redundant Array of Inexpensive Disks), JBOD (Just A Bunch of Disks), and the like. In other implementations, the storage medium is a distributed storage medium involving multiple storage devices. The storage medium 607 includes an operating system 610, software programs 611, device drivers 612, a client-system application 613, configuration information 614, and pre-fetch content information 615.

In an example embodiment, the client-system application 613 includes machine-executable instructions that when executed by the processor 604, control the user device 105 to configure the system 100 by providing the system 100 with configuration information 614 about personal preferences for a user of the device 105, the user's devices, the user's social networks, and the like. This configuration information 614 is used to generate the pre-fetch content information 615. In an example embodiment, the client-system application 613 communicates with a configuration operation for the system 100 to configure the system 100 (by using the client API 326 of FIG. 4). In an example embodiment, the client-system application 613 is constructed to receive information provided by the user, and is also constructed to automatically retrieve configuration information 614 from the user device 105.

In an implementation, the configuration operation is provided by a configuration agent 317 that may run on the system 100. In an implementation, the configuration service is an HTTP service. The client-system application 613 is preconfigured with a predetermined IP address that is assigned to the configuration service, and the configuration agent 317 communicates with the client-system application 613 to control the user device 105 to present a Graphical User Interface (GUI) for manually entering the configuration information 614. In an implementation, the client-system application 613 is constructed to generate the pre-fetch content information 615 by applying analytics to the configuration information 614.

The client-system application 613 is constructed to communicate with the system 100 to perform transactions in a non-transparent manner, by using client API 326.

In an example embodiment, the client-system application 613 includes machine-executable instructions that when executed by the processor 604, control the user device 105 to provide a cache service server (e.g., the cache service server 1500 of FIG. 15) with configuration information 614 about personal preferences for a user of the device 105, the user's devices, the user's social networks, and the like. The cache service server uses the configuration information 614 to generate pre-fetch content information (as will be discussed below). In an example embodiment, the client-system application 613 communicates with the cache service sever by using a protocol, IP address and port of the cache service server.

Having described an exemplary user device, the operation of the decoupling module 120 is further described below. For instance, a decoupling transparent proxy operation is described herein.

Decoupling Transparent Proxy—Overview

The decoupling transparent proxy operation involves separating an operation (e.g., a single transaction) into multiple (two or more) separate sub-transactions. Transactions are originated by one or more of a client device via a LAN, a server via a WAN, a client device via the WAN, and the system 100 itself. Transactions, operations and/or requests originating from multiple directions are referred to herein as multi-directional. In a case where a transaction originates from a client of the system 100, the first sub-transaction (or series of first sub-transactions) is a request from a client (e.g., the phone 105 or the tablet 106) to the proxy (e.g., the system 100). A second sub-transaction (or series of sub-transactions) is a request from the proxy to a destination server (e.g., of the service 121 of FIG. 1) accessible via a WAN (e.g., the Internet 111) The second sub-transaction (or series of sub-transactions) is performed concurrently with the first sub-transaction, immediately after completion of the first sub-transaction, or at an opportunistic time. FIG. 8 is a sequence diagram depicting an exemplary decoupling transparent proxy operation that involves a LAN client 105 and/or 106, the system 100, and the service 121. In the example embodiment of FIG. 8, and for purposes of simplified explanation, the LAN client is the phone 105 of FIG. 1, and the WAN server is the server 122 of the service 121 of FIG. 1. Other configurations are contemplated, as well. As shown in FIG. 8, a transaction (an API call) is decoupled into two sub-transactions. The first sub-transaction involves communication between the LAN client 105 and the system 100 (steps S801-S806). The second sub-transaction involves communication between the system 100 and the WAN server 122 (steps S807-S808).

In an example embodiment, the transaction is an API call. As illustrated in FIG. 8, data is sent along with the API call. This data can be, for example, parameters related to the API call, data to be processed by the service 121 in servicing the API call, and the like. In FIG. 8, after sending the API call, along with the related data, the LAN client 105 receives a message from the system 100 indicating that the API call has completed. This message is constructed such that it emulates the message that would have been sent by the WAN server 122 had the LAN client 105 communicated directly with the WAN server 122. In an example embodiment, this message is encapsulated in the network, transport and application layer protocols (e.g., IP, TCP and HTTP). In some embodiments, more than one application layer protocol is used for the message, and any combination of application layer protocols can be used. In FIG. 8, the system 100 does not return data to the LAN client 105, since the API call is not an API call to retrieve data (e.g., a download or a streaming API call). In the case of an API call to receive data, the system 100 returns, to the LAN client 105, the data that is retrieved in accordance with the API call.

Decoupling Transparent Proxy—Configuration

Prior to performance of a decoupling transparent proxy operation, the system 100 is configured to provide the decoupling transparent proxy operation for the service 121.

In an example embodiment, this configuration can be performed by a user of the system 100, it can be performed by a manufacturer of the system 100, or it can be performed remotely by the service 121. In some embodiments, the system 100 can be configured to provide the decoupling transparent proxy operation for the service 121 by any one of a user, a manufacturer, or a service provider.

Specifically, the configuration involves downloading the machine-executable instructions of the agent 317 for the service 121 onto the storage medium 104 of the system 100. The machine-executable instructions of the agent 317 include machine-executable instructions for emulating a WAN server 122 of the service 121. The machine-executable instructions of the agent 317 also include machine-executable instructions for emulating a client of the service 121. The machine-executable instructions of the agent 317 that emulate the WAN server 122 are executed by the processor 302 when the system 100 communicates with the LAN client (e.g., phone 105 of FIG. 1) on behalf of the service 121. The machine-executable instructions of the agent 317 that emulate the client (e.g., phone 105) are executed by the processor 302 when the system 100 communicates with the WAN server 122 on behalf of the LAN client (e.g., phone 105). In an example embodiment, the machine-executable instructions of the agent 317 do not emulate all functionality of a WAN server 122 of the service 121. In some embodiments, the machine-executable instructions of the agent 317 do emulate some or all functionality of a WAN server 122 of the service 121. In an example embodiment, the machine-executable instructions of the agent 317 do not emulate all functionality of the LAN client. In some embodiments, the machine-executable instructions of the agent 317 do emulate some or all functionality of the LAN client.

After the machine-executable instructions of the agent 317 are downloaded, the machine-executable instructions of the agent 317 are executed by the processor 302 to run the agent 317 on the system 100. While running, the agent 317 of the service 121 registers itself, as described above, so that the agent 317 receives packets having the protocol, destination IP address and the destination port that are associated with the service 121. As described above, agent 317 uses the agent controller 325 to add a new content table entry to the content table 201, so that the switch 112 forwards packets having the protocol, the destination IP address and the destination port that are associated with the service 121 to the LAN network protocol module 113, which then forwards such packets to the agent 317.

Decoupling Transparent Proxy—Process

Having described configuration of the decoupling module 120, the process of performing a decoupling transparent proxy operation for the service 121 is described herein, with reference to FIG. 8.

At step S801, the system 100 receives a request from the LAN client 105 to establish a transport layer connection with the WAN server 122 of the service 121. The protocol, the destination IP address and the destination port specified in the transport layer connection request identify the service 121. More specifically, the switch 112 of the system 100 receives a packet of the request via the LAN network device 102, and compares the content 206 of the packet (which includes the protocol, the destination IP address and the destination port) with the content table 201 to identify a match. Since the agent 317 of the service 121 had previously registered itself, and since the content table 201 was updated to provide the protocol, the destination IP address and the destination port of the service 121, a match between the content 206 of the packet and the content table is identified as a result of the comparison. Since a match is identified, the switch 204 forwards the packet to the LAN decoupling module reception packet buffer 214 where it is received by the LAN network protocol module 113. The LAN network protocol module 113 forwards the packet to the agent 317. Thereafter, processing proceeds to the step S802.

At step S802, upon receiving the packet, the agent 317 of the system 100 emulates the WAN server 122 by performing a transport layer handshake to establish the transport layer connection with the LAN client 105. The agent 317 emulates the WAN server 122 by using the protocol, the IP address and the port of the service 121 as the protocol, source IP address and the source port when performing the transport layer handshake.

The process by which the agent 317 sends packets to the LAN client 105 is now described. To send a packet to the LAN client 105, the agent 317 sends the packet to the LAN network protocol module 113 to send the packet to the LAN decoupling module transmission packet buffer 215 of the switch 122. The LAN decoupling module transmission packet buffer 215 forwards the packet to the LAN transmission packet buffer 210. The LAN transmission packet buffer 210 forwards the packet to the LAN network device 102, where the packet is forwarded to the LAN client 105 via the router 107.

At step S803, the system 100 receives a packet (or series of packets) from the LAN client 105 for an API call. The packet (or series of packets) is received by the agent 317 in the manner described above for S801. The API call is encapsulated in the network, transport and application layer protocols (e.g., IP, TCP, HTTP). In some embodiments, more than one application layer protocol is used for the API call. For example, the API call can use HTTP in conjunction with OAUTH 2.0. Embodiments may include any combination of application layer protocols for the API call.

At step S804, upon receiving the packet (or series of packets) for the API call, the agent 317 extracts the API call from each application layer protocol of the packet (or series of packets). The agent 317 determines whether the API call is supported by the agent 317. An exemplary API call encapsulated in the HTTP application layer protocol and the OAUTH2.0 application layer protocol is depicted in FIG. 10. More specifically, the API call depicted in FIG. 10 is an upload request for the exemplary YouTube service.

Many examples herein relate to the YouTube service. The examples relating to the YouTube service are merely exemplary, and the disclosure herein contemplates many operations with respect to several services in addition to the YouTube service.

Figure 9:
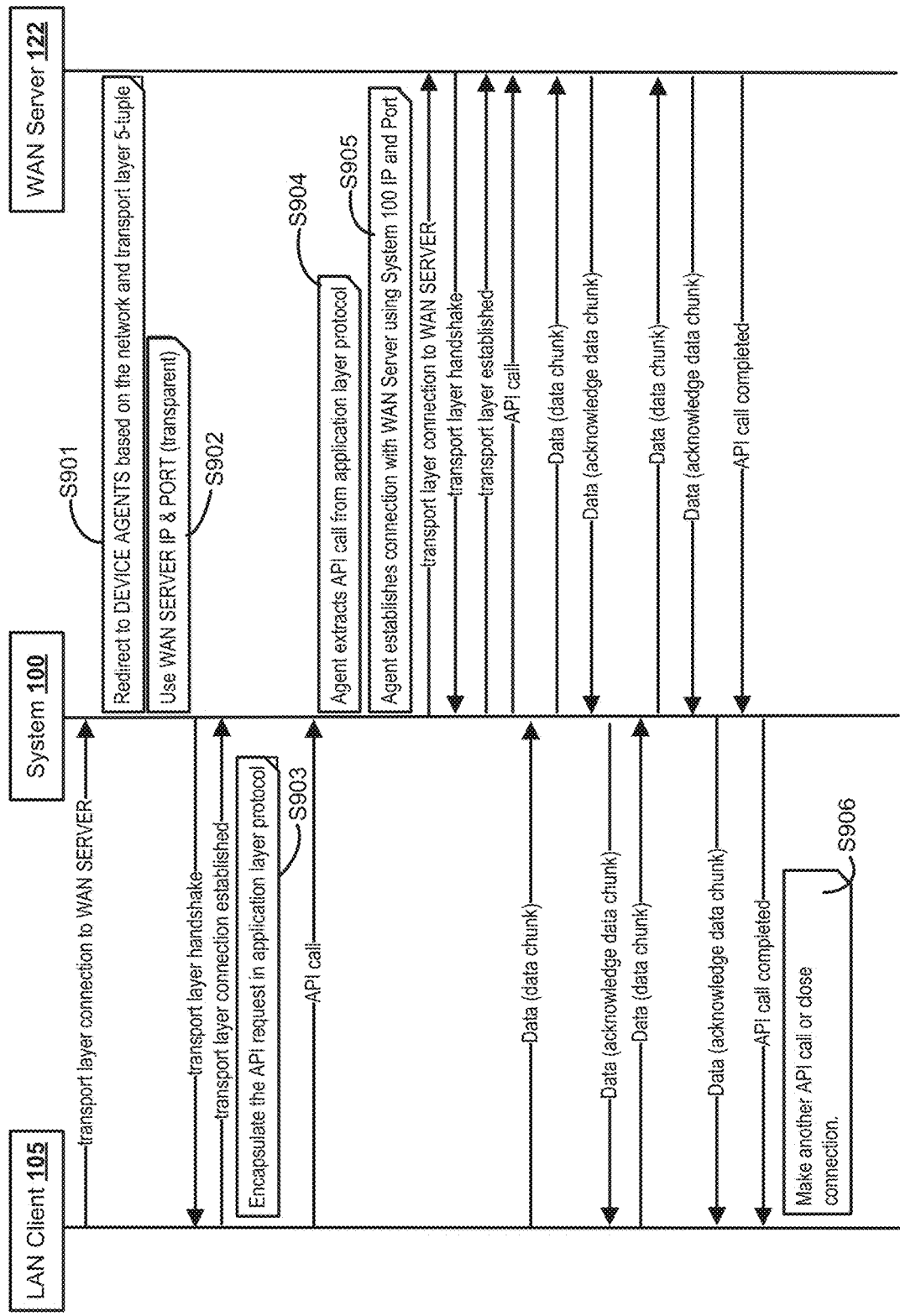
FIG. 9 is a sequence diagram depicting an unsupported API call, according to an example embodiment.

FIG. 8 depicts a supported API call. Accordingly, the remainder of the description of FIG. 8 addresses the case in which the API call is supported. FIG. 9, described next, depicts an exemplary API call that is not supported by the agent 317.

At step S805, the agent 317 begins receiving data from the LAN client 105. The data is related to the API call. Since the agent 317 supports the API call (extracted at S804) the agent 317 services the API call upon reception of the data. The agent 317 also caches the data, as it is received, in the storage medium 104 (of FIG. 1). More specifically, in the example embodiment, the agent 317 caches the data by sending a request to the cache controller 323 to store the data in the storage medium 104 by using the storage controller 116. In the example embodiment, the agent 317 also caches the API call (e.g., the API call shown in FIG. 10).

The agent 317 sends an acknowledgment response ("Data (acknowledge data chunk)") upon reception of each additional data chunk ("Data (data chunk)") from the LAN client 105 until all of the data is received from the LAN client 105. Each data chunk may be composed of one or more transport layer transactions. Upon reception of the data from the LAN client 105, the agent 317 sends a message to the LAN client 105 indicating that the API call has completed. The agent 317 constructs this message such that it emulates the message that would have been sent by the WAN server 122 had the LAN client 105 communicated directly with the WAN server 122. In an example embodiment, this message is encapsulated in the network, transport and application layer protocols (e.g., IP, TCP, HTTP). In some embodiments, more than one application layer protocol is used for the message, and any combination of application layer protocols can be used. FIG. 30 depicts an exemplary message indicating the completion of the API call. As depicted in FIG. 30, the message is an HTTP message that corresponds to a YouTube "upload" API call.

At S806, the LAN client 105 makes no further API calls, and the connection between the LAN client 105 and the system 100 is closed. At this point, the second sub-transaction (of the API call transaction) continues without further interaction from the LAN client 105.

The second sub-transaction (steps S807-S808 of FIG. 8) is now described. The agent 317 can perform the second sub-transaction (which involves communication between the system 100 and the WAN server 122) concurrent with the first sub-transaction, immediately after completion of the first sub-transaction, or at an opportunistic time. For example, the second sub-transaction can be scheduled to be performed opportunistically at a time that minimizes blocking on the shared WAN link. Additionally, the rate at which data is transferred in the second sub-transaction can be adjusted to minimize blocking on the shared WAN link.

More specifically, in an example embodiment, the agent scheduler 315 controls the rate at which packets sent by the agent 317 are forwarded to the WAN network protocol module 114, based on input from the connection manager 318. The connection manager 318 uses the traffic statistics 319 to determine an available rate such that blocking on the shared WAN link is minimized. This rate is then used by the agent scheduler 315 to determine a rate at which packets sent by an individual agent 317 can be forwarded to the WAN network protocol module 114. Additionally, in the example embodiment, the scheduler 315 controls the timing at which the agent 317 can begin sending packets to the WAN network protocol module 114. The timing is based on input from the connection manager 318 which uses the traffic statistics 319 to determine available times such that blocking on the shared link is minimized. In an example embodiment, in a case where performing a second transaction may cause blocking on the shared WAN link, the connection manager 318 notifies the agent scheduler 315 of the channel availability times and available rate. The agent scheduler 315 then delays the performance of the second sub-transaction by agent 317. Using input from the connection manager 318 and the active agents' rate requirements, the agent scheduler 315 determines that it is an opportunistic time and rate for an agent 317 to resume communication via the WAN link and notifies the agent 317 to begin communication. In an example embodiment, the agent scheduler 315 determines an agent 317 that is to begin the communication based on, for example, the available link rate, a priority, a transaction type, a service type, a data amount, or other suitable type of information.

At S807, the agent scheduler 315 has permitted the agent 317 to perform the second sub-transaction, which involves communication with the WAN server 122. In an example embodiment, the agent 317 is constructed for communication with the WAN server 122, and therefore the protocol, the IP address and the port of the WAN server are known to the agent 317, and do not need to be cached. In some embodiments, the protocol, the IP address and the port of the WAN server are stored in the cache.

Using the protocol, the IP address and the port of the WAN server 122, the agent initiates a transport layer connection to the WAN server 122. In initiating the connection, the agent uses an IP address and port of the system 100 as the source IP address and the source port, respectively. In other words, the transport layer connection is initiated between the IP address and port number of the system 100, and the IP address and the port of the WAN server. The agent 317 receives a transport layer handshake from the WAN sever 122, and thereafter the agent 317 establishes the transport layer connection with the WAN server 122.

The process by which the agent 317 sends packets to the WAN server 122 is now described. To send a packet to the WAN server 122, the agent 317 sends the packet to the WAN network protocol module 114, which forwards the packet to the WAN decoupling module transmission packet buffer 212 of the switch 122. The WAN decoupling module transmission packet buffer 212 forwards the packet to the WAN transmission packet buffer 209. The WAN transmission packet buffer 209 forwards the packet to the WAN network device 103, where the packet is forwarded to the WAN server 122 via the modem 130 and the ISP 110 of FIG. 1.

The process by which the agent 317 receives packets from the WAN server 122 is now described. When the switch 112 of the system 100 receives a packet via the WAN network device 103 that is destined for an agent 317 running on behalf of the decoupling module 120, the switch 112 compares the destination MAC address of the packet with the MAC table 202 to identify a match. Since the packet is destined for the agent 317, a match is identified as a result of the comparison, and the switch 205 forwards the packet to the WAN decoupling module reception packet buffer 213. The WAN decoupling module reception packet buffer 213 forwards the packet to the WAN network protocol module 114, which forwards the packet to the agent 317.

After the step S807, processing proceeds to the step S808. At the step S808, the agent 317 makes the API call to the WAN server 122. More specifically, the agent 317 retrieves the cached API call (e.g., the API call shown in FIG. 10) that was used in the first sub-transaction, by using the cache controller 323. The agent 317 encapsulates the cached API call in one or more application layer protocols (as discussed above for step S803, some embodiments use more than one application layer protocol), and then sends the API call to the WAN server 122 via the established transport layer connection. The agent 317 also retrieves the cached data that was used in the first sub-transaction (at S805), by using the cache controller 323. The agent 317 then begins sending the cached data to the WAN server 122. The WAN Server services the API call.

The agent 317 sends additional data chunks ("Data (data chunk)") to the WAN server 122, and the WAN server 122 sends an acknowledgment response ("Data (acknowledge data chunk)") upon reception of each additional data chunk. Each data chunk may be composed of one or more transport layer transactions. Upon reception of the data from the agent 317, the WAN server 122 sends a message to the agent 317 indicating that the API call has completed. In an example embodiment, this message is encapsulated in the network, transport and application layer protocols (e.g., IP, TCP, HTTP). In some embodiments, more than one application layer protocol is used for the message, and any combination of application layer protocols can be used. This message is similar to the message sent by the agent 317 to the LAN client 105 at S805. After receiving this message, the agent 317 makes no further API calls, and the connection between the agent 317 and the WAN server 122 is closed. At this point, the sub-transactions are complete and the API call transaction has generally completed.

As described above, FIG. 8 depicts a supported API call. FIG. 9 by contrast, depicts an exemplary API call that is not supported by the agent 317.

The description of the steps S901 to S904 of FIG. 9 is the same as that of the steps S801 to S804 of FIG. 8.

At S905, the agent 317 determines that the API call is not supported by the agent 317. The agent 317 uses the protocol, the IP address and the port of the WAN server 122 to initiate a transport layer connection to the WAN server 122. In initiating the connection, the agent uses an IP address and port of the system 100 as the source IP address and the source port, respectively. In other words, the transport layer connection is initiated between the IP address and port number of the system 100, and the IP address and the port of the WAN server. The agent 317 receives a transport layer handshake from the WAN sever 122, and thereafter the agent 317 establishes the transport layer connection with the WAN server 122.

After establishing the connection, the agent 317 makes the API call (received from the LAN client 105) to the WAN server 122. The agent 317 encapsulates the cached API call in one or more application layer protocols (as discussed above for step S803, some embodiments use more than one application layer protocol), and sends the API call to the WAN server 122 via the established transport layer connection. The agent 317 then begins forwarding the data received from the LAN client 105 to the WAN server 122. The WAN Server 122 services the API call upon reception of a data chunk (which may be composed of one or more transport layer transactions), and sends an "acknowledge" response from the WAN server 122 to the agent 317. In some embodiments, the "acknowledge" response comprises confirmation of receipt. Each acknowledge response is forwarded by the agent 317 to the LAN client 105.

The agent 317 sends additional data chunks (which may be composed of one or more transport layer transactions) to the WAN server 122, as they are received from the LAN client 105, until all of the data for this transaction has been sent to the WAN server 122. The WAN server 122 sends an acknowledge response upon reception of each additional data chunk from the agent 317. Each acknowledgment response is forwarded by the agent 317 to the LAN client 105.

Upon reception of all of the data from the agent 317, the WAN server 122 sends a message to the agent 317 indicating that the API call has completed. The agent 317 forwards this message to the LAN client 105. In an example embodiment, this message is encapsulated in the network, transport and application layer protocols (e.g., IP, TCP, HTTP). In some embodiments, more than one application layer protocol is used for the message, and any combination of application layer protocols can be used.

At step S906, after receiving this message, the LAN client 105 makes no further API calls, and the connection between the LAN client 105 and the agent 317 is closed. Accordingly, the agent 317 makes no further API calls, and the connection between the agent 317 and the WAN server 122 is closed. At this point, the unsupported API call transaction generally has completed.

Upload Transaction

Figure 11:
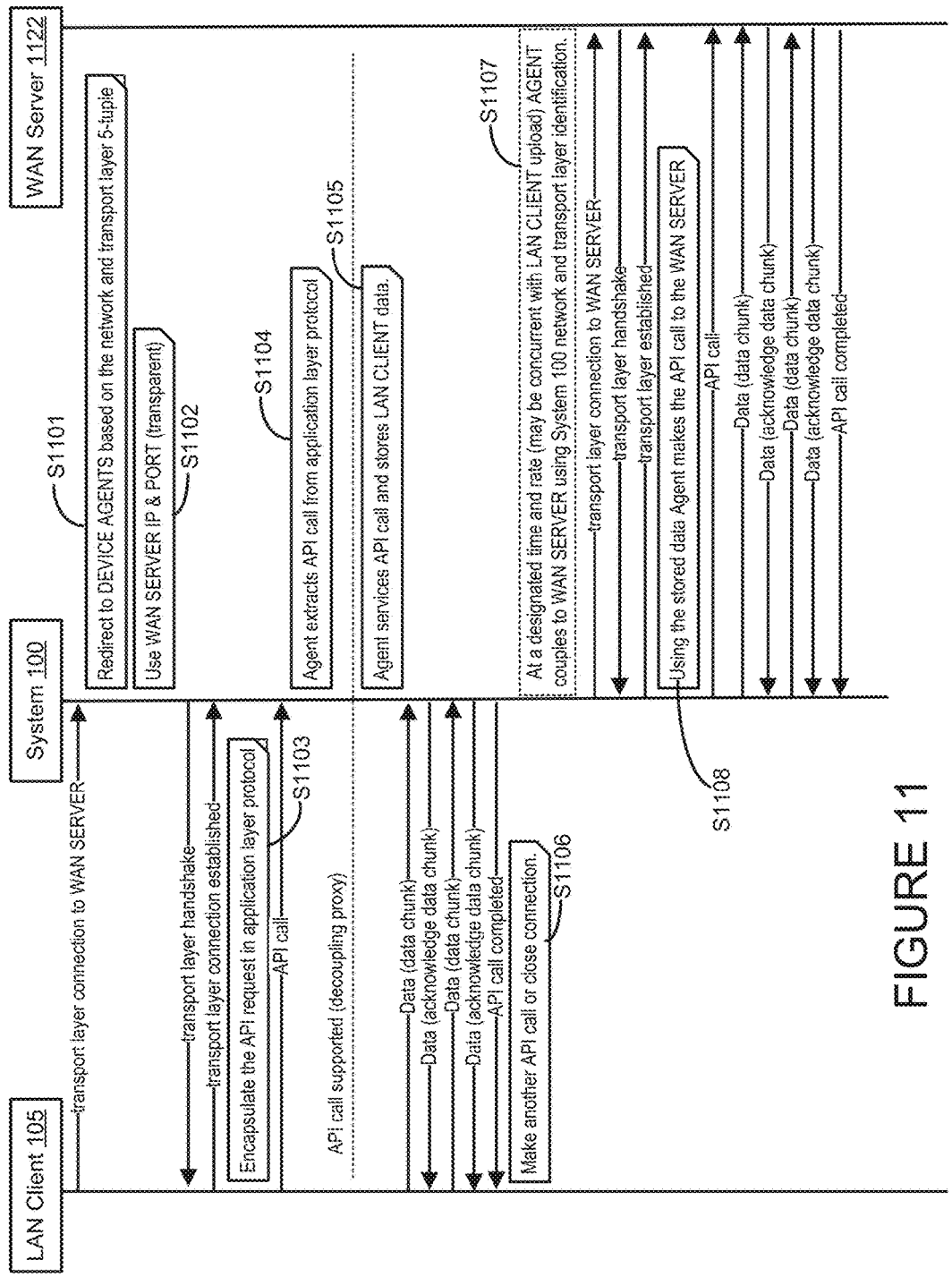
FIG. 11 is a sequence diagram depicting an upload API call, according to an example embodiment.

Having described the process of performing a decoupling transparent proxy operation for a general API call, the process of performing a decoupling transparent proxy operation for an upload API call is now described, with reference to FIG. 11. In FIG. 11, the particular transaction is a YouTube upload API call for the YouTube service. In some embodiments, the upload API call can be another type of upload API call for another service. In FIG. 11, the data to be uploaded is sent along with the API call. In FIG. 11, after sending the API call, along with the related data, the LAN client 105 receives a message from the system 100 indicating that the API call has completed. This message is constructed such that it emulates the message that would have been sent by the WAN server 1122 had the LAN client 105 communicated directly with the WAN server 1122. In an example embodiment, this message is encapsulated in the network, transport and application layer protocols (e.g., IP, TCP, HTTP). In some embodiments, more than one application layer protocol is used for the message, and any combination of application layer protocols can be used.

Prior to performance of the YouTube upload operation, the decoupling module 120 is configured to provide the decoupling transparent proxy operation for the YouTube service, in a manner similar to that described above for FIG. 8.

Specifically, the configuration involves downloading the machine-executable instructions of the YouTube agent (e.g., an agent 317) for the YouTube service onto the storage medium 104 of the system 100. The machine-executable instructions of the YouTube agent include machine-executable instructions for emulating a WAN server 1122 of the YouTube service. The machine-executable instructions of the YouTube agent include machine-executable instructions for emulating a client of the YouTube service. The machine-executable instructions of the YouTube agent that emulate the WAN server 1122 are executed by the processor 302 when the system 100 communicates with the LAN client (e.g., phone 105 of FIG. 1) on behalf of the YouTube service.

The machine-executable instructions of the YouTube agent that emulate the client (e.g., phone 105) are executed by the processor 302 when the system 100 communicates with the WAN server 1122 on behalf of the LAN client (e.g., phone 105). In an example embodiment, the machine-executable instructions of the YouTube agent do not emulate all functionality of a WAN server 1122 of the YouTube service. For example, in an example embodiment, the machine-executable instructions of the YouTube agent do not emulate an "update playlist" API call. In some embodiments, the machine-executable instructions of the YouTube agent do emulate all functionality of a WAN server 1122 of the YouTube service. In an example embodiment, the machine-executable instructions of the YouTube agent do not emulate all functionality of the LAN client. In some embodiments, the machine-executable instructions of the YouTube agent do emulate all functionality of the LAN client.

After the machine-executable instructions of the YouTube agent are downloaded, the machine-executable instructions of the YouTube agent are executed by the processor 302 to run the YouTube agent on the system 100. While running, the YouTube agent of the YouTube service registers itself, as described above, so that the YouTube agent receives packets having the protocol, the destination IP address and the destination port that are associated with the YouTube service. As described above, the agent 317 sends an add request to add a new content table entry to the content table 201, so that the switch 112 forwards packets having the protocol, the destination IP address and the destination port that are associated with the YouTube service to the YouTube agent.

Having described configuration of the system 100 for use with the YouTube service, the process of performing a YouTube upload operation for the YouTube service is now described, with reference to FIG. 11.

At step S1101, the system 100 receives a request from the LAN client 105 to establish a transport layer connection with the WAN server 1122 of the YouTube service. The protocol, the destination IP address and the destination port specified in the transport layer connection request identify the YouTube service. More specifically, the switch 112 of the system 100 receives a packet of the request via the LAN network device 102, and compares the content 206 of the packet (which includes the protocol, the destination IP address, the destination port, the source IP address and the source port) with the content table 201 to identify a match. Since the YouTube agent had previously registered itself, and since the content table 201 was updated to provide the protocol, destination IP address and the destination port of the YouTube service, a match between the content 206 of the packet and the content table is identified as a result of the comparison. The switch 204 forwards the packet to the LAN decoupling module reception packet buffer 214 where it is received by the LAN network protocol module 113. The LAN network protocol module 113 forwards the packet to the YouTube agent. Thereafter, processing proceeds to step S1102.

At step S1102, upon receiving the packet, the YouTube agent of the system 100 emulates the WAN server 1122 by performing a transport layer handshake to establish the transport layer connection with the LAN client 105. The YouTube agent emulates the YouTube WAN server 1122 by using the IP address and port of the YouTube service as the source IP address and the source port when performing the transport layer handshake.

At step S1103, the system 100 receives a packet (or series of packets) from the LAN client 105 for the YouTube upload API call. The packet (or series of packets) is received by the YouTube agent. The YouTube upload API call is encapsulated in the network, transport and application layer protocols (e.g., IP, TCP, HTTP). In some embodiments, more than one application layer protocol is used for the API call. For example, the API call can use HTTP in conjunction with OAUTH 2.0. Embodiments may include any combination of application layer protocols for the API call.

At step S1104, upon receiving the packet (or series of packets) for the YouTube upload API call, the YouTube agent extracts the API call from each application layer protocol of the packet (or series of packets). The YouTube agent determines whether the API call is supported by the YouTube agent. In an example embodiment, the YouTube upload API call is supported by the YouTube agent, and thus the agent determines that this API call is a supported API call. An exemplary YouTube upload API call is depicted in FIG. 10.

At step S1105, the YouTube agent begins receiving the upload data (video data chunk) from the LAN client 105. Since the YouTube agent supports the upload API call (extracted at step S1104) the YouTube agent services the API call and acknowledges each video data chunk (which may be composed of one or more transport layer transactions) upon reception of the data from the LAN client 105. The YouTube agent also caches the data, as it is received, in the storage medium 104 (of FIG. 1). More specifically, in an example embodiment, the YouTube agent caches the data by sending a request to the cache controller 323 to store the data in the storage medium 104 by using the storage controller 116. In an example embodiment, the YouTube agent also caches the transaction by storing the API call (e.g., the API call shown in FIG. 10). In an example embodiment, the cached API call includes the HTTP method (e.g., POST) and the OAUTH 2.0 token.

The YouTube agent sends an acknowledge response upon reception of each additional upload data chunk from the LAN client 105 until all of the data is received from the LAN client 105. Upon reception of all of the data from the LAN client 105, the YouTube agent sends a message to the LAN client 105 indicating that the upload API call has completed. The YouTube agent constructs this message such that it emulates the message that would have been sent by the YouTube WAN server 1122 had the LAN client 105 communicated directly with the WAN server 1122. In an example embodiment, this message is encapsulated in the network, transport and application layer protocols (e.g., IP, TCP, HTTP). In some embodiments, more than one application layer protocol is used for the message, and any combination of application layer protocols can be used. FIG. 30 depicts an exemplary message indicating the completion of the YouTube upload API call.

At step S1106, the LAN client 105 makes no further API calls, and the connection between the LAN client 105 and the system 100 is closed. At this point, the second sub-transaction (of the YouTube upload API call transaction) continues without further interaction from the LAN client 105.

The second sub-transaction (steps S1107-S1108 of FIG. 11) is now described. The agent 317 can perform the second sub-transaction (which involves communication between the system 100 and the YouTube WAN server 1122) concurrent with the first sub-transaction, immediately after completion of the first sub-transaction, or at an opportunistic time, as described above for FIG. 8.

At step S1107, the agent scheduler 315 has permitted the YouTube agent to perform the second sub-transaction, which involves communication with the YouTube WAN server 1122. In an example embodiment, the YouTube agent is constructed for communication with the YouTube WAN server 1122, and therefore the protocol, the IP address and the port of the WAN server are known to the YouTube agent, and do not need to be cached. In some embodiments, the protocol, the IP address and the port of the WAN server are stored in the cache.

Using the protocol, the IP address and the port of the WAN server 1122, the YouTube agent initiates a transport layer connection to the YouTube WAN server 1122. In initiating the connection, the YouTube agent uses an IP address and port of the system 100 as the source IP address and the source port, respectively. In other words, the transport layer connection is initiated between the IP address and port number of the system 100, and the IP address and the port of the WAN server 1122. The YouTube agent receives a transport layer handshake from the WAN sever 1122, and thereafter the YouTube agent establishes the transport layer connection with the WAN server 1122.

After step S1107, processing proceeds to step S1108. At step S1108, the YouTube agent makes the upload API call to the WAN server 1122. More specifically, the YouTube agent retrieves the cached upload API call (e.g., the API call shown in FIG. 10) that was used in the first sub-transaction, by using the cache controller 323. The YouTube agent encapsulates the cached API call in one or more application layer protocols (as discussed above for step S803, some embodiments use more than one application layer protocol), and the sends the API call to the WAN server 1122 via the established transport layer connection. The YouTube agent also retrieves the cached data that was used in the first sub-transaction (at step S1105), by using the cache controller 323. The YouTube agent then begins sending the cached data to the WAN server 1122. The WAN Server 1122 services the API call and acknowledges each video data chunk (which may be composed of one or more transport layer transactions) upon reception of the data from the YouTube agent.

The YouTube agent sends additional data chunks to the WAN server 1122 until all of the cached data for this transaction has been sent to the WAN server 1122, and the WAN server 1122 sends an acknowledge response upon reception of each additional data chunk from the YouTube agent. Upon reception of all of the data from the YouTube agent, the WAN server 1122 sends a message to the YouTube agent indicating that the upload API call has completed. In an example embodiment, this message is encapsulated in the network, transport and application layer protocols (e.g., IP, TCP, HTTP). In some embodiments, more than one application layer protocol is used for the message, and any combination of application layer protocols can be used. This message is similar to the message sent by the YouTube agent to the LAN client 105 at step S1105. After receiving this message, the YouTube agent makes no further API calls, and the connection between the YouTube agent and the WAN server 1122 is closed. At this point, the sub-transactions are complete and the YouTube upload API call transaction has generally completed.

Upload Transaction

Related Embodiments

In some embodiments, the system 100 includes further or different agents constructed to perform upload API calls to a respective remote service in a manner similar to that which has been described above for FIG. 11. In some embodiments, the agents can include, for example, a social media agent (e.g., a Facebook agent, a LinkedIn agent, and the like), a remote storage agent (e.g., a DropBox agent, a BOX agent, a Google agent, an Amazon agent, an iCloud agent, an Evernote agent, a Shutterfly agent, and the like), an application specific agent, an online service agent, and any other type of agent constructed to perform upload API calls to a respective remote service. In some embodiments, agents for specific services include a Facebook agent, an iTunes agent, an iCloud agent, an Amazon agent, and a Google agent.

Cached Uploads

In an example embodiment, in a case where data to be uploaded is cached, the data does not need to be sent from the LAN client 105 to the system 100. If, upon receiving the upload API call from the LAN client 105, the system 100 determines that the data to be uploaded (as identified in the upload API call, as specified, for example, by the HTTP header information) is cached, the agent processing the upload API call sends the message to the LAN client 105 indicating that the API call has completed. Thereafter, the agent resumes the second sub-transaction (of the "cached upload" transaction in this case) by using the previously cached upload data. In an example embodiment, the agent determines where the data to be uploaded is cached by using the cache controller 323.

The cached data (e.g., cached data 316 of FIG. 3) includes data that has been cached as a result of a prior upload API call for this same data that was received by the system 100. Such prior upload API calls include prior API calls from, for example, a same user from a same user device, a same user from a different user device, a different user from a same user device, a different user from different user device, or a different media sharing system, e.g., the system 700 of FIG. 7. The cached data also includes data that has been cached as a result of a prior download API call for this same data. The cached data also includes data that has been cached as a result of a pre-fetch operation.

Pre-Fetching for Cached Uploads

In an example embodiment, the system 100 performs pre-fetch caching to cache data that the system 100 anticipates may be needed for a future upload transaction. More specifically, the system 100 performs pre-fetch caching on the assumption that user-generated content stored on a user device is likely to be uploaded in the future. Accordingly, the system 100 communicates with each user device (e.g., phone 105 and tablet 106) to identify user-generated content (e.g., videos, pictures, audio recordings, files, data and the like) stored on the device, and then retrieves the user-generated content from each user device at a particular time and data transfer rate as described above for FIG. 8, and then caches the retrieved user-generated content in the storage medium 104.

For example, an agent 317 of the system 100 is scheduled (by the scheduler 315) to retrieve the user-generated content at a time that minimizes blocking on the shared LAN link, and at a time and data rate at which blocking on the shared LAN link is minimized. The time and data rate is determined by the agent scheduler 315 in conjunction with the connection manager 318, based on one or more of traffic statistics 319, historical network disconnection and connection information of the user devices, the type of network traffic going to and from each client device and the LAN, and/or scheduling information of the scheduler 315 that indicates pending data transfer transactions both to and from the client devices that are being executed or will be executed in the future, as well as any specific time scheduling information associated with these pending transactions.

Multi-Directional Caching

In example embodiments, the caching functionality provided by the system 100 is bi-directional, meaning that the cache data 316 on the storage medium 104 includes data that has been cached as a result of either a previous upload (LAN to WAN) operation (or upload cache pre-fetch operation) or a previous download (WAN to LAN) operation (or download cache pre-fetch operation). When an agent 317 performs a cache lookup by using the cache controller 323, the data that has been cached in either the "download direction" (WAN to LAN) or the "upload direction" (LAN to WAN) is matched.

In other words, an agent performing an upload operation is able to retrieve the upload data from the cache controller 323 if that same data is cached as a result of either a previous upload operation (or upload cache pre-fetch operation) or a previous download operation (or download cache pre-fetch operation). Similarly, an agent performing a download operation is able to retrieve the download data from the cache controller 323 if that same data is cached as a result of either a previous upload operation (or upload cache pre-fetch operation) or a previous download operation (or download cache pre-fetch operation).

In some embodiments, the decoupling and/or caching functionality provided by the system 100 is multi-directional, meaning that the system 100 can operate, receive and/or cache requests, transactions and data that may be needed, in more than two directions. The system 100 may receive the forgoing in more than two directions.

Non-Cached Download Transaction

Figure 12:
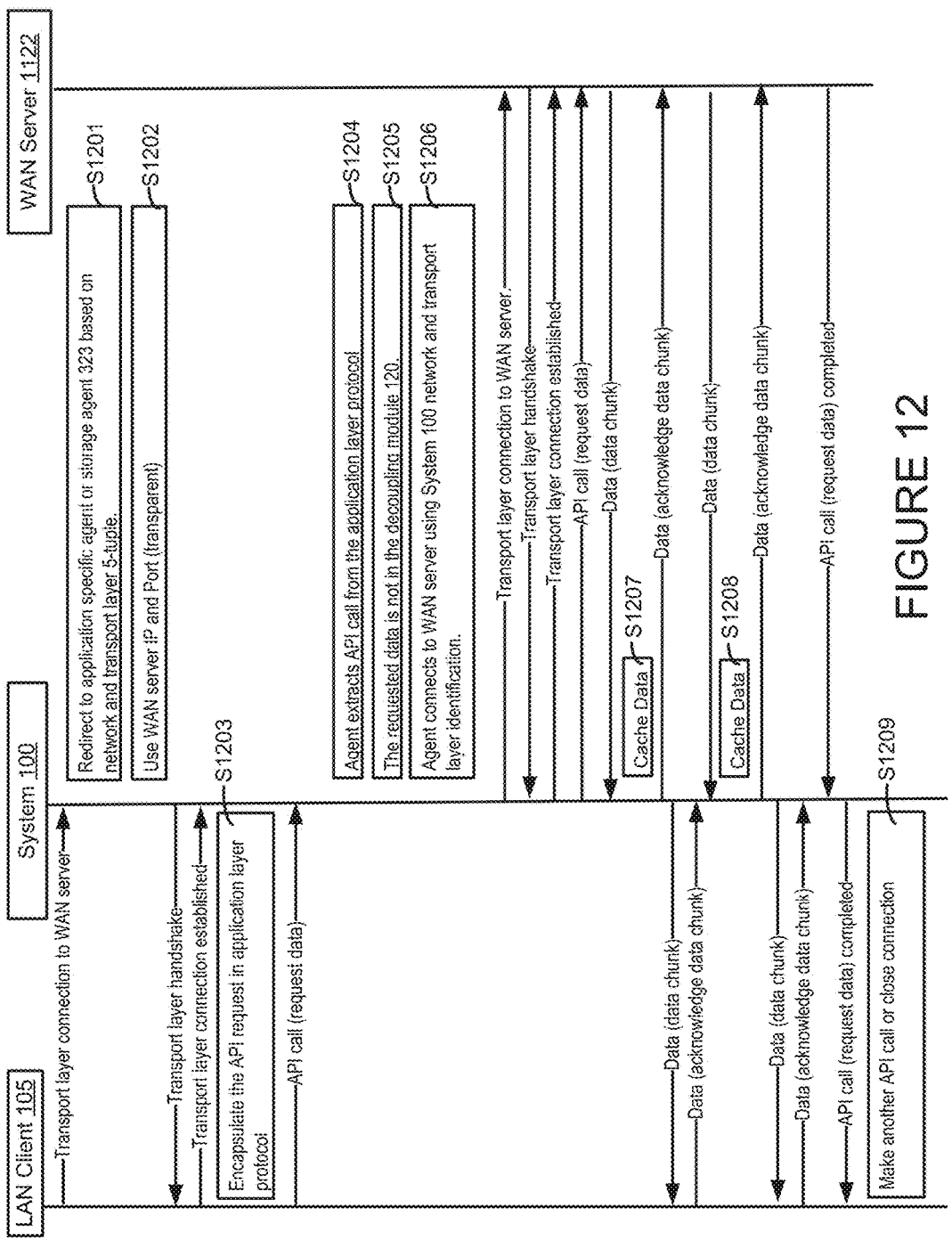
FIG. 12 is a sequence diagram depicting a non-cached download transaction, according to an example embodiment.

Having described the process of performing a decoupling transparent proxy operation for an upload API call, a non-cached download transaction is now described, with reference to FIG. 12. In FIG. 12, the transaction is a YouTube download API call for the YouTube service. In some embodiments, the download API call can be any other type of download API call for any service and for any type of data, such as, for example, a request to retrieve a static web page, a request to download a document, a request to download a dynamic web page, a request to download an application, a request to download a script, a request to download one or more images, a request to download audio data, a request to download video data, and a request to download a file.

Prior to performance of the YouTube download operation, the system 100 is configured to provide the decoupling transparent proxy operation for the YouTube service, in a manner similar to that described above with respect to FIG. 11.

After the machine-executable instructions of the YouTube agent are downloaded, the machine-executable instructions of the YouTube agent are executed by the processor 302 to run the YouTube agent on the system 100. While running, the YouTube agent of the YouTube service registers itself (as described above for FIG. 11) so that the YouTube agent receives packets having the protocol, the destination IP address and the destination port that are associated with the YouTube service.

Having described configuration of the system 100 for use with the YouTube service, the process of performing a YouTube download operation for the YouTube service is now described, with reference to FIG. 12.

At step S1201, the system 100 receives a request from the LAN client 105 to establish a transport layer connection with the WAN server 1122 of the YouTube service. The protocol, the destination IP address and the destination port specified in the transport layer connection request identify the YouTube service. More specifically, the switch 112 of the system 100 receives a packet of the request via the LAN network device 102, and compares the content 206 of the packet (which includes the protocol, the destination IP address and the destination port) with the content table 201 to identify a match. Since the YouTube agent had previously registered itself, and since the content table 201 was updated to provide the protocol, the destination IP address and the destination port of the YouTube service, a match between the content 206 of the packet and the content table is identified as a result of the comparison, and the switch 204 forwards the packet to the LAN decoupling module reception packet buffer 214 where it is received by the LAN network protocol module 113. At this point, the LAN network protocol module 113 forwards the packet to the YouTube agent. Thereafter, processing proceeds to step S1202.

At step S1202, upon receiving the packet, the YouTube agent of the system 100 emulates the WAN server 1122 by performing a transport layer handshake to establish the transport layer connection with the LAN client 105. The YouTube agent emulates the YouTube WAN server 1122 by using the IP address and port of the YouTube service as the source IP address and the source port when performing the transport layer handshake.

At step S1203, the system 100 receives a packet (or series of packets) from the LAN client 105 for the YouTube download API call. The packet (or series of packets) is received by the YouTube agent. The YouTube download API call is encapsulated in the network, transport and application layer protocols (e.g., IP, TCP, HTTP). In some embodiments, more than one application layer protocol is used for the API call. For example, the API call can use HTTP in conjunction with OAUTH 2.0. Embodiments may include any combination of application layer protocols for the API call.

At step S1204, upon receiving the packet (or series of packets) for the YouTube download API call, the YouTube agent extracts the API call from each application layer protocol of the packet (or series of packets). The YouTube agent determines whether the API call is supported by the YouTube agent. In an example embodiment, the YouTube download API call is supported by the YouTube agent, and thus the agent determines that this API call is a supported API call. An exemplary YouTube download API call encapsulated in the HTTP application layer protocol is depicted in FIG. 13. The YouTube agent recognizes the API call as a download API call. In an example embodiment, the API call is an HTTP GET request that specifies a URL to be downloaded.

At step S1205, the YouTube agent determines whether the data requested by the download API call has been cached. The YouTube agent makes this determination by sending a request to the cache controller 323 which determines whether data corresponding to the URL is cached in the storage medium 104. As illustrated in FIG. 12, this data is not cached, and the cache controller 323 sends a response to the YouTube agent that the data corresponding to the URL is not cached.

At step S1206, the YouTube agent uses the port, the IP address and the port of the YouTube WAN server 1122 to initiate a transport layer connection to the WAN server 1122. In initiating the connection, the YouTube agent uses an IP address and port of the system 100 as the source IP address and the source port, respectively. In other words, the transport layer connection is initiated between the IP address and port number of the system 100, and the IP address and the port of the WAN server 1122. The YouTube agent receives a transport layer handshake from the WAN sever 1122, and thereafter the YouTube agent establishes the transport layer connection with the WAN server 1122.

After establishing the connection, the YouTube agent makes the API call (received from the LAN client 105) to the WAN server 1122. The YouTube agent encapsulates the cached API call in one or more application layer protocols (as discussed above for step S803, some embodiments use more than one application layer protocol), and the sends the API call to the WAN server 1122 via the established transport layer connection. The WAN Server 1122 services the API call by sending the data requested by the download API call to the YouTube agent.

At step S1207, upon receiving the data from the WAN Server 1122, the YouTube agent caches the data in the storage medium 104 by sending a cache request to the cache controller 323. After receiving a video data chunk, the YouTube agent sends a response acknowledging the received data to the WAN Server 1122, and forwards the data, that was received from the WAN Server 1122, to the LAN client 105.

At step S1208, the YouTube agent caches an additional data chunk received from the WAN Server 1122, sends an acknowledgment response to the WAN Server 1122, and forwards the data chunk to the LAN client 105.

When all of the requested data for this transaction has been sent by the WAN server 1122, the WAN server 1122 sends a message to the YouTube agent indicating that the download API call has completed. The YouTube agent forwards this message to the LAN client 105. In an example embodiment, this message is encapsulated in the network, transport and application layer protocols (e.g., IP, TCP, HTTP). In some embodiments, more than one application layer protocol is used for the message, and any combination of application layer protocols can be used.

At step S1209, after receiving this message, the LAN client 105 makes no further API calls, and the connection between the LAN client 105 and the YouTube agent is closed. Accordingly, the YouTube agent makes no further API calls, and the connection between the YouTube agent and the YouTube WAN server 1122 is closed. At this point, the entire download API call transaction has completed.

Non-Cached Download Transaction

Related Embodiments

In implementation, the system 100 includes several or many agents constructed to perform download API calls to a respective remote service in a manner similar to that which has been describe above for FIG. 12. In these embodiments, the agents can include, for example, a social media agent (e.g., a Facebook agent, a LinkedIn agent, and the like), a remote storage agent (e.g., a DropBox agent, a BOX agent, a Google agent, an Amazon agent, an iCloud agent, an Evernote agent, a Shutterfly agent, and the like), an application specific agent, an online service agent, and/or another type of agent constructed to perform download API calls to a respective remote service. In further embodiments, agents for specific services include an iTunes agent, a Netflix agent, a Pandora Agent, a Spotify agent, and the like.

Cached Download Transaction

Figure 14:
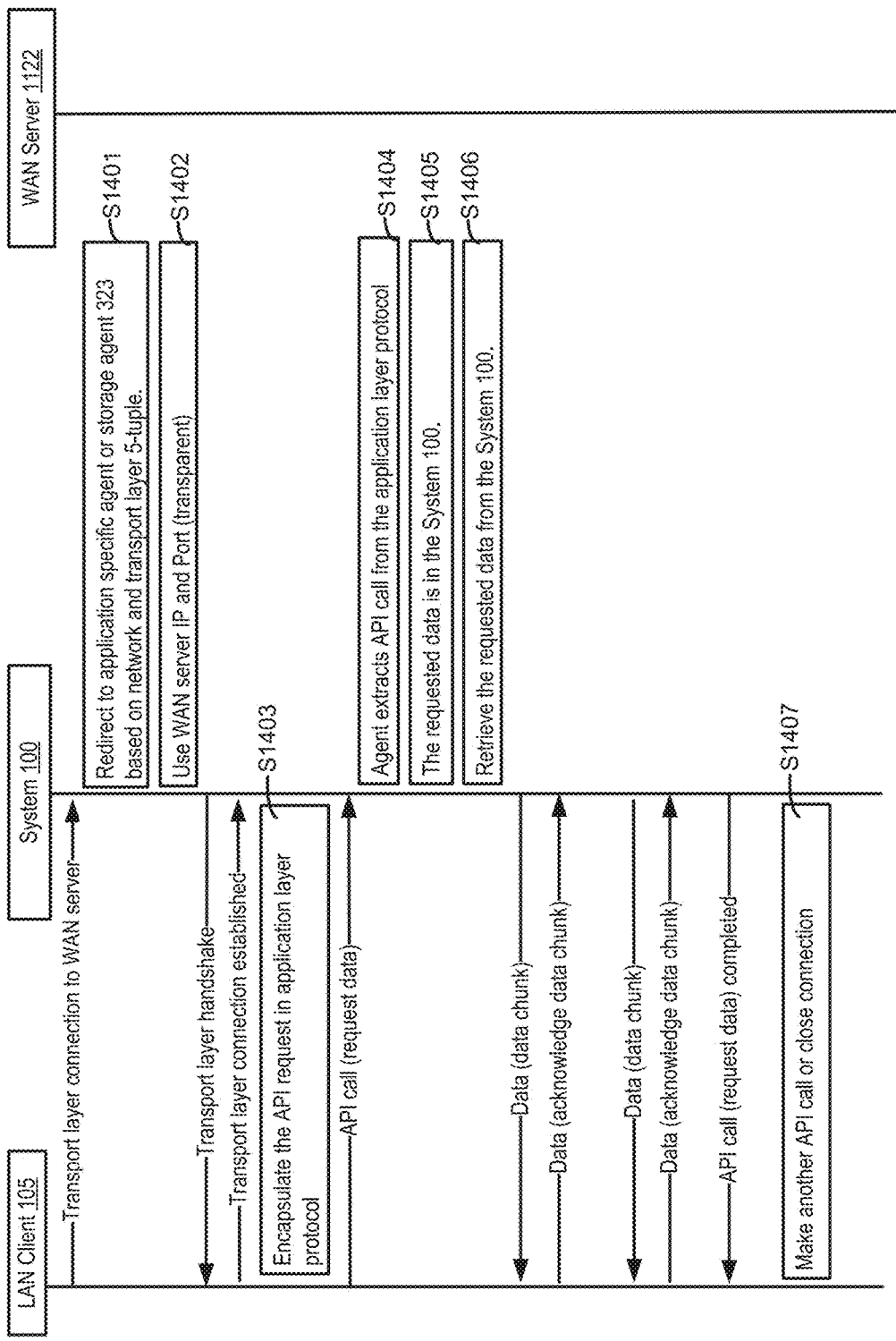
FIG. 14 is a sequence diagram depicting a process of performing a cached download transaction, according to an example embodiment.

Having described the process of performing a non-cached download transaction, the process of performing a cached download transaction is now described, with reference to FIG. 14.

As described above, in example embodiments, the caching functionality provided by the system 100 is bi-directional and/or a multi-directional, meaning that the cache data 316 on the storage medium 104 includes data that has been cached as a result of either a previous upload (LAN to WAN) operation (or upload cache pre-fetch operation) or a previous download (WAN to LAN) operation (or download cache pre-fetch operation). An agent performing a download operation can retrieve the download data from the cache if that same data was cached as a result of either a previous upload operation (or upload cache pre-fetch operation) or a previous download operation (or download cache pre-fetch operation).

In FIG. 14, the transaction is the YouTube download API call for the YouTube service that was described above for FIG. 12.

In FIG. 14, the description of steps S1401 to S1404 is the same as for steps S1201 to S1204 of FIG. 12.

At step S1405, the YouTube agent determines whether the data requested by the download API call has been cached. The YouTube agent makes this determination by sending a request to the cache controller 323 which determines whether data corresponding to the URL is cached in the storage medium 104. As illustrated in FIG. 14, this data is cached, and the cache controller 323 sends a response (step S1406) to the YouTube agent that includes the data corresponding to the URL, which had been cached.

At step S1406, upon receiving the cached data 316 from the storage medium 104, the YouTube agent sends the data to the LAN client 105. After sending the data, the YouTube agent receives a response from the LAN client 105 acknowledging the data. The YouTube agent sends each additional data chunk to the LAN client 105, and receives an acknowledgement response from the LAN client 105 after receiving each additional data chunk.

When the requested data for this transaction has been sent by the YouTube agent, the YouTube agent sends a message to the LAN client 105 indicating that the data is ready (e.g., the download API call has completed). In an example embodiment, this message is encapsulated in the network, transport and application layer protocols (e.g., IP, TCP, HTTP). In some embodiments, more than one application layer protocol is used for the message, and any combination of application layer protocols can be used.

At step S1407, after receiving this message, the LAN client 105 makes no further API calls, and the connection between the LAN client 105 and the YouTube agent is closed. At this point, the download API call transaction has completed.

Prefetch Caching: Downloading Pre-Fetch Content Information from WAN

Figure 15:
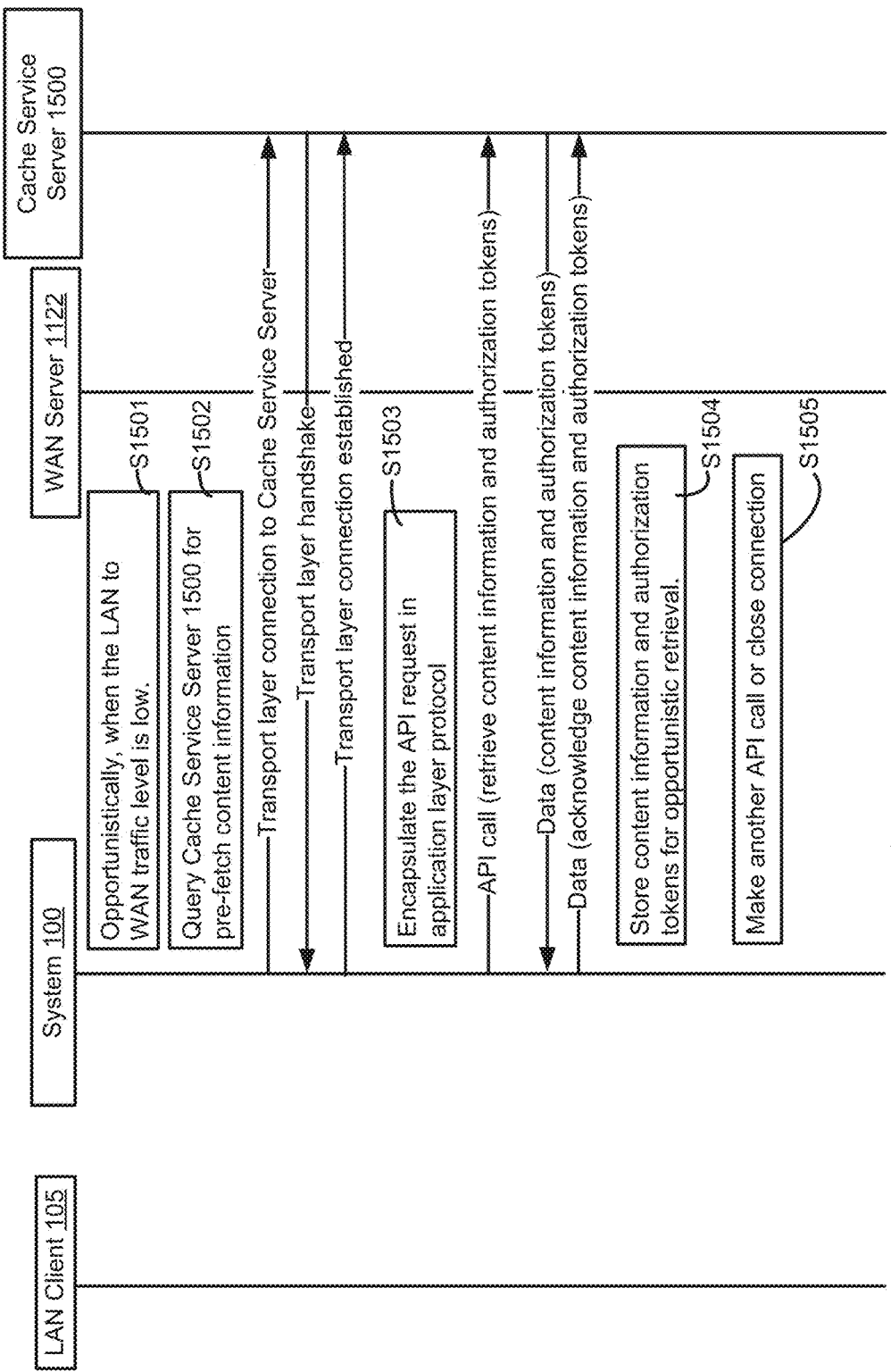
FIG. 15 is a sequence diagram depicting acquisition of pre-fetch content information from a WAN, according to an example embodiment.
Figure 16:
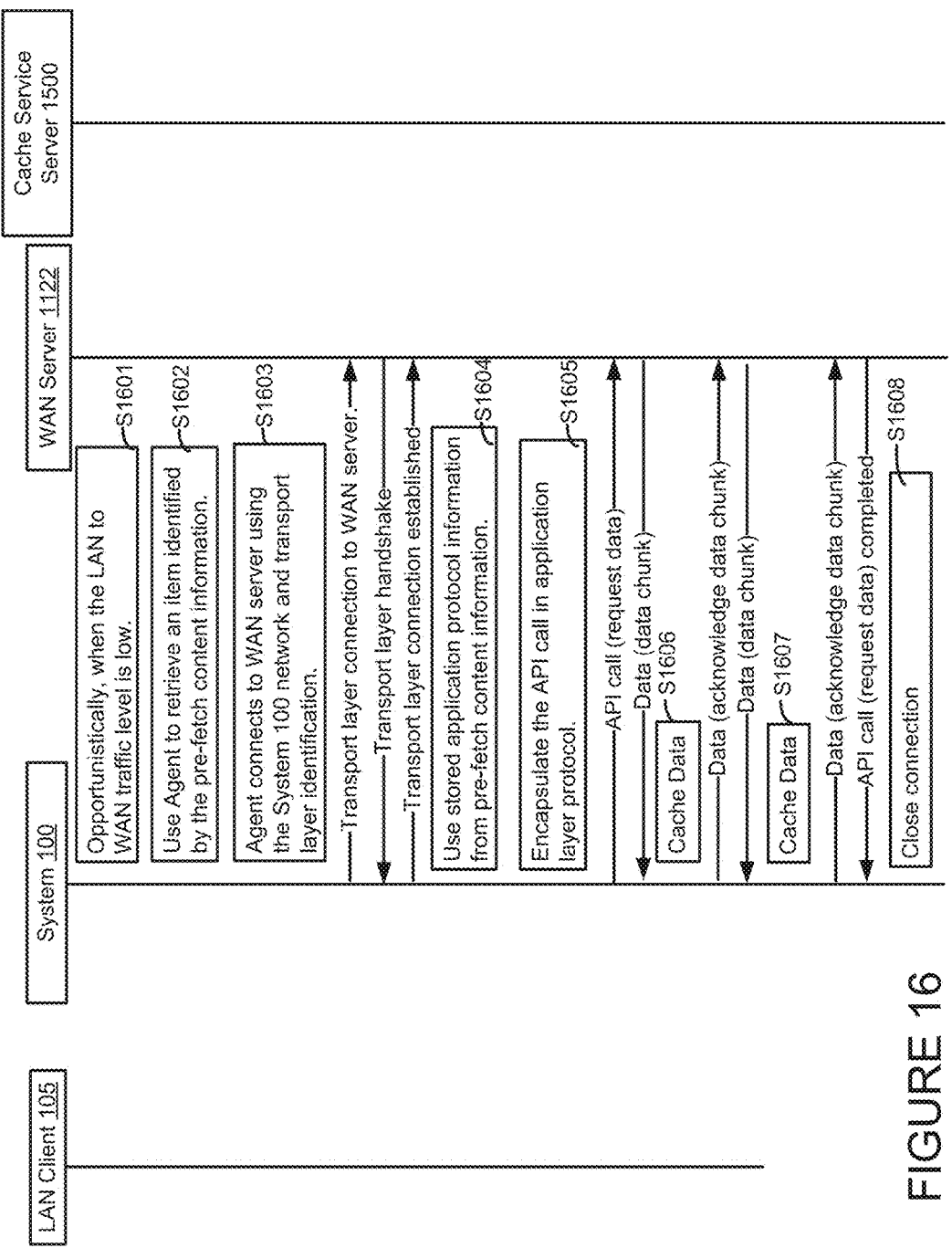
FIG. 16 is a sequence diagram depicting downloading items identified by the pre-fetch content information from a WAN, according to an example embodiment.

Having described the process of performing a cached download transaction, a process of pre-fetching cache data from the WAN is now described, with reference to FIGS. 15 and 16. FIG. 15 relates to acquiring pre-fetch content information from the WAN, and FIG. 16 relates to downloading items identified by the pre-fetch content information from the WAN.

In FIG. 15, the transaction relates to downloading pre-fetch content information for pre-fetching videos from YouTube, and the downloading is performed by the YouTube agent. In some embodiments, the transaction relates to downloading pre-fetch content information for pre-fetching other types of data from other services, and a respective agent performs the downloading.

At step S1501, the YouTube agent is scheduled to perform the downloading of the YouTube pre-fetch content information by the scheduler 315 when the agent scheduler 315 in connection with the connection manager 318 determines that there is available throughput on the WAN to LAN link (based on the traffic statistics 319).

The downloading begins at step S1502, with the system 100 establishing a transport layer connection with a cache service server 1500. The cache service server 1500 stores the pre-fetch content information. In an example embodiment, the cache service server 1500 generates the pre-fetch content information. Generation of the pre-fetch content information is further described below. At step S1503, the YouTube agent generates a request to download pre-fetch content information for the YouTube service from the cache service server 1500 (by using the server API 327 of FIG. 3), encapsulates this request in one or more application layer protocols (as discussed above for step S803, some embodiments use more than one application layer protocol), and sends this request to the cache service server 1500, by using the established transport layer connection.

At step S1504, the YouTube agent receives the YouTube pre-fetch content information from the cache service server 1500 and stores the YouTube pre-fetch content information on storage medium 104, by using the cache controller 323. In an example embodiment, the YouTube pre-fetch content information includes URLs of items to be downloaded, respective HTTP methods for downloading these items, and respective OAUTH 2.0 tokens. In some embodiments, the pre-fetch content information includes other suitable type of information for downloading the pre-fetch items from the respective service.

At step S1505, the YouTube agent closes the connection between the system 100 and the cache service server 1500.
Prefetch Caching: Downloading Items Identified by Pre-Fetch Content Information from the WAN FIG. 16 relates to downloading items identified by the pre-fetch content information from the WAN. In FIG. 16, the transaction relates to pre-fetching videos from YouTube, and the pre-fetch downloading is performed by the YouTube agent. In various embodiments, the transaction relates to pre-fetching more types of data from other services, and a respective agent performs the downloading.

At step S1601, the YouTube agent is scheduled, by the scheduler 315 in conjunction with the connection manager 318 using traffic statistics 319, to perform pre-fetching of videos from YouTube when there is available throughput on the WAN to LAN link.

The pre-fetch downloading begins at step S1602, with the YouTube agent retrieving the stored pre-fetch content information from the storage medium 104, by using the cache controller 323. The YouTube agent identifies items to be downloaded, based on the stored pre-fetch content information.

At step S1603, the YouTube agent establishes a transport layer connection with the YouTube WAN server 1122. In establishing the connection, the YouTube agent uses an IP address and port of the system 100 as the source IP address and the source port.

At step S1604, the YouTube agent generates a request for each item identified to be downloaded at step S1602. In generating each request, the YouTube agent uses the URLs of items to be downloaded, respective HTTP methods for downloading these items, and respective OAUTH 2.0 tokens included for each item in the pre-fetch content information. At step S1605, the YouTube agent encapsulates each such request in one or more application layer protocols (as discussed above for step S803, some embodiments use more than one application layer protocol), and sends each request to the YouTube WAN Server 1122 over the established transport layer connection.

At steps S1606 and S1607, the YouTube agent receives the YouTube videos from the YouTube WAN server 1122, and caches each video on the storage medium 104, by using the cache controller 323.

At step S1608, the YouTube agent closes the connection between the system 100 and the YouTube WAN server 1122.
Prefetch Caching: Generating the Pre-Fetch Content Information A description of the process by which pre-fetch content information is generated (such as, for example, the pre-fetch content information generated by the cache service server 1500 of FIGS. 15 and 16) is now provided.

In an embodiment, a user who has a system 100 in their home provides the cache service server 1500 with configuration information about their personal preferences, their user devices, their social networks, and the like. This configuration information is used to generate the pre-fetch content information.

In an example embodiment, the user manually configures the cache service server 1500 by using a service that is running on the cache service server 1500. In an example embodiment, the service is an HTTP service that is accessible by a Web browser. A user enters a predetermined IP address that is assigned to the service into the Web browser, and the service presents the user with a Graphical User Interface (GUI) for manually entering the configuration information.

Instead of, or in addition to, accessing the configuration service via the Web browser, the user can install a client-system application (e.g., the client-system application 613 of FIG. 6) on their user device (e.g., 105 or 106) that is used to communicate with the cache service server 1500's configuration service to configure a pre-fetch content service of the cache service server 1500 (by using the client API 326 of FIG. 3). In an example embodiment, the client-system application 613 is constructed to receive information provided by the user, and is also constructed to automatically retrieve configuration information from the user device.

In an example embodiment, the configuration information includes one or more of: user device specific information, such as the operating system revision being run on the user device, specific content that is being stored on the device, amount of storage space used and unused on the device, applications installed on the device, frequency of usage of different applications on the device, which specific users frequently use the user device, and the like; and user specific information such as which other devices the user frequently uses, which applications the user typically uses, which content services the user commonly uses, which specific content was either created by or viewed by the user, the various members of the user's social networks, user and device specific information about those members, content that the user has explicitly subscribed to or "liked", content that members of the user's social networks have explicitly subscribed to or "liked," content that members of the user's social networks have recently viewed, accessed, uploaded/updated, and/or created, and the like.

In an example embodiment, the system 100, in conjunction with the client-system application 613 installed on various user devices, and also in conjunction with the cache service server (e.g., the cache service server 1500 of FIG. 15), detects the specific devices that couple to the system 100, determines the users of each device, and the specific content contained on each device, determines which specific content on each device, or which specific external content, is likely to be accessed by other related devices, and determines the members of the social networks of each of the users of each device.

In some embodiments, the client-system application 613 (that is installed on the user device 105) uses standard API calls (that are part of the operating system 610) to collect relevant information about the device 105 and the primary user of the device 105 including, for example: a device identifier (ID) that is unique to user device 105, a primary e-mail address associated with the user device 105, other secondary e-mail addresses associated with the user device 105, and a list of all of the files that are stored in the storage medium 607 of the user device 105. In an embodiment, the Facebook SDK (Software Development Kit) is integrated with the client-system application 613, which provides an API that is used by the client-system application 613 to communicate with the Facebook service, and retrieve information about the primary user's unique Facebook ID, and the members of the primary user's Facebook social network. In some embodiments, further or different SDKs are integrated with the client-system application 613, which provide APIs that are used by the client-system application 613 to communicate with further or different content services, and retrieve information about the primary user's unique ID for each respective service, and the members of the primary user's respective social networks. The client-system application 613 stores this information as configuration information 614.

The client-system application 613 transfers the configuration information 614 to the cache service server 1500 for storage and analysis. For example, in a case where configuration information from multiple user devices is transferred to the cache service server 1500, the cache service server 1500 compares the lists of primary and secondary e-mail addresses (associated with each user device) with each other to find unique e-mail addresses that are associated with multiple user devices. If a unique e-mail address is associated with multiple user devices, the cache service server 1500 determines that the user associated with that e-mail address may wish to access the same content on each of those devices, and therefore the cache service server 1500 generates the list of desired pre-fetched content (e.g., the pre-fetch content information) by aggregating the list of content created by or viewed by each of those unique user devices. In some embodiments, the cache service server uses other analysis techniques to correlate Facebook ID's to devices and their corresponding file list and content viewing history to aggregate additional lists of desired pre-fetched content information. In some implementations, the cache service server 1500 uses further or different analysis techniques to correlate identifiers of further or different content services (e.g., Netflix, Amazon, iTunes, Spotify, YouTube, and the like) to aggregate lists of desired pre-fetched content information.

In some embodiments, the client-system application 613 transfers the configuration information 614 to the system 100, and the system 100 generates the pre-fetch content information, as described above for the cache service server 1500.

The configuration information is useful in generating pre-fetch content information because specific content that was either viewed, accessed, uploaded/updated and/or created by a specific device used by a specific person is likely to be requested by either: other devices used by that same person (on any network), or other devices used on the same home network as that person. Therefore, it may be useful to identify, in the generated pre-fetch content information, the specific content that is either: implicitly expected to have a high likelihood of being shared between devices (e.g., photos or videos created by a phone or tablet, videos downloaded for future viewing, an updated version of an application already currently loaded on multiple devices, etc.), or explicitly designated by the user as sharable content.

Moreover, the configuration information is useful in generating pre-fetch content information because a file that was either viewed, accessed, and/or created by, a specific device used by a specific person is likely to be requested by other devices used by other members of that person's social network. Additionally, files that are viewed by, or created by devices used by members of a person's social network are likely to be requested by that person. Therefore, it may be useful to identify, in the generated pre-fetch content information, files from other devices used by members of a person's social network, or content viewed by members of a person's social network, that are either a) implicitly likely to be shared within that social network, or b) explicitly designated to be shared within that social network.

The cache service server 1500 generates the pre-fetch content information by applying analytics to the configuration information. In an example embodiment, the cache service server 1500 (of FIGS. 15 and 16) receives the configuration information, and the server 1500 applies the analytics to generate the pre-fetch content information.

In an example embodiment, a client-system application (e.g., the client-system application 613 of FIG. 6) is advantageously installed onto the user device (e.g., 105 or 106). In these cases, the client-system application 613 is constructed to generate the pre-fetch content information (e.g., the pre-fetch content information 615 of FIG. 6) by applying analytics to the configuration information (e.g., the configuration information 614 of FIG. 6) provided by the user, and the information that the client-system application 613 automatically retrieves from the user device.

Pre-Fetch Caching: Uploading of Client-Generated Pre-Fetch Content Information to a Cache Service Server Having described the process of pre-fetching cache data from the WAN and the process of generation of pre-fetch content information, uploading client-generated pre-fetch content information to a cache service server is now described. This process relates to a case in which the client-system application 613 is installed on the user device, the client-system application 613 has generated the pre-fetch content information 615 (as described above), and the pre-fetch content information 615 is stored on the user device.

Figure 17:
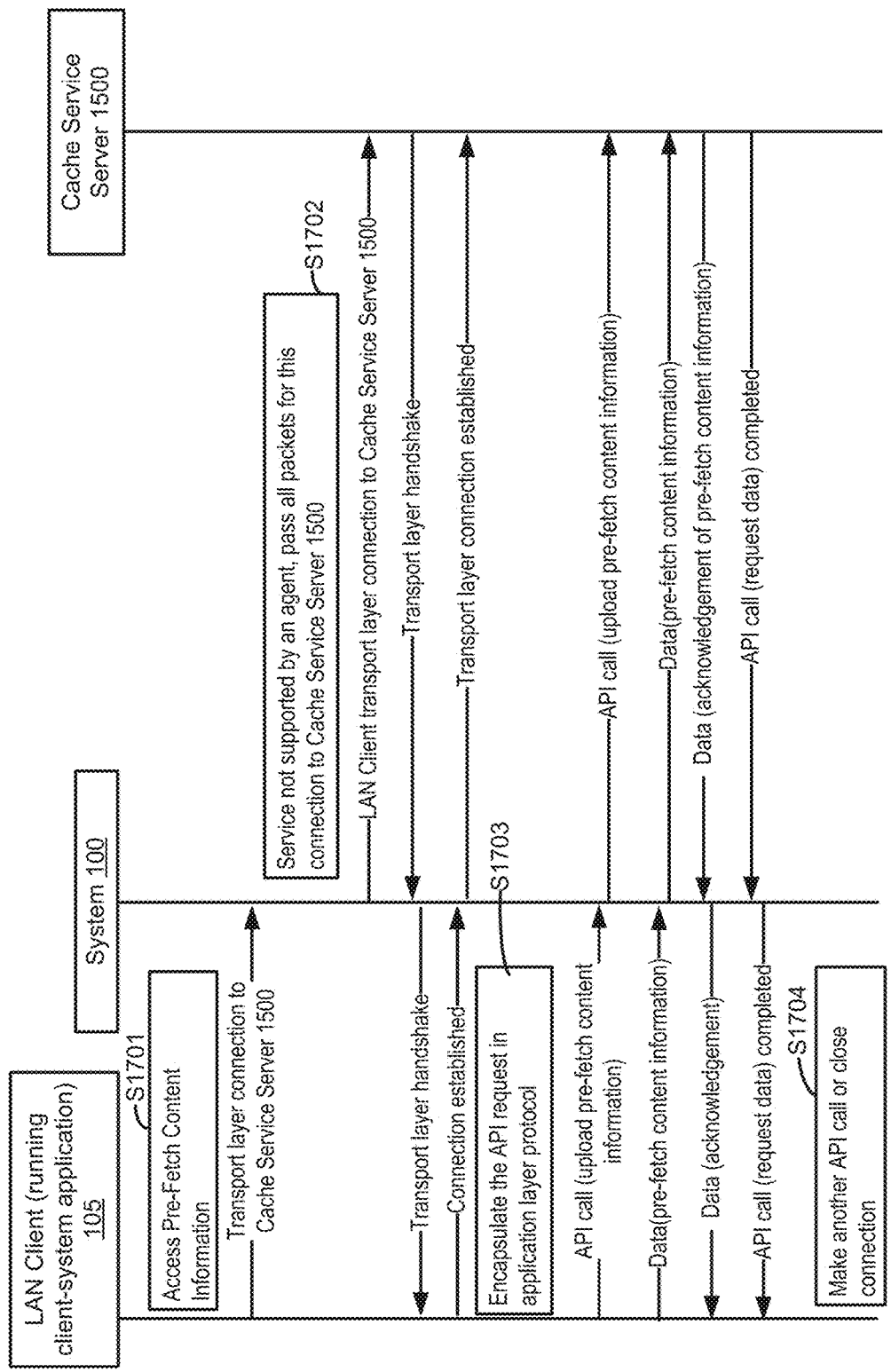
FIG. 17 is a sequence diagram that depicts uploading pre-fetch content information, according to an example embodiment.

In FIG. 17, the transaction relates to client upload of pre-fetch content information for pre-fetching content from one or more services (e.g., service 121). At step S1701, the client-system application 613 of the LAN client (e.g. the LAN client 105) accesses the pre-fetch content information 615 stored on the storage medium 607. The client-system application 613 controls the LAN client 105 to send a request to establish a transport layer connection with the cache service server 1500.

At step S1702, the system 100 receives the request from the LAN client 105. The protocol, the destination IP address and the destination port specified in the transport layer communication request identify the cache service provided by the cache service server 1500. The switch 112 of the system 100 receives a packet of the request via the LAN network device 102, and compares the content 206 of the packet (which includes the protocol, the destination IP address, the destination port, the source IP address and the source port) with the content table 201 to identify a match. Since the system 100 does not include an agent for the cache service provided by the cache service server 1500, the switch 204 forwards the packet to the WAN transmission packet buffer 209. The WAN transmission packet buffer 209 forwards the packet to the WAN network device 103, where the packet is forwarded to the cache service server 1500 via the modem 130 and the ISP 110. Upon receiving the packet, cache service server 1500 performs a transport layer handshake (the packets of the handshake passing through the system 100) to establish a transport layer connection with the LAN client 105.

At step S1703, the LAN client 105 generates an API call to upload the pre-fetch content information 615 to the cache service server 1500. The system 100 receives the packet (or series of packets) for the API call from the LAN client 105, and forwards the packet (or series of packets) to the cache service server 1500 in a non-decoupling fashion. The API call is encapsulated in the network, transport and application layer protocols (e.g., IP, TCP, HTTP). In some embodiments, more than one application layer protocol is used for the API call. For example, the API call can use HTTP in conjunction with OAUTH 2.0. Embodiments may include any combination of application layer protocols for the API call. The client-system application 613 controls the LAN client 105 to send the pre-fetch content information 615 to the cache service server 1500 over the established transport layer connection. The cache service server 1500 receives the pre-fetch content information 615, and responds to the LAN client 105 upon reception of the pre-fetch content information 615.

Upon reception of all of the pre-fetch content information 615 from the LAN client 105, the cache service server 1500 sends a message to the LAN client 105 indicating that the API call has completed. In an example embodiment, the message is encapsulated in the network, transport and application layer protocols (e.g., IP, TCP, HTTP). In some embodiments, more than one application layer protocol is used for the message, and any combination of application layer protocols can be used. The message is sent over the established transport layer connection.

At step S1704, the LAN client 105 makes no further API calls, and the connection between the LAN client 105 and the cache service server 1500 is closed.

After the client-generated pre-fetch content information is uploaded to the cache service server 1500, it is available for download by the service 100 from the cache service server 1500, as described above for FIG. 15.

Updates

In an example embodiment, not only can data be pre-fetched for later use by the user device (e.g, user device 105 or 106), but the data can also be automatically pushed to the user device in an update operation.

For example, in a case where the pre-fetch content information for the user device 105, e.g., an iPhone, indicates that the user of the user device 105 desires to subscribe to a particular series of video episodes or other updates on their iPhone, an iTunes agent initiates a first phase (a first sub-transaction) of a "push update" transaction by using the pre-fetch content information to pre-fetch any newly available episode of a particular subscribed video series from an iTunes WAN server to the system 100. The system 100 stores the data for the episode in the storage medium 104. Upon detection by the connection manager 318 that the user device 105 is coupled to the system 100, the connection manager 318 in conjunction with the agent scheduler 315, signals the iTunes agent to begin a second phase (a second sub-transaction) of the push update transaction by sending a push notification to the user device 105. Responsive to receiving the push notification, the client-system application 613 of the user device initiates a download transaction with the iTunes agent to transfer the newly available episode from the system 100 to the user device at a time and rate as determined by the connection manager 318 in conjunction with agent scheduler 315.

In an example embodiment, the pre-fetch content information for the user device 105 (that indicates that the user of device 105 desires to subscribe to a particular series of video episodes on their iPhone) includes information to enable the iTunes agent to send the push notification to the user device 105.

Multi-Directional Decoupling and/or Caching in Transparent Mode

As discussed above, in example embodiments, the decoupling and/or caching functionality provided by the system 100 is multi-directional. An agent performing a download operation is able to retrieve the download data from the storage medium 104 if that same data is cached as a result of a previous download operation.

Figure 18:
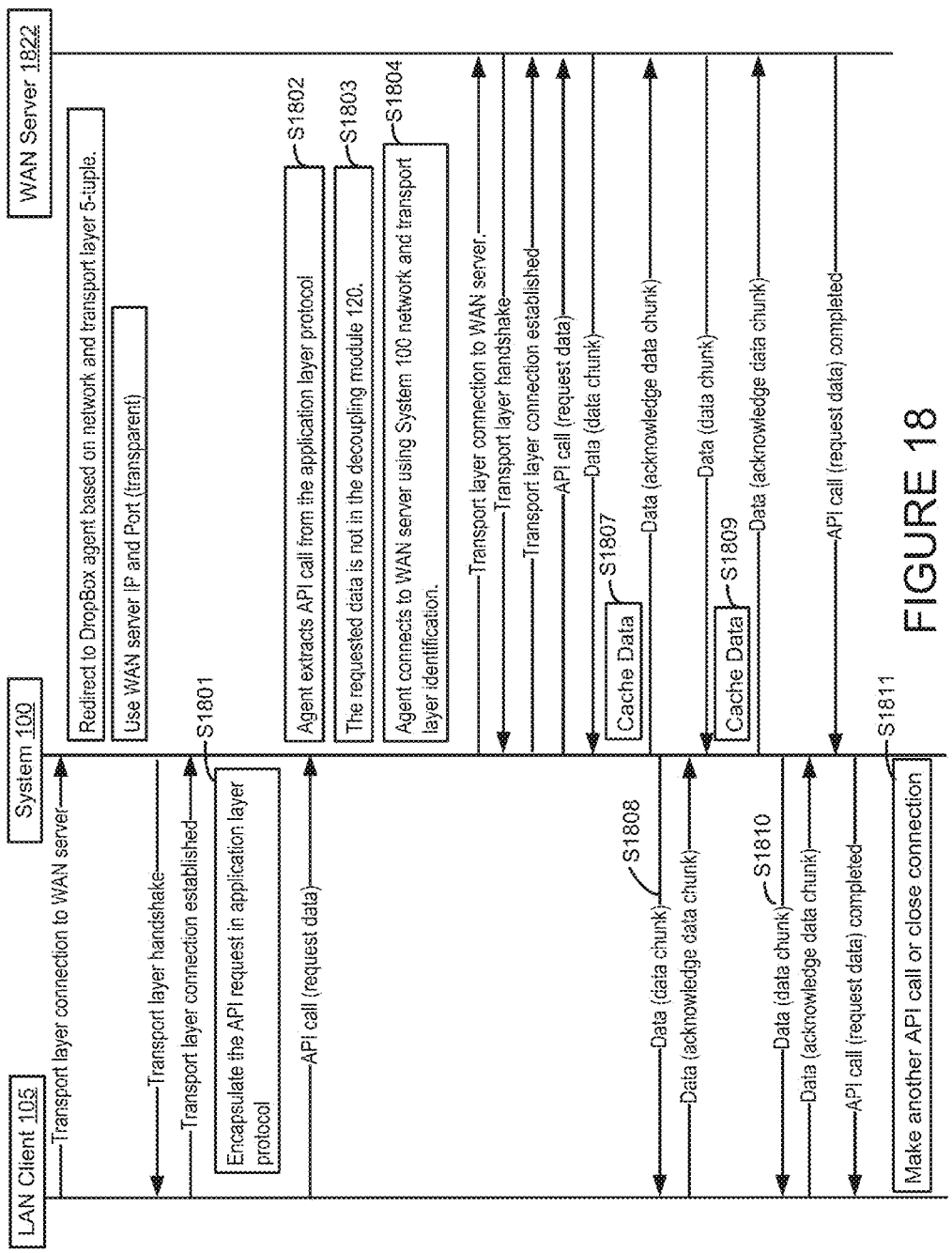
FIGS. 18 and 19 are sequence diagrams that depict a multi-directional caching operation in transparent mode, according to an example embodiment.
Figure 19:
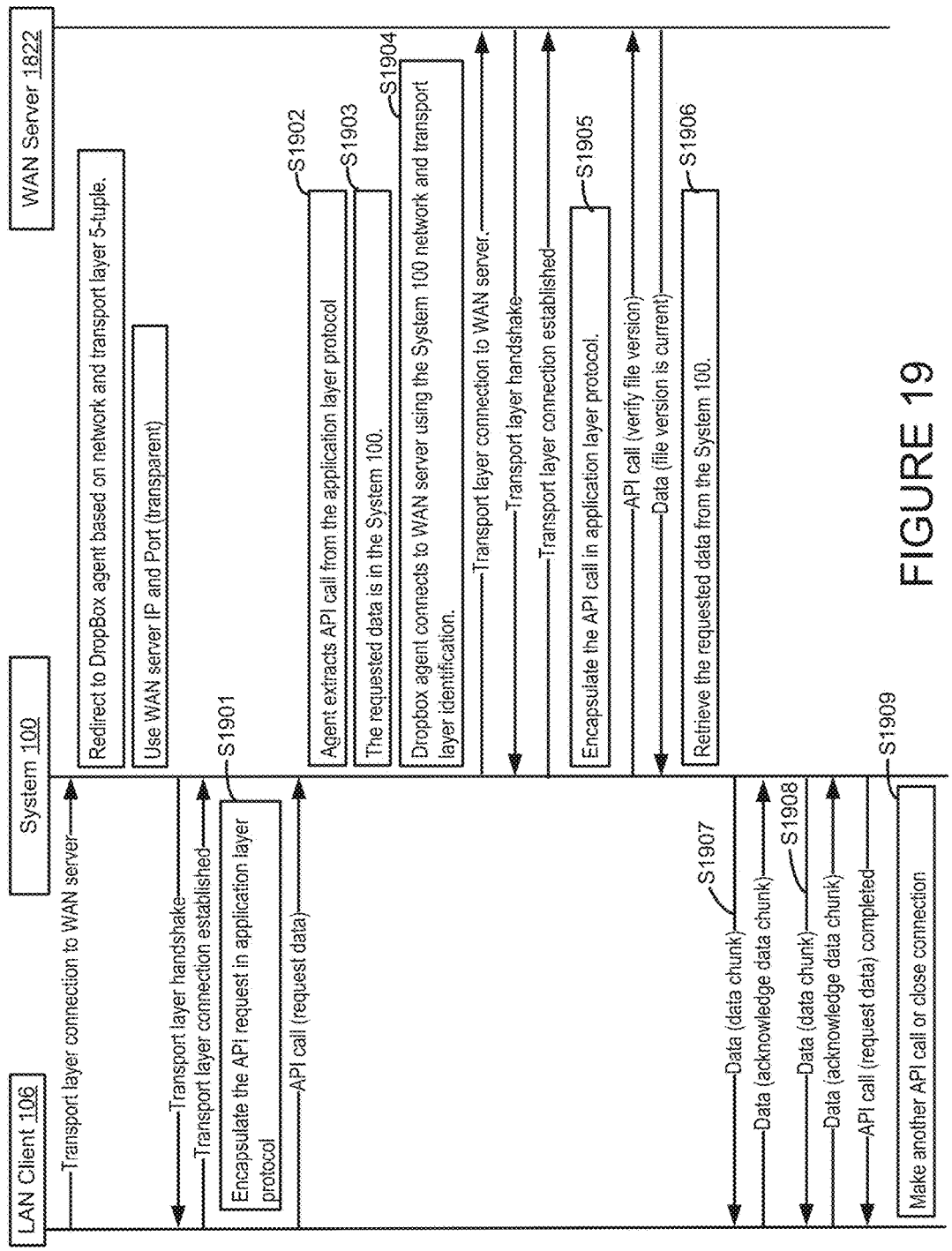

In FIGS. 18 and 19, the LAN client 105 requests the download of a file from Dropbox (at step S1801 of FIG. 18). The system 100 detects the request, routes the request to a Dropbox agent (of agents 317) (at step S1802 of FIG. 18). The Dropbox agent determines if the file is already stored in the storage medium 104, typically from one or more previous transactions and/or sub-transactions. As shown in FIG. 18, the file is not available locally in the system 100 (step S1803), and so the Dropbox agent initiates the same request to the WAN Server 1822 of the Dropbox service (at step S1804 of FIG. 18). As the file is sent from the Dropbox service, the data chunks are both sent to the LAN client, such as for example, user device 105 (steps S1808 and S1810), as well as stored for the system 100 (steps S1807 and S1809) within the storage medium 104, for example. At step S1811, the download has completed and the connection between the LAN client 105 and the system 100 is closed.

As shown in FIG. 19, one or more LAN clients, such as for example, user device 106 requests the download of the same file from Dropbox WAN Server 1822 (at step S1901). The Dropbox agent detects the request (at step S1902), and detects that the file is already available locally from the system 100 (at step S1903).

At step S1904, the Dropbox agent couples to the Dropbox WAN sever 1822 to verify that the file available locally from the system 100 is the correct version (at step S1905). After determining that the file available from the system 100 is the correct version, the Dropbox agent retrieves the file from the system 100 (at step S1906), and sends the file to LAN client 106 (steps S1907 and S1908). In the interaction between the Dropbox agent and the LAN client 106, the Dropbox agent is emulating the Dropbox service and using the IP address and port number of the Dropbox WAN Server 1822.

At step S1909, the download has completed and the connection between the LAN client 106 and the system 100 is closed.

Figure 20:
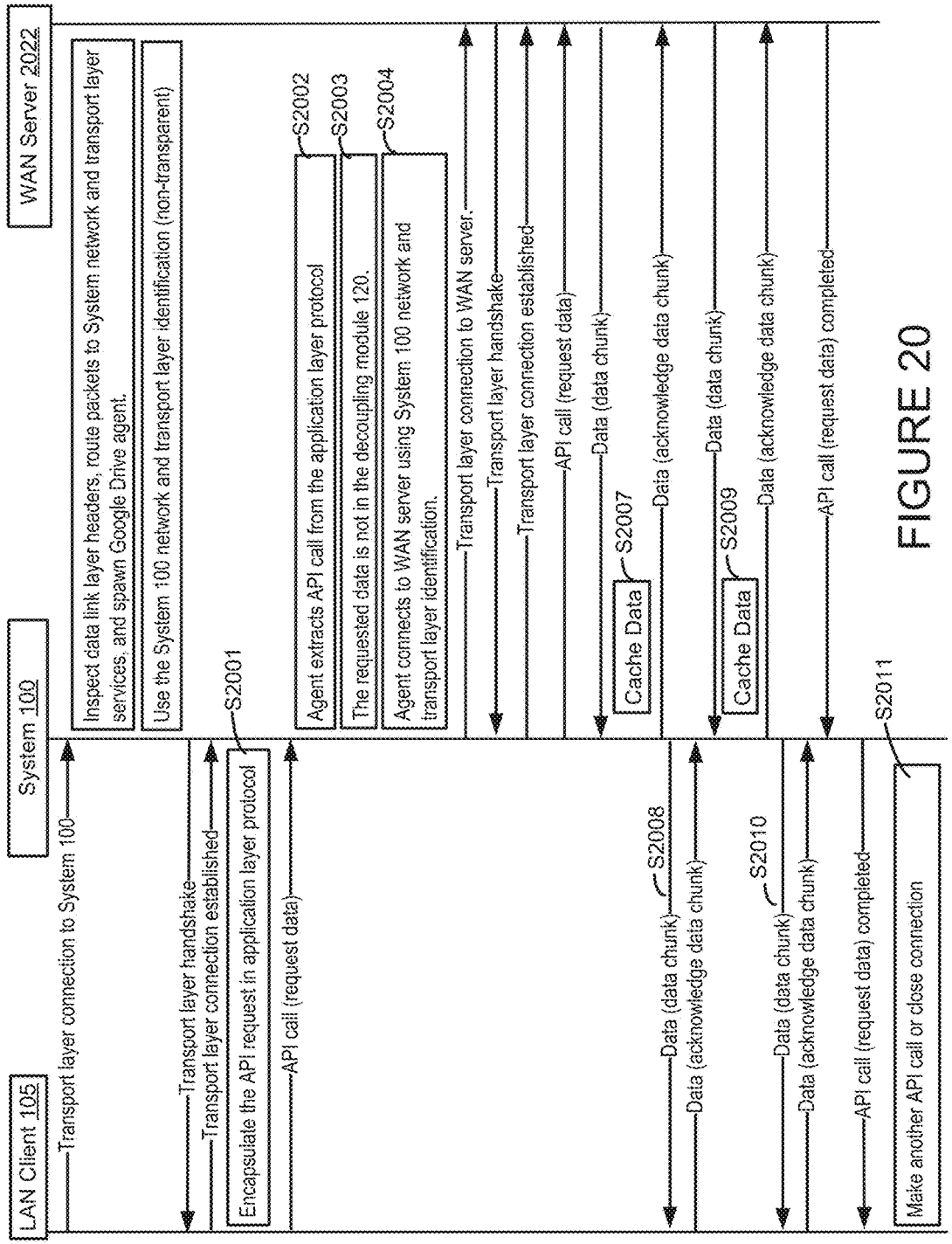
FIGS. 20 and 21 are sequence diagrams that depict a multi-directional caching operation in non-transparent mode, according to an example embodiment.
Figure 21:
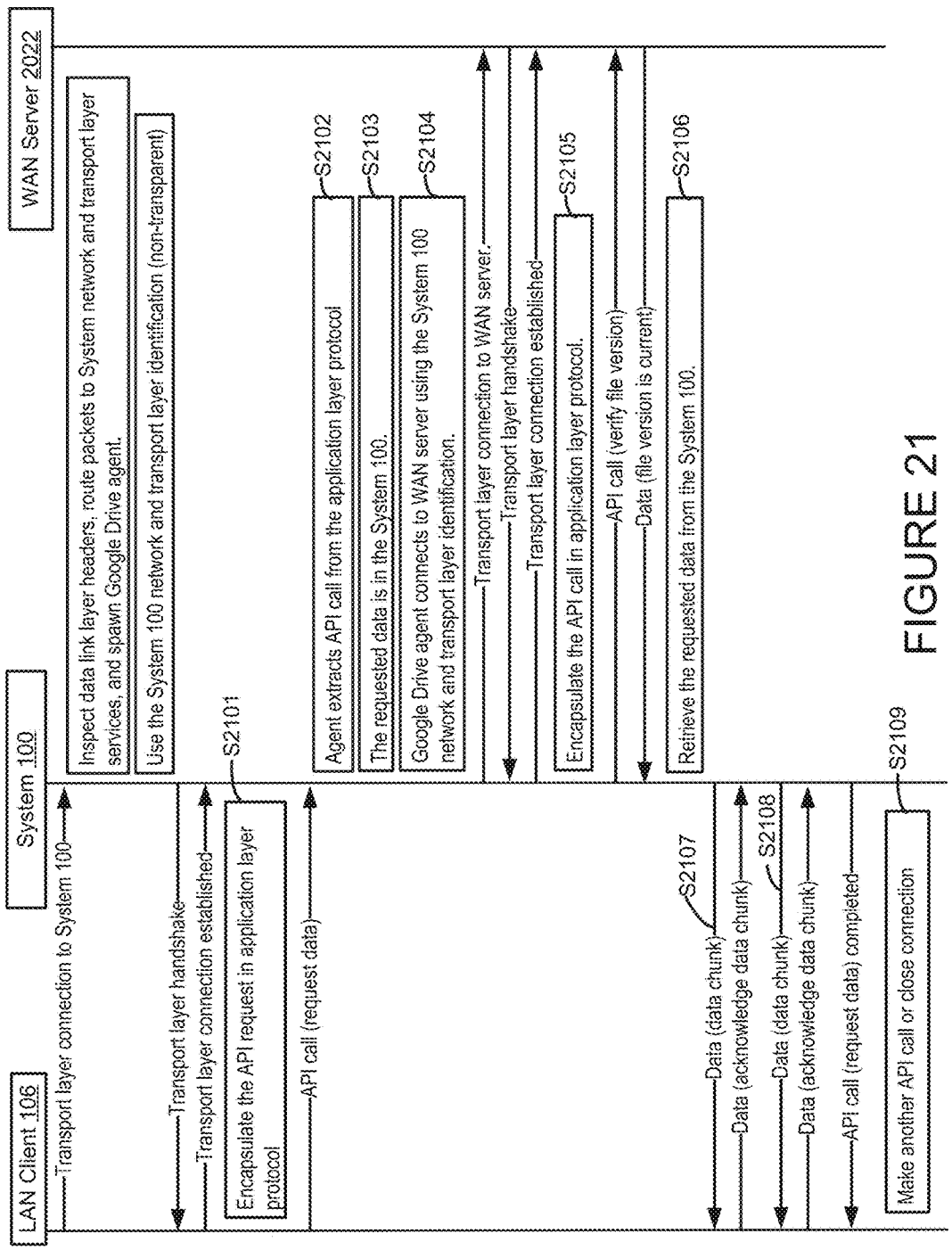

Multi-Directional Decoupling and/or Caching Using Client-System Application on User Device In FIGS. 18 and 19, the download operations are performed in transparent mode. In FIGS. 20 and 21, the operation is performed in a manner similar to that described above for FIGS. 18 and 19, however, the operation is not performed in transparent mode. Instead of being performed in transparent mode, the operation involves use of a client-system application (e.g., the client-system application 613 of FIG. 6) running on the exemplary user devices 105 and 106. In FIGS. 20 and 21, rather than establishing a transport layer connection with a WAN Server 2022 (by using the IP address and port of the WAN Server 2022), the user devices 105 and 106 establish a transport layer connection with the system 100 by using the data link layer address (e.g., the MAC address) of the system 100. More specifically, the data link layer address of the system 100 is a MAC address of the LAN network device 102. Upon receiving packets from the user device 105 and/or 106 for establishing the transport layer connection, the switch 112 compares the data link layer headers of the packets with the content table 201 to determine whether the packets are intended for the system 100. In an example embodiment, the packets from the user devices are used to establish the transport layer connection, and include the MAC address of the LAN network device 102. In these cases, the switch 204 forwards the packets to the LAN network protocol 113. Upon receiving the packets, the LAN network protocol 113 routes the packets to the appropriate agent based on the network layer and transport layer information included in the packet. In FIGS. 20 and 21, the packets include network layer and transport layer information that corresponds to a Google Drive agent. One of ordinary skill recognizes that this agent is merely presented as an example of the various agents 317 illustrated and described in relation to FIG. 3, and that alternative agents are contemplated.

The Google Drive agent completes the transport layer connection by coupling to the user device by using the network layer and transport layer identification of the system 100, rather than the network layer and transport layer identification of the WAN Server 2022. In this manner, the Google Drive establishes a non-transparent transport layer connection with the user device that is running the client-system application 613.

In FIG. 20, steps S2001 to S2011 are similar to steps S1801 to S1811 of FIG. 18. In FIG. 21, steps S2101 to S2109 are similar to steps S1901 to S1909 of FIG. 19.

Streaming Media Proxy Transaction

Figure 22:
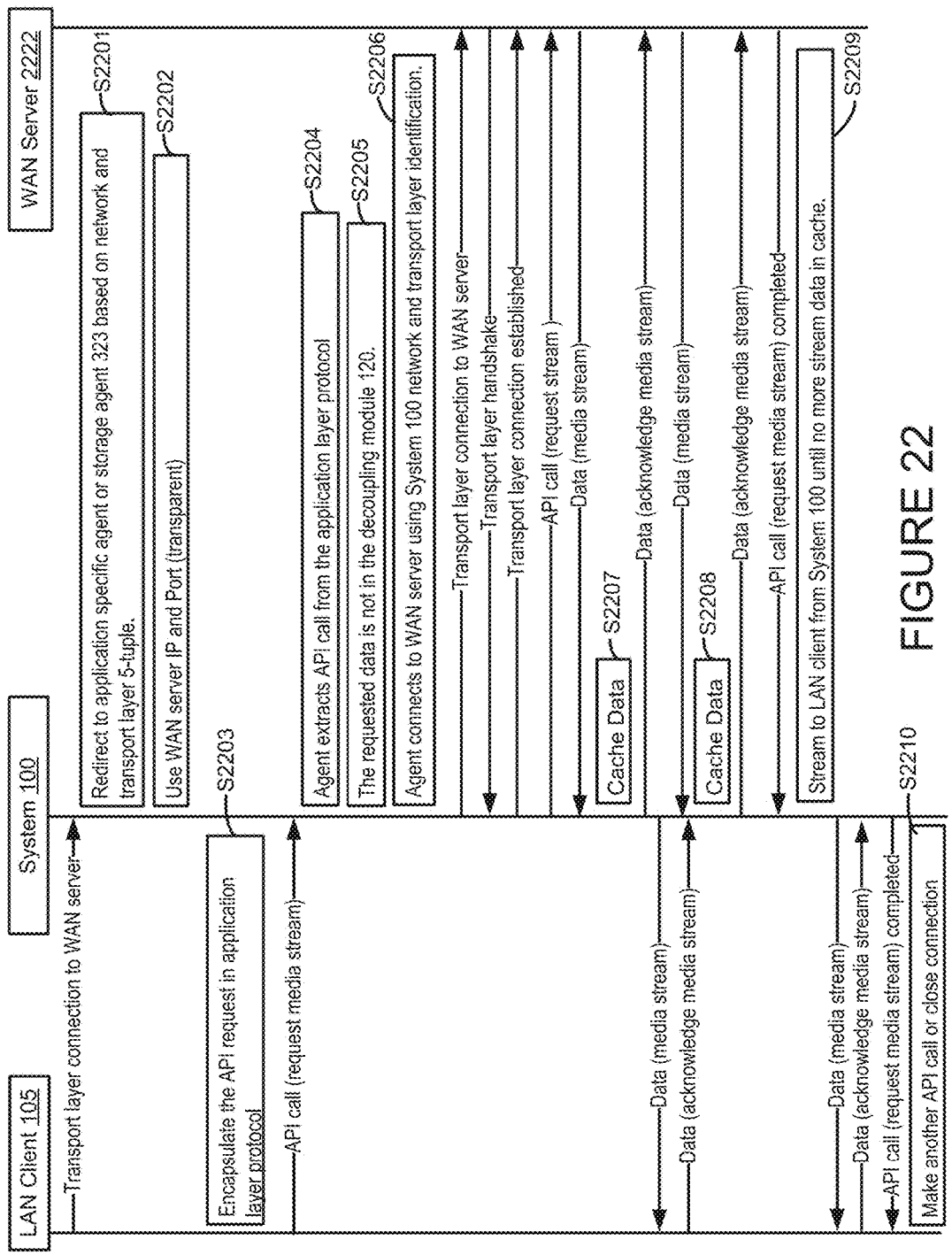
FIG. 22 is a sequence diagram that depicts a streaming media proxy transaction, according to an example embodiment.

FIG. 22 depicts a streaming media proxy transaction. In FIG. 22, steps S2201 to 2206 are similar to steps S1201 to S1206 of FIG. 12, except that in FIG. 22, the protocol is UDP instead of TCP, the request is a request for a media stream, and the data that is returned is media stream data. In an example embodiment, the stream data is video stream data provided by Google Hangouts. In some embodiments, the stream data can be provided by any other service (e.g., Pandora, Spotify, Netflix, Facebook, Amazon, iTunes, and the like), and the stream data can be any type of stream data (e.g., audio data, game data, image data, and the like).

As shown in FIG. 22, the flow of media stream data from a Google Hangouts WAN Server 2222 to the system 100 is maintained at a maximum data transfer rate possible. The maximum transfer rate is based on a maximum speed of the "last-mile" Internet connection, which is ordinarily the slowest link in the chain of network connections, and by the originating video server, as the content provider may put a maximum rate cap on each individual stream in order to conserve network resources. Assuming high reliability of all of the involved network links, fluctuation of this rate may be minimal.

In a case where the data flow rate from the Google Hangouts WAN Server 2222 or other streaming server to the system 100 is faster than the data flow rate from the system 100 to a LAN client such as user device 105 (at step S2207) or if the LAN client 105 becomes temporarily decoupled from the network at step S2208, the system 100 "caches" or advantageously stores the excess data in temporary or persistent memory such as the storage medium 104 of FIG. 1.

At step S2209, the temporary or persistent memory of the system 100 contains media stream data, and therefore the system 100 sends the cached media stream data to the user device 105 at the maximum data rate possible between the system 100 and the user device 105 over the LAN by using the "cached" media stream data. In a case where the "cache is empty" and the media stream data is unavailable locally from the system 100, the system 100 obtains the requested data from a remote service and forwards the media stream data (received from the Google Hangouts WAN Server 2222) to the user device 105 at approximately the same rate as the rate at which the remote service (e.g., Google Hangouts WAN Server 2222) sends the media stream data to the system 100. In some of these cases, the remote service may include data that is "cached" and temporarily stored at another media sharing system 700 that has given access to system 100. Alternatively, the remote service streams the requested data to the requesting user device 105, without interaction with the decoupling module 120 of the system 100.

Caching and Replaying of Media Stream Data

In another embodiment, incoming media stream data chunks received from the WAN server are cached for future use. In this example embodiment relating to caching and replaying of media stream data, the stream data is video stream data provided by Google Hangouts. In some embodiments, the stream data can be provided by other services (e.g., Pandora, Spotify, Netflix, Facebook, Amazon, iTunes, and the like), and the stream data can be another stream data type (e.g., audio data, game data, image data, and the like).

By caching incoming media stream data chunks received from the WAN server, the cache can act in an analogous manner to a "VCR" by: recording the stream of packets in its entirety as it is transferred to the user device during the initial viewing of the video stream; saving the data from these packets, along with metadata (stored in the packet headers or the requests from the user device), into the cache storage; and synthesizing a similar stream in the future by utilizing the data saved in the cache.

In this manner, repeated viewing of a streaming video from the same device, or by other devices connected on the same LAN, may be provided. In this embodiment, the caching process is implemented in a visible manner, in which the user can see which video streams have been saved in the cache in the past, and can explicitly request the stream to be replayed. In an implementation, the caching is implemented in a transparent manner, in which the user follows the same process that would be performed to stream the video directly from the content server.

Encrypted Caching of Media Data

In an implementation, the system 100 is constructed for encryption and decryption of cached media stream data. For example, for services (e.g., the service 121) that require encryption of cached media stream data, the cached media stream data is encrypted by using any one or more of user specific, device specific, time specific or network specific encryption keys. In a case where the media stream data is received by the system 100 in unencrypted form, system 100 encrypts the received media stream data before caching the data in the storage medium 104. The system 100 performs the encryption by using the encryption/decryption module 115 (of FIGS. 1 and 3). In a case where the media stream data is received by the system 100 in encrypted form, the system 100 caches the received encrypted media. The decryption is performed with specific keys that are held by the content provider. The content provider releases these keys to a user device upon authorization of a respective user (or device) for accessing the cached media stream (e.g., at a time when the user pays for access to the content). Upon request of an encrypted media stream, the system forwards the encrypted media stream data to the user device that had requested the media stream data, and that had requested authorization from the content provider. The user device uses the decryption keys provided by the content provider to decrypt the encrypted media stream data.

In an example embodiment, the cached media stream data includes media stream data that is cached as a result of a pre-fetch operation, and media stream data that is cached as a result of a previous media streaming transaction initiated by a user device.

Direct Content Transfer

Direct content transfer will now be described. The system 100 is constructed to transfer content stored in the storage medium 104 to a similar media sharing system that is connected to a different, separate LAN. Such a direct content transfer is performed in the following cases: content is specifically shared from the system 100 to a similar media sharing system on a separate LAN; generated pre-fetch content information (described previously) that is generated for the other similar media sharing system identifies content to be pre-fetched from the system 100; the other similar media sharing system requestes the content from the system 100 from either user device connected 105 or 106 (e.g., a user device connected to the same LAN as the system 100).

In an example embodiment, such a direct content transfer takes advantage of: the intelligent proxy agents in the system 100, which can optimize the scheduling of the transfer; and the network-aware transfer control provided by the connection manager 318, which transfers the data opportunistically, as described above, to reduce an impact of the transfer on all of the users and devices on the two LANs. In an example embodiment, the transfer is performed by using coordination information (such as addressing or scheduling) that is provided by a cache service (e.g., the cache service provided by cache service server 1500 of FIG. 15). In some embodiments, this transfer is performed between the two media sharing systems without the help of any outside coordination.

Figure 7:
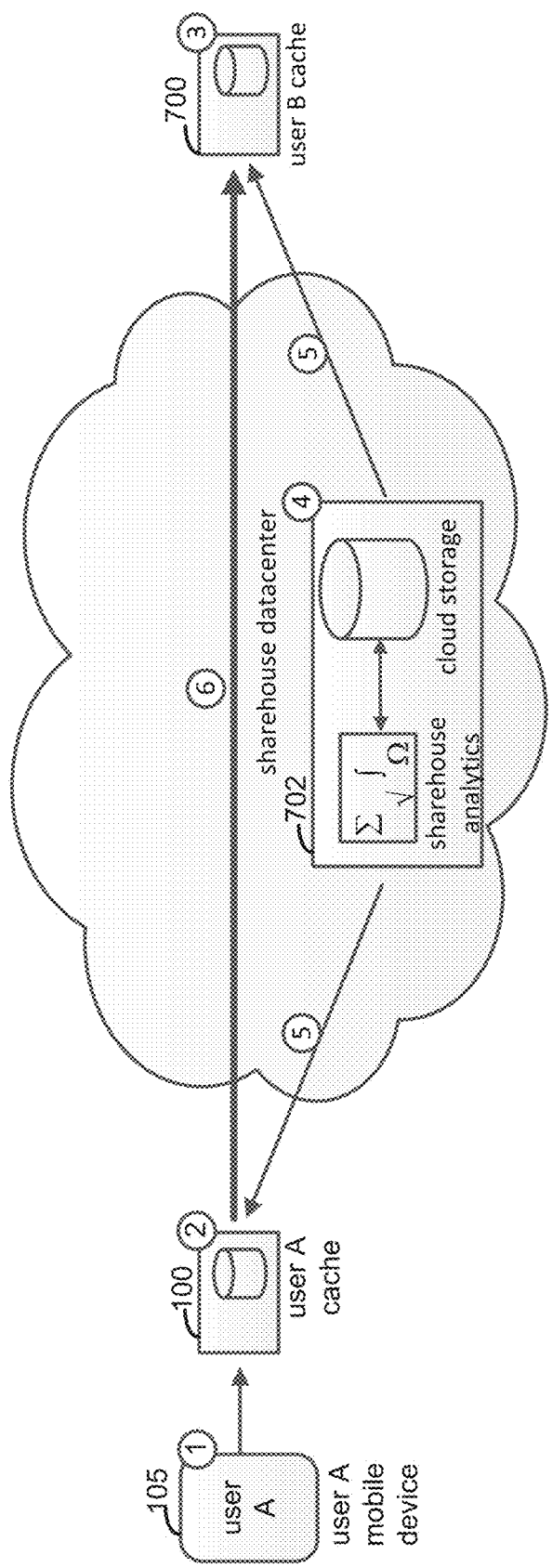
FIG. 7 depicts an exemplary direct system-to-system ("cache-to-cache") transfer between two media sharing systems, according to an example embodiment.

FIG. 7 depicts an exemplary direct content transfer between the system 100 (located on the first LAN) and the system 700 (located on the second LAN). In FIG. 7, the user device 105 triggers transfer of content from the system 100 to the system 700 by making a request to the cache service 702. The cache service 702 informs the system 100 and the system 700 of the request to transfer, after which peer-to-peer communication between the system 100 and the system 700 is established. After the peer-to-peer communication is established, the data is transferred from the system 100 to the system 700.

In addition, if it is determined that the same content that is going to be transferred from the system 100 to the other system 700 resides on other similar media sharing systems as well (for example, if there are more than two media sharing systems that are owned by members of a single social network, that are all sharing content together), then the transfer can be made by multiple source media sharing systems to the single destination media sharing system. The portions of the content that are transferred from a specific media sharing system are coordinated from the central cloud-based cache service 702, and are optimized based on the available maximum transfer rate from each source media sharing system to the destination media sharing system, the current aggregate amount of traffic from each source media sharing system to the WAN, and the projected future aggregate amount of traffic from each source media sharing system to the WAN.

Figure 23:
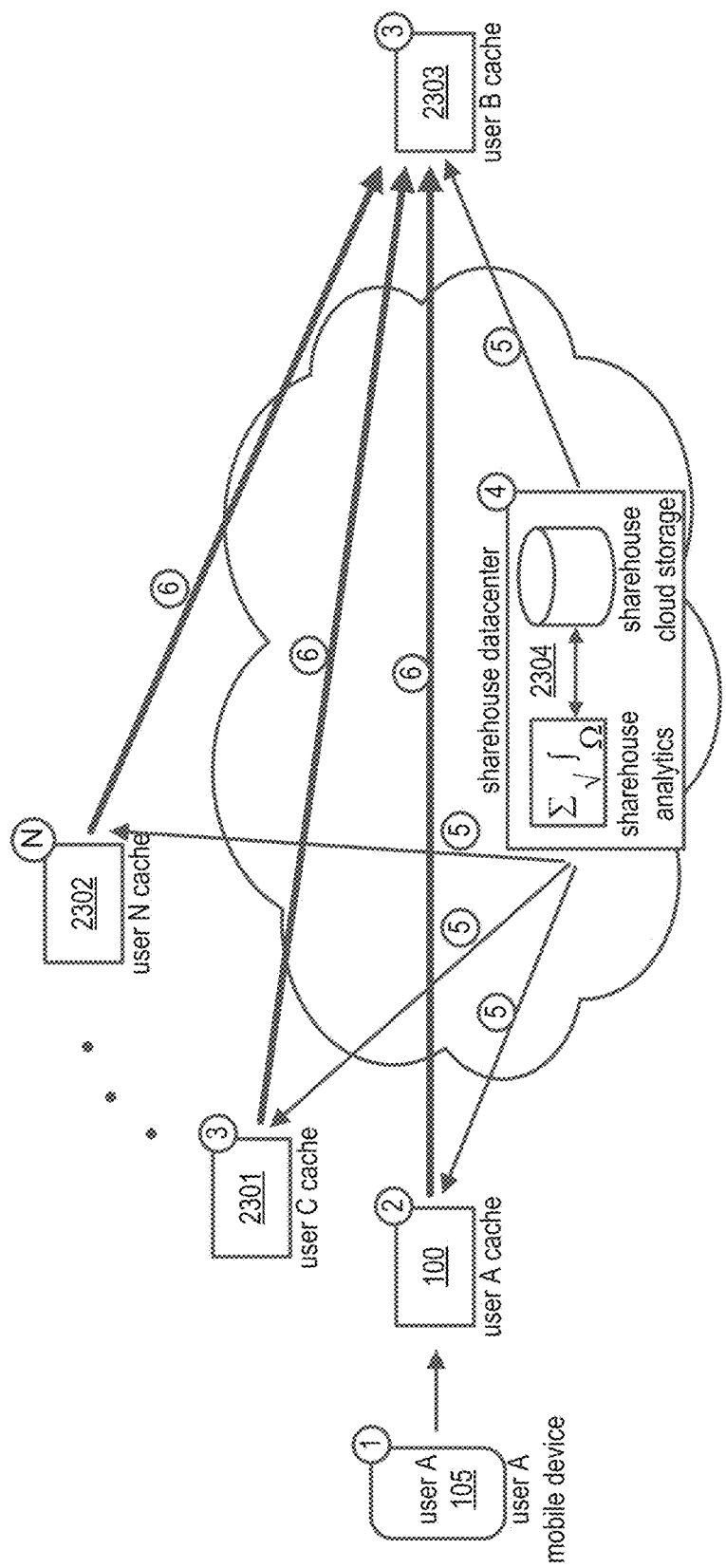
FIG. 23 is a diagram depicting an exemplary multi-source load balancing for content transfer to a sharing system, according to an example embodiment.

An exemplary multi-system direct content transfer is depicted in FIG. 23. The user device 105 triggers transfer of content from system 100, system 2301 and system 2302 to the system 2303 by making a request to the cache service 2304. The cache service 2304 confirms content availability on system 100, system 2301 and system 2302 through system 2303, and initiates multiple peer-to-peer transfers based on individual throughput parameters and conditions.

System-To-System Backup Service

In an example embodiment, the direct content transfer functionality described above is used to provide a backup service for content on a user device (e.g., 105 or 106). This backup service copies all of the selected content residing on a specific media sharing system (on a specific home network) to one or more other similar media sharing systems that are external to the specific home network (e.g., residing on other home networks). In an example embodiment, these other similar media sharing systems are owned by members of the social network of the user whose media sharing system is being backed up.

In an example embodiment, all backup content is tagged with identification information that had been provided by the user whose media sharing system is being backed up. When desired, the user can request the tagging information for all content that has been copied to other similar media sharing systems. By using the requested tagging information, the user can identify content that they wish to retrieve, and then selectively retrieve this content without retrieving all backup content. In an example embodiment, the media sharing system can be configured to encrypt the backup content.

Figure 24:
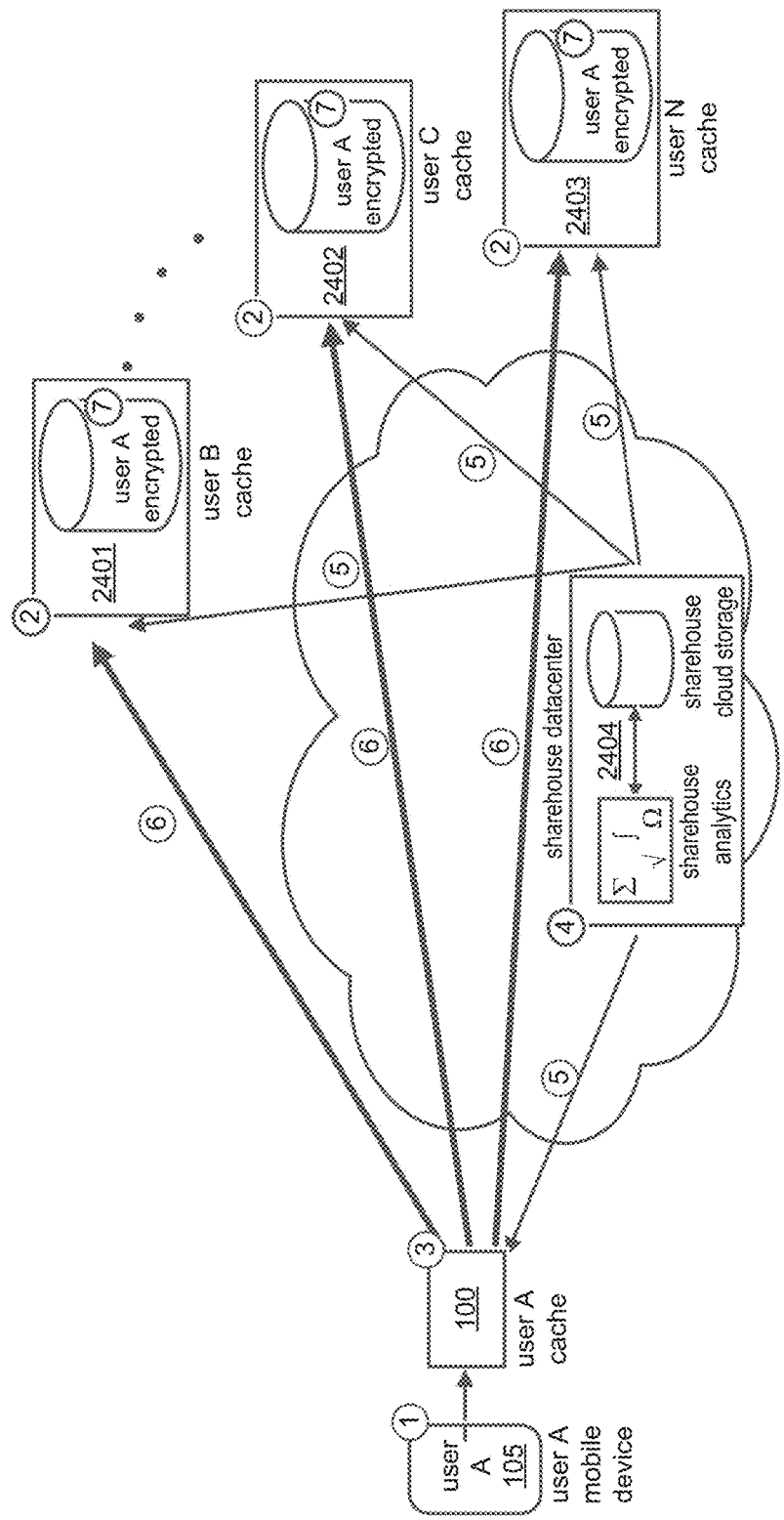
FIG. 24 is a diagram depicting an exemplary transaction using a system-to-system ("cache-to-cache") backup service, according to an example embodiment.

FIG. 24 depicts an exemplary operation using the system-to-system backup service. As shown in FIG. 24, the user of the user device 105 requests backup of the content of the system 100 to multiple systems 2401, 2402 and 2403. The cache service 2404 coordinates with systems 2401, 2402 and 2403 to schedule transfer of backups to systems 2401, 2402 and 2403. The backup data is stored on systems 2401, 2402 and 2403 using encryption.

Cloud-Based Backup Service

A cloud-based backup service will now be described. In an example embodiment, a cloud backup agent (of agents 317) is used in conjunction with a cloud-based backup service 121 to optimize the scheduling of the backup transfer from a user device (e.g., 105 or 106) in communication with the system 100. By virtue of performing the backup by using the cloud backup agent, the backup service 121 benefits from the network-aware transfer control provided by the connection manager 318, which transfers the backup data opportunistically, as described above, to reduce an impact of the transfer on all of the users and devices on the LAN.

Figure 25:
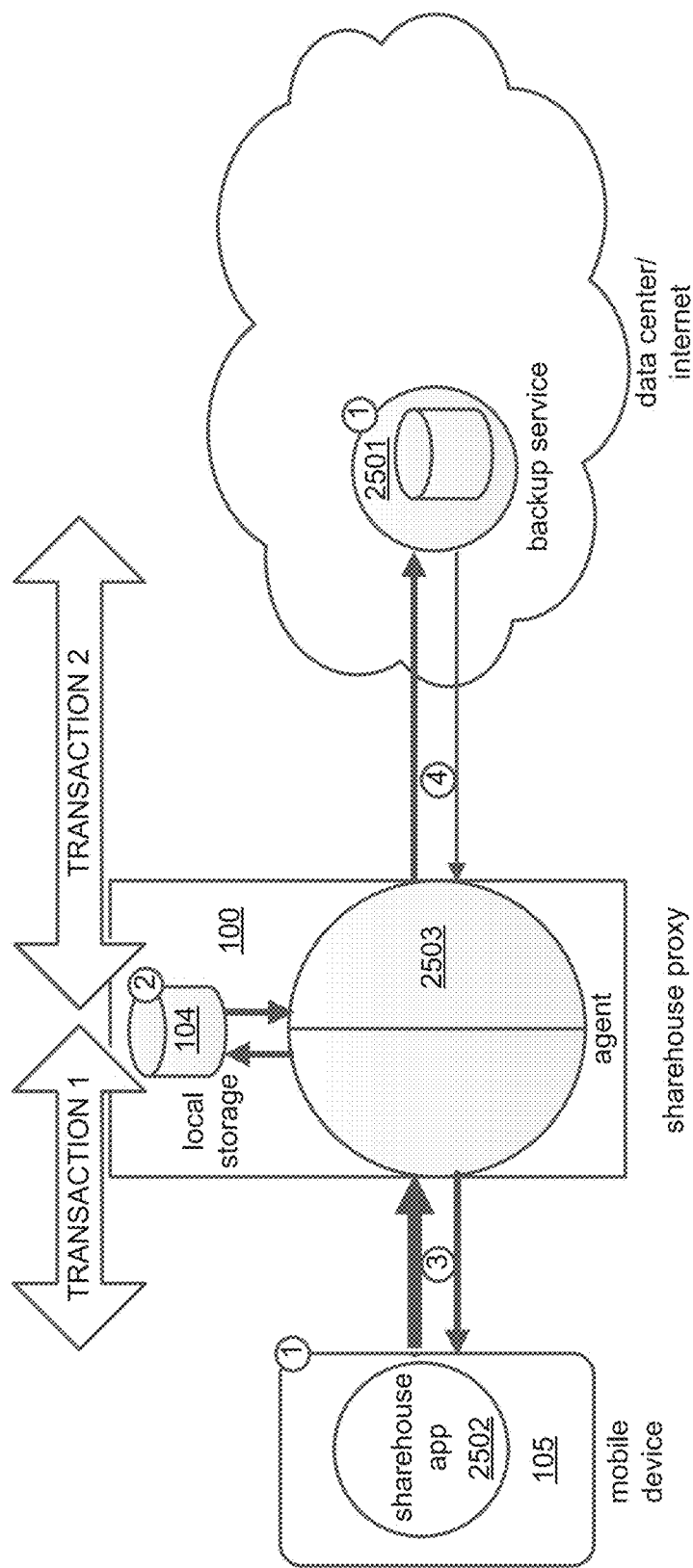
FIG. 25 is a diagram depicting an exemplary transaction using a cloud-based backup service, according to an example embodiment.

FIG. 25 depicts an exemplary operation using the cloud-based backup service. In a first sub-transaction, a backup application 2502 running on the user device 105 initiates a backup to the backup agent 2503 of the system 100, and the backup agent 2503 stores the backup data in the storage medium 104. The data is transferred from the user device 105 to the system 100 at the LAN speed. In a second sub-transaction, the backup agent 2503 backs up the data to the cloud-based backup service 2501. This second sub-transaction is performed opportunistically, as described above, based on the traffic statistics 319.

This approach used for cloud-based backup can be applied to other cloud-based services that need to operate on data residing on a user's media sharing system. For example, if a user wants to utilize a cloud-based photo printing service for several hundred pictures (such as Shutterfly), the appropriate proxy agent on the media sharing system intelligently schedules the transfer of the photos during a specific time window (e.g. the middle of the night), which has a low probability of traffic on the network, and, during that transfer, monitors the other traffic being put on the network and only uses the "unused" transfer capacity to reduce impact on other users or devices.

Private Distributed Social Networking Service

In an example embodiment, one or more media sharing systems (e.g., system 100) are used to implement a private distributed social networking service. The private distributed social networking service described herein does not store user-generated content (or personal information about the users themselves) in a centralized service-controlled and owned archive. Instead, user-generated content (and personal information about the users themselves) is distributed and stored on one or more media sharing systems similar to the system 100. In some embodiments, such content and personal information is also stored on designated user devices (e.g., 105 and 106).

By storing the user-generated content and personal information of a user on a media sharing system that is controlled by the user, the user has control over their content and personal information (as compared to having this information stored in a centralized server). The media sharing system provides the user with the ability to delete content that they originated, and control access to this content by other users of the private distributed social networking service.

More specifically, a user (person X) who wishes to share content (such as pictures, videos or private text), but still desires to maintain control over this content, uploads the content to a media sharing system (e.g., system 100) that is located on that user's network. The media sharing system is positioned in the network in such a way that it has access to both LAN connections as well as the WAN connection. A member of the user's social network who wants to view the content (person Y) does so through a device specific application (e.g., the client-system application 613 of FIG. 6) or a standard web page interface that shows the person X's home page. This content is served in two portions: a) an initial portion (which includes all of the non-user specific content) that is stored at a data center of the private distributed social networking service, the initial portion being transmitted by a server at the data center to person Y's application or web browser, and b) user-specific content is sent directly from the person X's media sharing system to person Y's application or web browser. The server at the data center authenticates the person Y, and redirects the request for the user specific content from person Y's application or browser from the data center to person X's media sharing system. In an example embodiment, the initial portion of the content includes metadata that is used by the data center to alert person Y of the availability of the user specific content, and to redirect the request for the user specific content to person X's media sharing system.

To improve home page access speeds, if person Y also has a media sharing system installed in person Y's network, person X's content can be pre-fetched from person X's media sharing system in a manner similar to that described above in relation to pre-fetching. Then, when person Y wants to view person X's home page, the delivery of the web page can be at the LAN data rate, as most of the content is provided by person Y's local network. The caching of person X's content on person Y's media sharing system can be deleted, encrypted, or can be made permanent, depending on the level of trust person Y has with person X, and based the explicit commands of person X.

If person X's content needs to be cached on other media sharing systems who's owners are also in person X's social network and are authenticated, the content can be directly transferred from any combination of media sharing systems that are caching the content, including the original media sharing system. This arrangement may provide enhanced data transfer performance as opposed to transferring the content only from the original person X's media sharing system. This multi-system transfer can be coordinated by a control server located at the data center.

Figure 26:
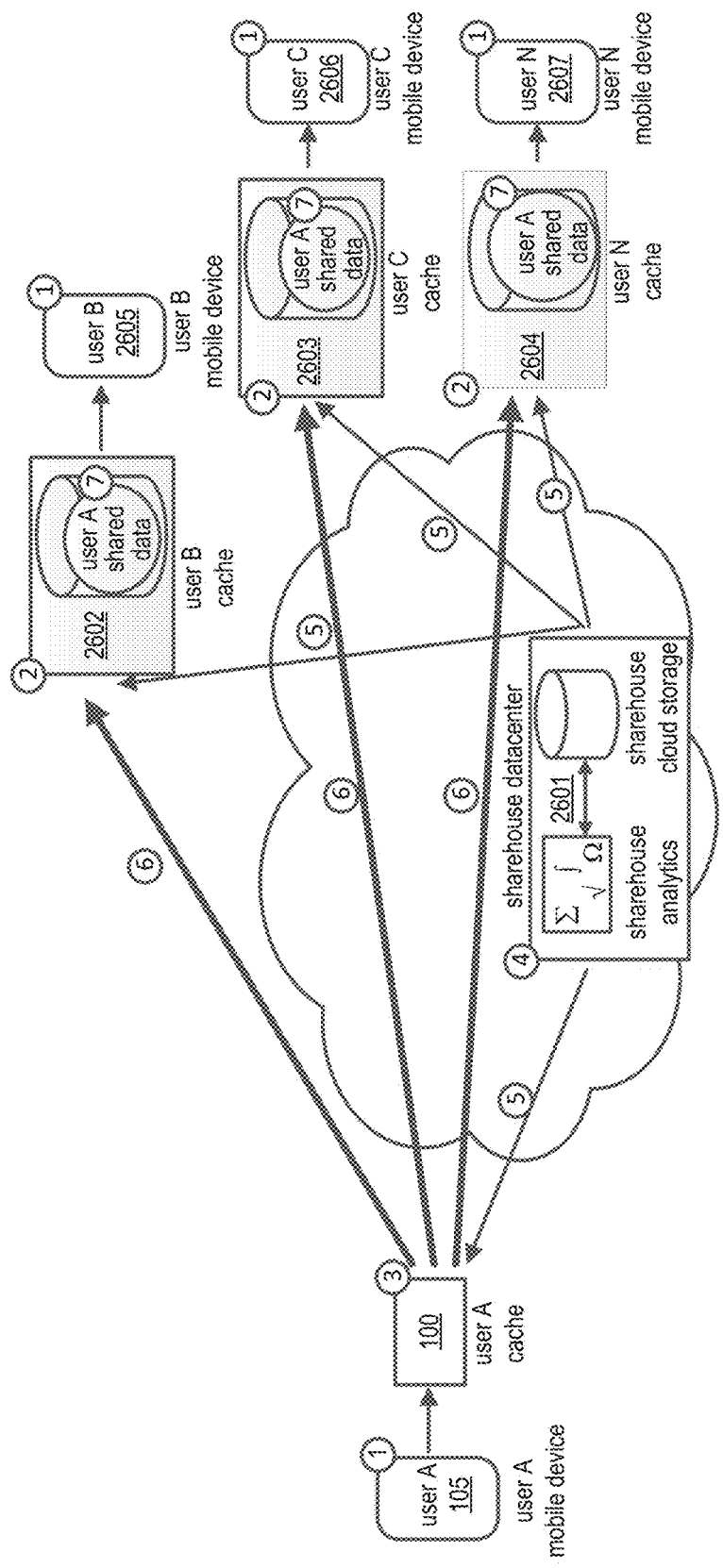
FIG. 26 is a diagram depicting an example of a private distributed social network, according to an example embodiment.

FIG. 26 depicts an example of a private distributed social network. As shown in FIG. 26, a user A of the user device 105 wishes to share user A's content privately to multiple users on the private distributed social network. The data center 2601 coordinates with media sharing systems 2602 through 2604 to schedule the transfer of user A's content from user A's system 100 to the systems 2602 through 2604 of other users. After this transfer, the users of user devices 2605 through 2607 can view user A's shared content.

Cloud-Based Private Sharing to External Devices

Cloud-based private sharing to external devices will now be described. According to this technique for sharing, the content to be shared is transferred to one or more cloud-based servers residing in a data center. Once the content is received by the data center, the data center acts as a temporary cache for the content. This content is then relayed to other destination devices that are configured to receive the shared content, including one or more systems (e.g., 100) residing on other networks. Once all destination devices have received the content, the copy residing on the cloud-based server (or servers) is deleted, in order to maintain user privacy, and to minimize storage requirements at the data center.

This technique may reduce the impact of the slow upstream connection of the original user, especially when dealing with multiple destinations, or with destinations that do not have a media sharing system, while still addressing potential privacy issues by allowing a temporary storage of the content at the cloud-based server followed by immediate deletion after delivery.

Figure 27:
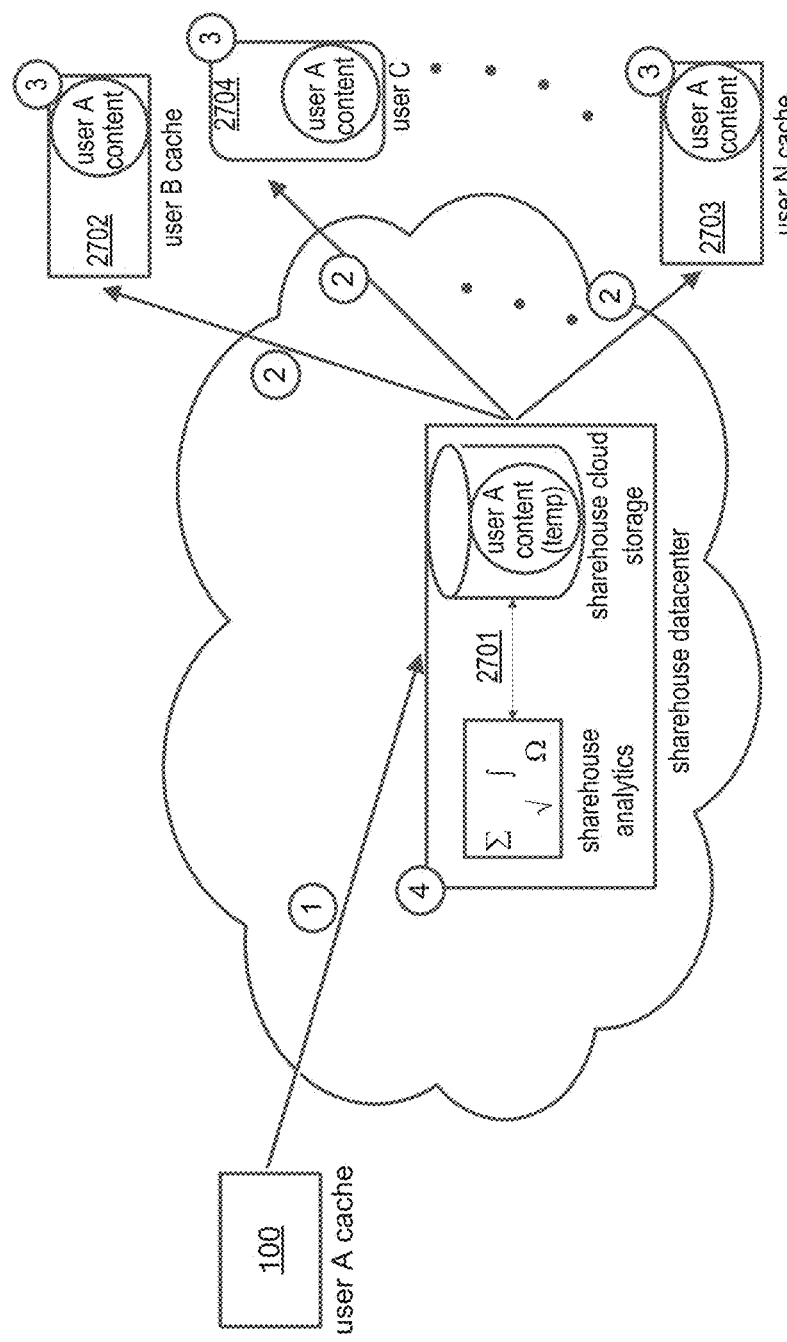
FIG. 27 is a diagram depicting an example of a cloud-based private sharing, according to an example embodiment.

FIG. 27 depicts an example of the technique for cloud-based private sharing. As shown in FIG. 27, a user A controls their media sharing system 100 to transfer content to the data center 2701 for later broadcast to other users in user A's social network. In the embodiment of FIG. 27, the transfer of the data to the other users is done opportunistically, based on analytics. User device 2704, media sharing system 2702 and media sharing system 2703 receive this shared content. This content is shared while minimizing utilization of upstream bandwidth of the LAN on which user A's media sharing system 100 is located, because the content is broadcast from the data center 2701. Once user device 2704, media sharing system 2702 and media sharing system 2703 have received user A's content, the content is deleted from the data center 2701.

Out-Of-Band Broadcast Pre-Fetch Caching

Out-of-band broadcast pre-fetching caching will now be described. Out-of-band broadcast pre-fetch caching involves use of a dedicated cache-filling network link that is used to push pre-fetch data to each media sharing system (e.g., 100) that is connected to such a link. In an example embodiment of the out-of-band broadcast pre-fetching caching technique, the cache-filling network link is a broadcast TV channel. In some embodiments of the out-of-band broadcast pre-fetching caching technique, the cache-filling network link is a separate set of unused frequencies on the physical wire used for the Internet connection.

In an example embodiment of the out-of-band broadcast pre-fetching caching technique, one cache-filling data stream is generated and sent to multiple media sharing systems, which may amortize the cost of generating the data stream over many media sharing systems, and which may also allow the use of a simpler and lower cost network infrastructure to transmit the data stream. In an example embodiment of this technique, the cache-filling network link is a one-way link instead of bi-a directional link. Each individual media sharing system selectively and uniquely picks which portions of the data it wants to use to fill its cache, thus allowing some optimization to improve cache-hit rate on a device-by-device basis.

Figure 28:
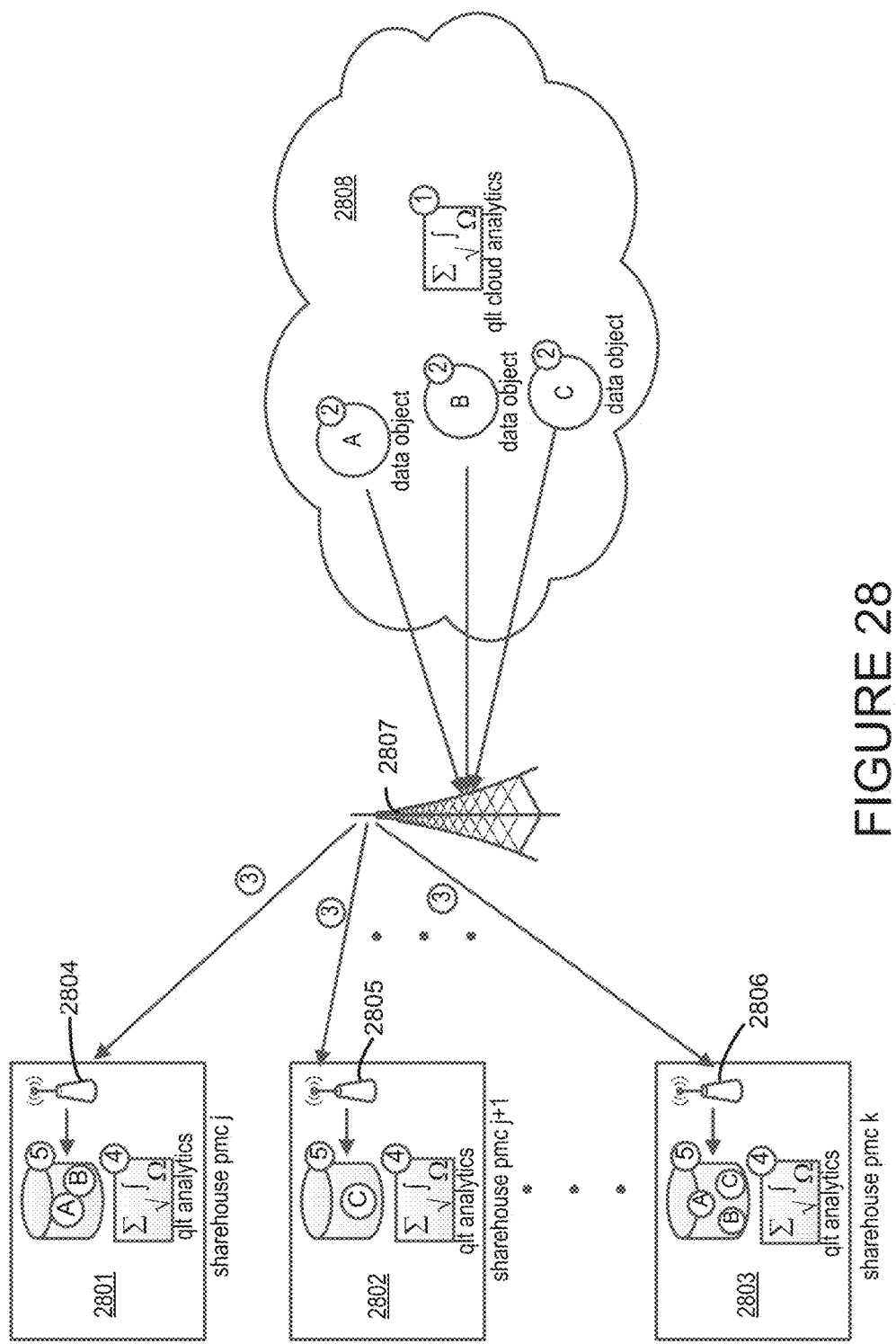
FIG. 28 is a diagram depicting an example of out-of-band broadcast pre-fetch caching, according to an example embodiment.

FIG. 28 depicts an example of the technique for out-of-band broadcast pre-fetch caching. As shown in FIG. 28, a broadcast network link is established between the radio transmitter 2807 and the radio receivers 2804, 2805 and 2806 in each of the media sharing systems 2801, 2802 and 2803, respectively. Each media sharing system 2801, 2802 and 2803 is similar to the media sharing system 100 of FIG. 1. The data center 2808 provides the data that is transmitted over the broadcast network link by a radio transmitter 2807. In some embodiments, the broadcast network utilizes any suitable type of wireless and/or wired communication link. As depicted in FIG. 28, the data center uses analytics to determine data to distribute over the out-of-band broadcast network link. Each media sharing system 2801, 2802 and 2803 receives the distributed data and uses analytics to determine whether the received data should be cached or discarded. As depicted in FIG. 28, data objects A, B and C are distributed by the data center 2808. The media sharing system 2801 caches objects A and B. The media sharing system 2802 caches object C. The media sharing system 2803 caches objects A, B and C.

Automatic Media File Conversion

Automatic media file conversion will now be described. Automatic media file conversion addresses the situation in which media files shared between devices are incompatible due to differing media file formats. For example, media file formats include operating-system-specific media file formats, such as, for example, media file formats for iOS, Blackberry OS, a Microsoft-type OS, and an Android OS.

When a media file is initially transferred from a user's device (e.g., 105) to the media sharing system 100, the media sharing system 100 automatically converts (transcodes) the media file (by using the transcoding module 324) to a consistent, universal media file format, and stores the media file on the storage medium 104 in that format, as shown in FIG. 29. As shown in FIG. 29, the operating system of user device 105 is different from the operating system of user device 106. The original media file format of the transferred media file is a format of the operating system of user device 105.

The default universal media format may be changed either by user configuration or from a cloud-based service. When a media file is requested by a user's device (e.g., 106), the specific type of user device (e.g., iOS, Android, etc.) is detected by the system 100, and if the media file is in a format that is incompatible with the device, the media sharing system 100 converts the media file to a known usable media file format type for the user device 106, and the media sharing system 100 transfers the converted media file to the user's device 106.

In an embodiment of automatic media file conversion, a distributed network of media sharing systems performs the conversion of the media file to the consistent, universal media file format. In an embodiment, the media file is a video file, and the distributed network of media sharing systems performs the conversion of the video file by converting the video file into a smaller, lower quality format to allow previews or thumbnails, in addition to converting the video file into a common video format for universal playback.

Other Embodiments

In an example embodiment, the media sharing system (e.g., system 100) includes software components (machine-executable instructions that are executed by the processor of the bi-directional cache) constructed to control the media sharing system to perform each of the following: direct content transfers as described above; operations in accordance with the system-to-system backup service as described above; operations in accordance with the cloud-based backup service as described above; operations in accordance with the private distributed social networking service as described above; cloud-based private sharing to external devices as described above; operations in accordance with out-of-band broadcast pre-fetch caching as described above; operations in accordance with automatic media file conversion as described above. In some embodiments, the media sharing system includes one or more of the aforementioned software components.

In some embodiments, the media sharing system (e.g., 100) includes one or more software components constructed to control the media sharing system to perform one or more of the following: server-based multi-apparatus sharing, wherein the media sharing system is controlled to share content with another media sharing system through a server; backup to the server of content stored within the media sharing system, the backup providing a duplicate copy of the content; archiving to the server of content previously stored by using the media sharing system, the archiving allowing retrieval of the content while relieving the need to store a duplicate copy within the media sharing system; receiving an out-of-band broadcast or multicast of content from the server to the media sharing system, wherein in-band communications to and from the media sharing system are bidirectional, wherein the out-of-band communications are one-way.

In some embodiments, the media sharing system (e.g., 100) includes one or more software components constructed to control the media sharing system to perform one or more of the following: peer-to-peer coupling to a remote media sharing system; side-channel information-based caching/prefetching for, based on predetermined information relevant to a user, updating content to one or more of a local media sharing system, a remote media sharing system, and a server, wherein local content stored within the media sharing system is updated by using remote content stored on the remote media sharing system, wherein the local updating is performed by a first predetermined algorithm, wherein the remote content on the remote media sharing system is updated by using the local content stored within the media sharing system, wherein remote updating is performed by a second predetermined algorithm.

CONCLUSION

While various example embodiments of the present disclosure have been described above, it should be understood that they have been presented by way of example, and not limitation. It will be apparent to persons skilled in the relevant art(s) that various changes in form and detail can be made therein. Thus, the present disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An apparatus comprising:
    a first interface configured for coupling to one or more user devices, including one or more user devices that are local to the apparatus;
    a storage medium for storing a plurality of data file types, each file type configured for one or more of the user devices; and
    a transaction manager for selectively managing a first transaction for a first user device, the transaction manager configured to:
        receive the first transaction and divide the first transaction into a plurality of sub-transactions,
        wherein the sub-transactions appear as a single transaction to a service provider or the one or more user devices,
        wherein the apparatus is configured to store data comprising user generated content that is sourced from the first user device;
    a plurality of agents for operations upon the user generated content sourced from the first user device, wherein when the first user device is in proximity to the apparatus, the transaction manager is configured for a pre-determined upload of the user generated content to the apparatus by using a first sub-transaction whereby the uploaded user generated content is available to the plurality of agents; and
    a plurality of protocols including at least one protocol for communication with each service provider and with each user device, wherein the apparatus is configured to operate without the need for requiring a common protocol between each service provider and each user device;
    wherein the transaction manager is configured to process the first sub-transaction prior to processing a second sub-transaction such that the processing of the second sub-transaction occurs regardless of the proximity of the first user device, the service provider, or the one or more user devices to the apparatus, the second sub-transaction corresponding to the first sub-transaction;
    wherein the apparatus is configured for bi-directional caching of the first transaction and data for the first user device, such that the user generated content is available to the service provider or the one or more user devices by using the transaction manager without the need for physically or temporally coupling by the first user device to the service provider or to the one or more user devices.

2. The apparatus of claim 1, wherein the apparatus caches the first transaction and the data for a second user device, such that when the second user device makes a request related to the first transaction, the apparatus responds to the second user device by using the caching of the first transaction and the data.

3. The apparatus of claim 1,
    wherein when the first transaction comprises a download/update to the first user device from a remote source, the apparatus provides:
        a first sub-transaction to receive the download/update from the remote source, and
        a second sub-transaction to provide the download/update to the first user device;
    wherein when the first transaction comprises an upload from the first user device to a remote destination, then the apparatus provides:
        a first sub-transaction to receive the upload from the first user device, and
        a second sub-transaction to deliver the upload to the remote destination.

4. The apparatus of claim 1, the plurality of agents including one or more of: a social media agent, a streaming agent, a streaming audio agent, a streaming video agent, a remote storage agent, an application specific agent, an online service agent, a FACEBOOK agent, an ITUNES agent, an ICLOUD agent, a NETFLIX agent, an AMAZON agent, a GOOGLE agent, and a service provider agent, wherein the apparatus provides to the first user device streaming content from a source external to the apparatus, and the apparatus buffers the streaming content such that the first user device can de-couple and re-couple to the apparatus and resume the streaming content with minimal interruption to a link between the apparatus and the external source.

5. The apparatus of claim 1, wherein the transaction comprises an upload or a download, the transaction manager for:
    offloading the upload for the first user device, wherein the apparatus comprises:
        a configuration for removing the uploaded content from the first user device, and
        a configuration for marking the uploaded content as uploaded to the apparatus and leaving the marked content on the first user device; and
    offloading the download for the first user device, wherein the offloading comprises receiving a request to download, performing the download on behalf of the first user device, and providing a notification of completion of the download.

6. The apparatus of claim 1, the transaction manager comprising a first download agent, wherein when the apparatus receives a download request from the first user device the first download agent offloads from the first user device processing required by the download request such that the download completes to the apparatus regardless of the status of the first user device.

7. The apparatus of claim 1, the transaction manager comprising a first upload agent, wherein when the apparatus receives an upload request from the first user device, the first upload agent offloads from the first user device processing required by the upload request such that the upload completes to the apparatus regardless of the status of the first user device.

8. The apparatus of claim 1, further comprising a priority manager for managing a priority of one or more operations including one or more of an upload, a download, and a streaming, the priority manager comprising one or more predetermined algorithms including one or more of: network availability, off-peak usage, peak usage, and idle time.

9. The apparatus of claim 1, further comprising:
a second interface for coupling to a service provider that provides a service for one or more user devices;
a configuration for emulating a client of the service, to the service provider; and
a configuration for emulating the service, to the first user device such that the apparatus receives packets having the protocol, destination IP address and the destination port that are associated with the service, for the first user device.

10. The apparatus of claim 1, further comprising:
an organizer module for aggregating the plurality of file types by using the storage medium; and
a transcoding module for transcoding of a first file format to a second file format,
wherein the user devices comprising one or more of:
a tablet, a phone, a computer, a mobile device, an IPOD, an IPAD, an IPHONE, an APPLE OS device, a BLACKBERRY OS device, a MICROSOFT OS device, and an ANDROID OS device,
wherein the first file format is for a first operating system (OS), and the second file format is for a different OS than the first OS;
the transcoding for translating the first file format from a format that is usable on a first user device to the second format that is usable on a second user device.

11. The apparatus of claim 1, wherein the first user device comprises an application module for coupling the first user device to the first interface, wherein the apparatus pulls the user generated content from the first user device and pushes the user generated content to the service provider or the one or more user devices without the need for user interaction and without the need for the first user device to be physically or temporally coupled to the apparatus during the push operation.

12. The apparatus of claim 1, further comprising one or more modules for:
peer-to-peer coupling to a remote apparatus; and
side-channel information-based caching/prefetching for, based on predetermined information relevant to a user, updating content to one or more of a local apparatus, a remote apparatus, and a server,
wherein local content stored within the local storage medium is updated by using remote content stored on the remote apparatus,
wherein the local updating is performed by a first predetermined algorithm; and
wherein the remote content on the remote apparatus is updated by using the local content stored within the local storage medium, wherein remote updating is performed by a second predetermined algorithm.

13. The apparatus of claim 1, the apparatus further configured for multi-home social caching for selectively updating content to one or more social networks relevant to a user.

14. The apparatus of claim 1, further comprising one or more modules for: coupling to a server, the apparatus further configured for one or more of:
server-based multi-apparatus sharing, wherein the apparatus is configured to share content with another apparatus through the server;
backup to the server of content stored within the storage medium, the backup of providing a duplicate copy of the content;
archiving to the server of content previously stored by using the storage medium, the archiving allowing retrieval of the content while relieving the need to store a duplicate copy within the storage medium;
receiving an out-of-band broadcast or multicast of content from the server to the apparatus, wherein in-band communications to and from the apparatus are bidirectional, wherein the out-of-band communications are one-way.

15. The apparatus of claim 1, wherein the storage medium comprising one or more of a hard disk, SSD, and flash memory.

16. The apparatus of claim 1, the file types comprising one or more of images, video, audio, and text.

17. The apparatus of claim 1,
the file types comprising at least one of commercial content and user generated content;
the first interface configured for a local communications protocol comprising one or more of: Ethernet, WiFi (IEEE 802.x), USB (universal serial bus), BlueTooth, RF (radio frequency), NFC (near-field-communications), and MoCa (multimedia over co-axial).

18. A method comprising:
using a first interface for coupling to one or more user devices;
using a storage medium for storing a plurality of data file types, each file type configured for one or more of the user devices and for each of one or more service providers;
storing data comprising user generated content that is sourced from a first user device;
bi-directional caching of a first transaction and data for the first user device, the bi-directional caching without the need for requiring a common protocol between each service provider and each user device;
using a transaction manager for selectively managing the first transaction for the first user device, the selectively managing further comprising:
receiving the first transaction and
dividing the first transaction into a plurality of sub-transactions,
wherein the sub-transactions appear as a single transaction to a service provider or the one or more user devices,
the bi-directional caching comprising:
processing a first sub-transaction prior to processing a second sub-transaction such that the processing of the second sub-transaction occurs regardless of the proximity of the first user device, the service provider, or the one or more user devices, the second sub-transaction corresponding to the first sub-transaction; and
making the user generated content available to the service provider or the one or more user devices by using the transaction manager without the need for coupling to the first user device.

19. The method of claim 18,
wherein when the first transaction comprises a download/update to the first user device from a remote source, the method providing:
a first sub-transaction to receive the download/update from the remote source, and a second sub-transaction to provide the download/ update to the first user device;
wherein when the first transaction comprises an upload from the first user device to a remote destination, then the method providing:
a first sub-transaction to receive the upload from the first user device, and
a second sub-transaction to deliver the upload to the remote destination.

20. An article of manufacture comprising a non-transitory machine-readable medium having sets of machine executable instructions embedded thereon, which when executed by a machine, the sets of instructions cause the machine to perform the steps of:
using a first interface for coupling to one or more user devices;
using a storage medium for storing a plurality of data file types, each file type configured for one or more of the user devices and for each of one or more service providers;
storing data comprising user generated content that is sourced from a first user device;
bi-directional caching of a first transaction and data for the first user device, the bi-directional caching without the need for requiring a common protocol between each service provider and each user device;
using a transaction manager for selectively managing the first transaction for the first user device, the selectively managing further comprising:
receiving the first transaction and
dividing the first transaction into a plurality of sub-transactions,
wherein the sub-transactions appear as a single transaction to a service provider or the one or more user devices,
the bi-directional caching comprising:
processing a first sub-transaction prior to processing a second sub-transaction such that the processing of the second sub-transaction occurs regardless of the proximity of the first user device, the service provider, or the one or more user devices, the second sub-transaction corresponding to the first sub-transaction; and
making the user generated content available to the service provider or the one or more user devices by using the transaction manager without the need for coupling to the first user device.

* * * * *